US012683841B2

(12) United States Patent
Oved et al.

(10) Patent No.: US 12,683,841 B2
(45) Date of Patent: Jul. 14, 2026

(54) TECHNIQUES FOR CONVEYING ON-OFF KEYING SIGNALING VIA ORTHOGONAL FREQUENCY DIVISION MULTIPLEXING WAVEFORMS

(71) Applicant: QUALCOMM Incorporated, San Diego, CA (US)

(72) Inventors: Tal Oved, Modiin (IL); Gideon Shlomo Kutz, Ramat Hasharon (IL); Oren Matsrafi, Yad Modechai (IL)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 18/052,060

(22) Filed: Nov. 2, 2022

(65) Prior Publication Data

US 2024/0163144 A1     May 16, 2024

(51) Int. Cl.
*H04L 27/26* (2006.01)
*H04L 27/02* (2006.01)
*H04W 52/02* (2009.01)

(52) U.S. Cl.
CPC ........ *H04L 27/02* (2013.01); *H04L 27/26025* (2021.01); *H04L 27/2605* (2013.01); *H04W 52/0232* (2013.01)

(58) Field of Classification Search
None
See application file for complete search history.

(56) References Cited

U.S. PATENT DOCUMENTS

| | | | |
|---|---|---|---|
| 11,146,440 B2 | 10/2021 | Sahin et al. | |
| 2018/0049233 A1* | 2/2018 | Luo | H04W 74/006 |
| 2018/0152333 A1* | 5/2018 | Shellhammer | H04L 27/2614 |
| 2019/0116555 A1* | 4/2019 | Kristem | H04L 5/0092 |
| 2019/0273647 A1* | 9/2019 | Shellhammer | H04L 27/2331 |
| 2020/0162302 A1* | 5/2020 | Sahin | H04L 5/0007 |
| 2020/0358505 A1* | 11/2020 | Park | H04B 7/088 |
| 2021/0044465 A1* | 2/2021 | Sundman | H04J 11/003 |
| 2022/0061094 A1* | 2/2022 | Jung | H04W 74/0816 |

OTHER PUBLICATIONS

International Search Report and Written Opinion—PCT/US2023/076134—ISA/EPO—Feb. 12, 2024 (2206043WO).

\* cited by examiner

*Primary Examiner* — Jeffrey M Rutkowski
*Assistant Examiner* — Mehedi S Aley
(74) *Attorney, Agent, or Firm* — Holland & Hart LLP

(57) ABSTRACT

Methods, systems, and devices for wireless communications are described. In some systems, a network entity may map on-off keying (OOK) symbols of an OOK sequence to an orthogonal frequency division multiplexing (OFDM) waveform including at least one OFDM symbol with a cyclic prefix. Each OOK symbol of the OOK sequence may be mapped to at least one segment of an integer quantity of segments of the OFDM waveform based on an OOK data rate. A duration of each segment of the integer quantity of segments of the OFDM waveform may be based on the OOK data rate and a ratio between a duration of the cyclic prefix and a duration of a remainder of the OFDM symbol. The network entity may transmit the OFDM waveform via a set of frequency resources. A user equipment (UE) may receive and decode the OFDM waveform to obtain the OOK sequence.

30 Claims, 21 Drawing Sheets

Mapping a plurality of on-off keying symbols of an on-off keying sequence to an orthogonal frequency division multiplexing waveform, the orthogonal frequency division multiplexing waveform includes at least one orthogonal frequency division multiplexing symbol with a cyclic prefix, each on-off keying symbol of the plurality of on-off keying symbols is mapped to at least one segment of a first integer quantity of segments of the orthogonal frequency division multiplexing waveform based at least in part on an on-off keying data rate ⟍ 1705

Transmitting the orthogonal frequency division multiplexing waveform via a set of frequency resources, wherein a duration of each segment of the first integer quantity of segments of the orthogonal frequency division multiplexing waveform is based at least in part on the on-off keying data rate and a ratio between a duration of the cyclic prefix and a duration of a remainder of the orthogonal frequency division multiplexing symbol ⟍ 1710

⟍ 1700

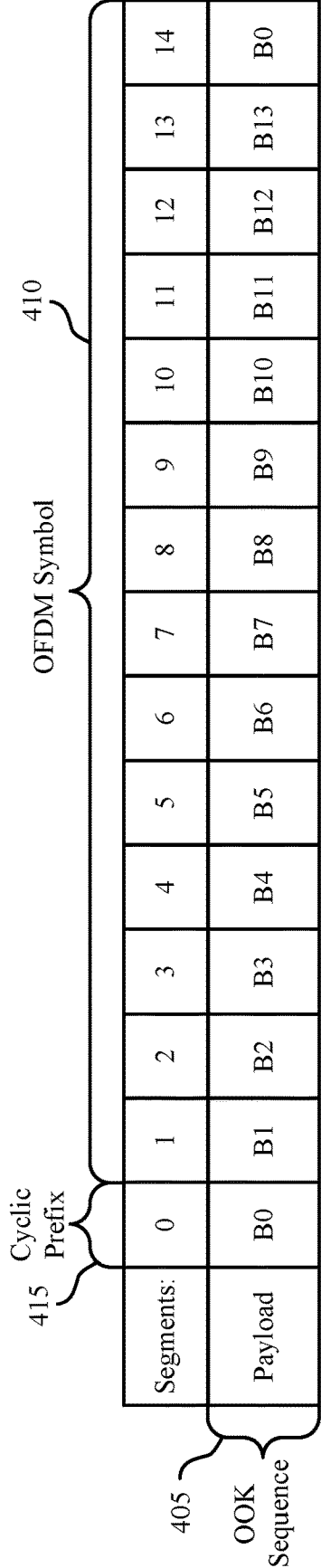
FIG. 4

600

Cyclic Prefix 615

610 OFDM Symbols

| Symbol | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | B0 | B0 | B1 | B1 | B2 | B2 | B3 | B3 | B4 | B4 | B5 | B5 | B6 | B6 | B0 |
| 1 | B0 | B7 | B7 | B8 | B8 | B9 | B9 | B10 | B10 | B11 | B11 | B12 | B12 | B0 | B0 |

Cyclic Prefix 615

610 OFDM Symbols

| Symbol | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | B0 | B0 | B0 | B0 | B1 | B1 | B1 | B1 | B2 | B2 | B2 | B2 | B0 | B0 | B0 |
| 1 | B0 | B3 | B3 | B3 | B3 | B4 | B4 | B4 | B4 | B5 | B5 | B5 | B5 | B0 | B0 |
| 2 | B0 | B0 | B6 | B6 | B6 | B6 | B7 | B7 | B7 | B8 | B8 | B8 | B8 | B8 | B0 |
| 3 | B0 | B0 | B0 | B9 | B9 | B9 | B9 | B10 | B10 | B10 | B10 | B0 | B0 | B0 | B0 |

Figure 7:
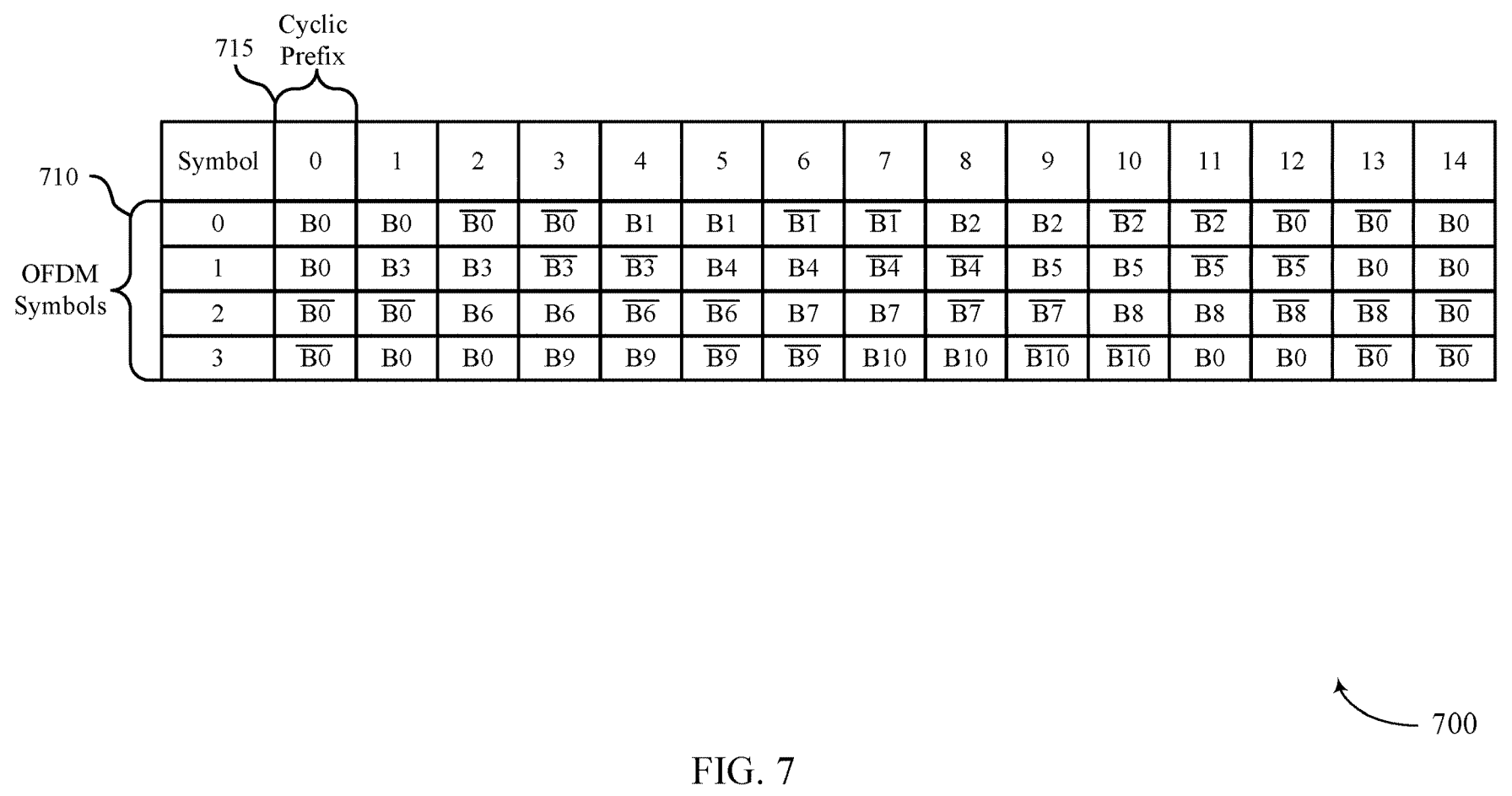

| Symbol | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | B0 | B0 | $\overline{B0}$ | $\overline{B0}$ | B1 | B1 | $\overline{B1}$ | $\overline{B1}$ | B2 | B2 | $\overline{B2}$ | $\overline{B2}$ | $\overline{B0}$ | $\overline{B0}$ | B0 |
| 1 | B0 | B3 | B3 | $\overline{B3}$ | $\overline{B3}$ | B4 | B4 | $\overline{B4}$ | $\overline{B4}$ | B5 | B5 | $\overline{B5}$ | $\overline{B5}$ | B0 | B0 |
| 2 | $\overline{B0}$ | $\overline{B0}$ | B6 | B6 | $\overline{B6}$ | $\overline{B6}$ | B7 | B7 | $\overline{B7}$ | $\overline{B7}$ | B8 | B8 | $\overline{B8}$ | $\overline{B8}$ | $\overline{B0}$ |
| 3 | $\overline{B0}$ | B0 | B0 | B9 | B9 | $\overline{B9}$ | $\overline{B9}$ | B10 | B10 | $\overline{B10}$ | $\overline{B10}$ | B0 | B0 | $\overline{B0}$ | $\overline{B0}$ |

Cyclic Prefix

715

710

OFDM Symbols

820    UE Parameters

805

Map OOK
Symbols To
An OFDM
Waveform          825

830

OOK Data Rate And Coding

835

OFDM Waveform

Decode OOK
Waveform
Embedded In
OFDM
Waveform

840

800

910

920

915

905

900

130

105

115

Network
Entity

Transceiver

1210

Antenna

1215

Communications
Manager

1220

Memory

Code

1230

1225

1240

Processor

1235

1205

1200

1310          1320          1315

1305

1300

Figure 17:
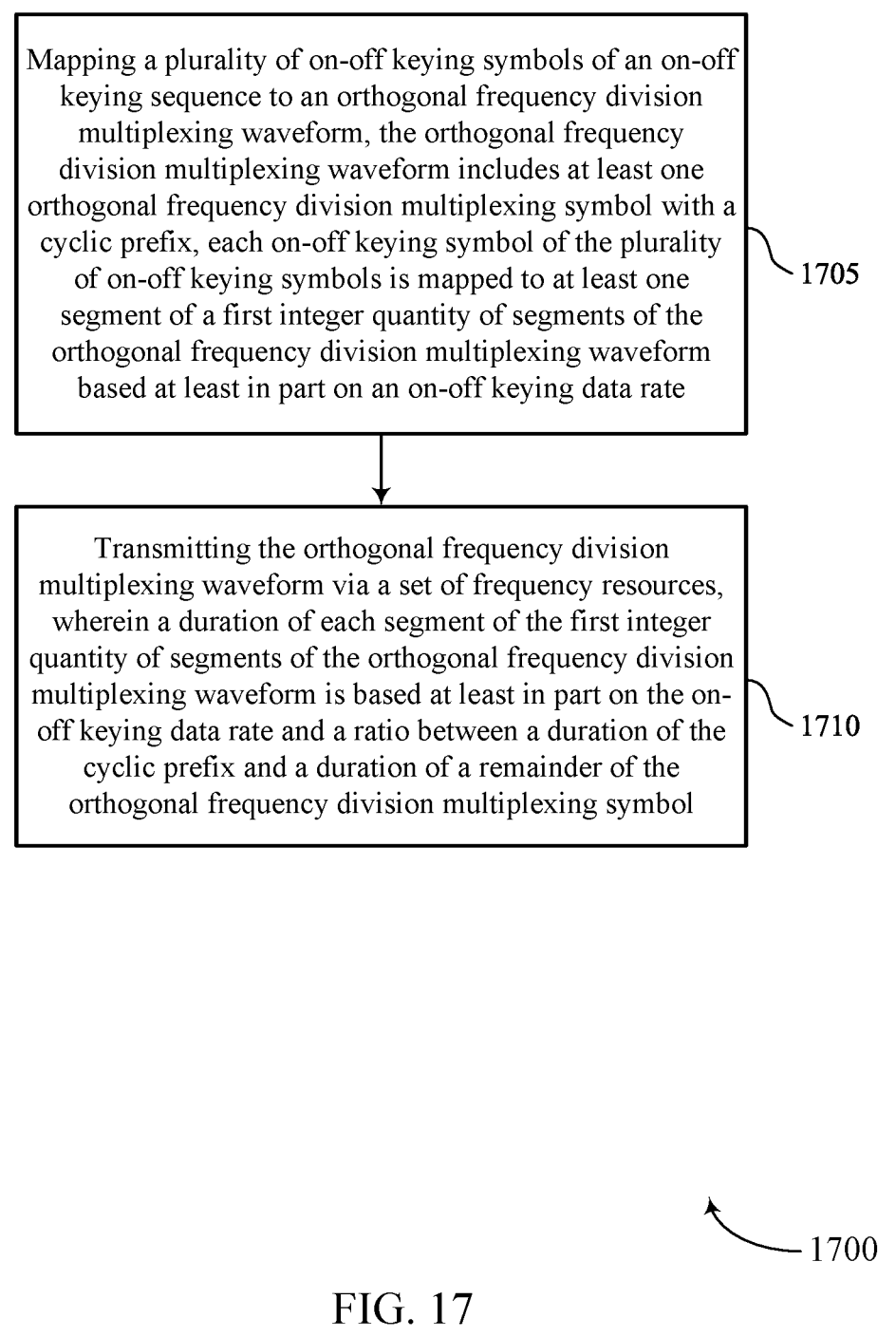

Mapping a plurality of on-off keying symbols of an on-off keying sequence to an orthogonal frequency division multiplexing waveform, the orthogonal frequency division multiplexing waveform includes at least one orthogonal frequency division multiplexing symbol with a cyclic prefix, each on-off keying symbol of the plurality of on-off keying symbols is mapped to at least one segment of a first integer quantity of segments of the orthogonal frequency division multiplexing waveform based at least in part on an on-off keying data rate

1705

Transmitting the orthogonal frequency division multiplexing waveform via a set of frequency resources, wherein a duration of each segment of the first integer quantity of segments of the orthogonal frequency division multiplexing waveform is based at least in part on the on-off keying data rate and a ratio between a duration of the cyclic prefix and a duration of a remainder of the orthogonal frequency division multiplexing symbol

Figure 18:
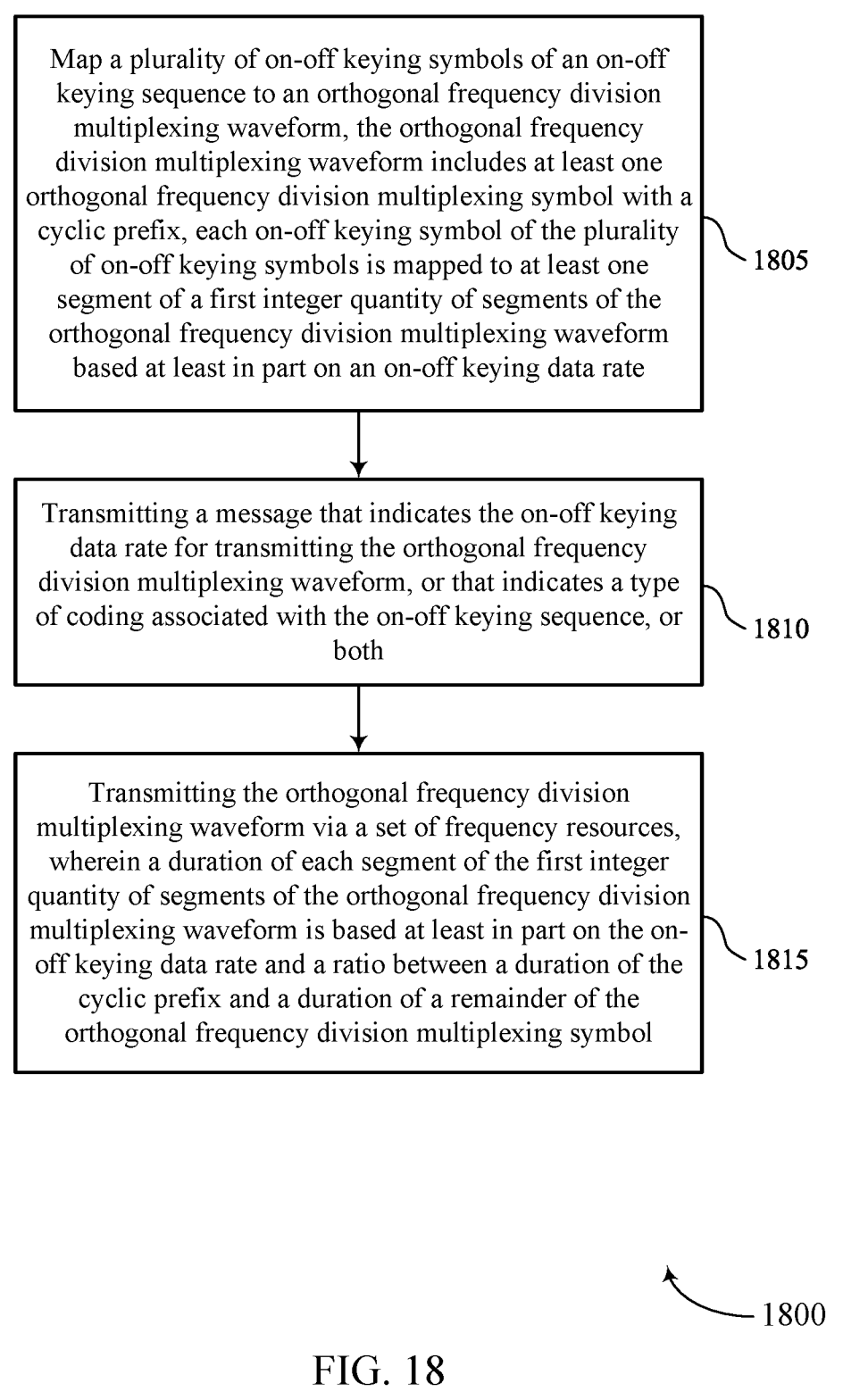

Map a plurality of on-off keying symbols of an on-off keying sequence to an orthogonal frequency division multiplexing waveform, the orthogonal frequency division multiplexing waveform includes at least one orthogonal frequency division multiplexing symbol with a cyclic prefix, each on-off keying symbol of the plurality of on-off keying symbols is mapped to at least one segment of a first integer quantity of segments of the orthogonal frequency division multiplexing waveform based at least in part on an on-off keying data rate

1805

Transmitting a message that indicates the on-off keying data rate for transmitting the orthogonal frequency division multiplexing waveform, or that indicates a type of coding associated with the on-off keying sequence, or both

1810

Transmitting the orthogonal frequency division multiplexing waveform via a set of frequency resources, wherein a duration of each segment of the first integer quantity of segments of the orthogonal frequency division multiplexing waveform is based at least in part on the on-off keying data rate and a ratio between a duration of the cyclic prefix and a duration of a remainder of the orthogonal frequency division multiplexing symbol

Figure 19:
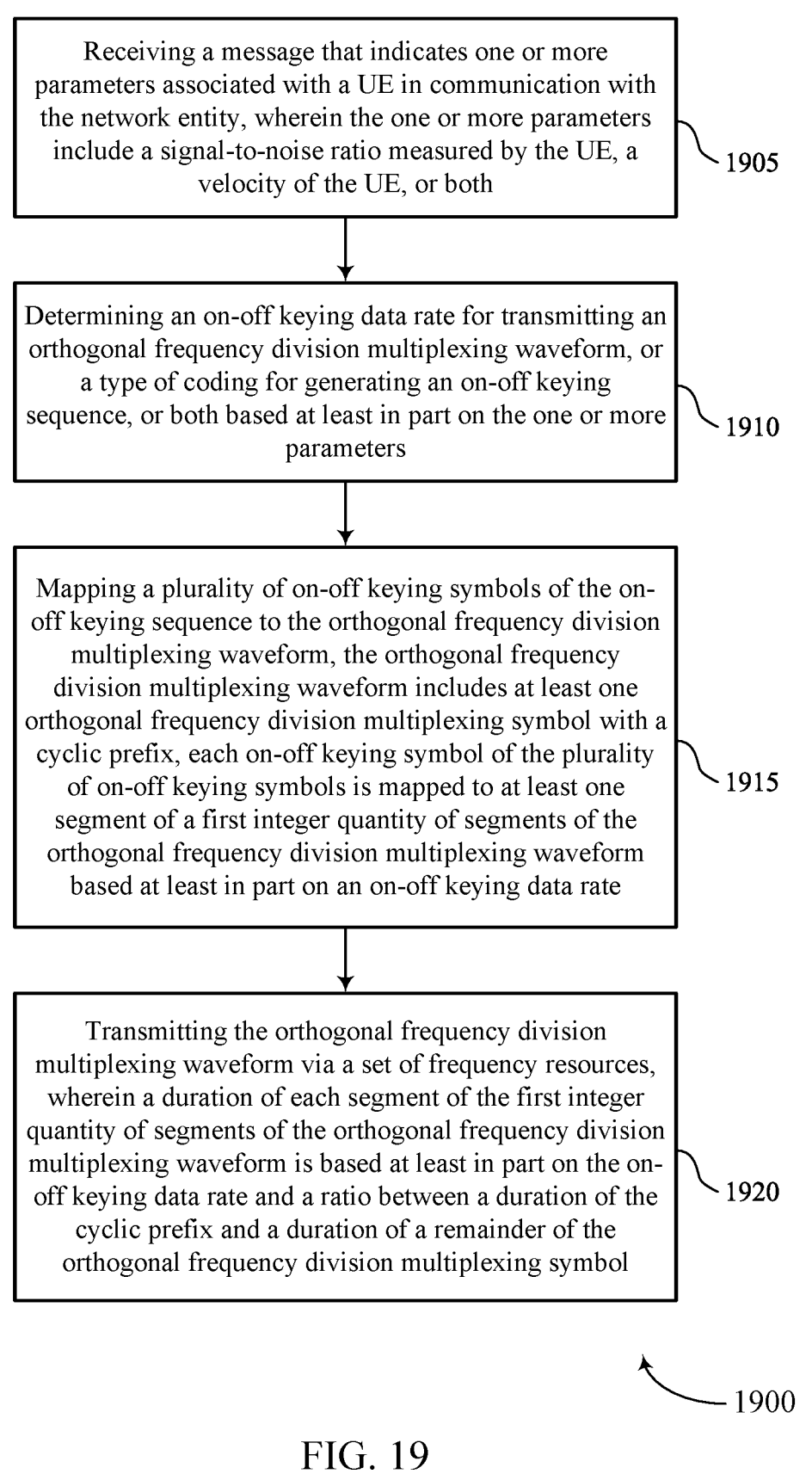

Receiving a message that indicates one or more parameters associated with a UE in communication with the network entity, wherein the one or more parameters include a signal-to-noise ratio measured by the UE, a velocity of the UE, or both

1905

Determining an on-off keying data rate for transmitting an orthogonal frequency division multiplexing waveform, or a type of coding for generating an on-off keying sequence, or both based at least in part on the one or more parameters

1910

Mapping a plurality of on-off keying symbols of the on-off keying sequence to the orthogonal frequency division multiplexing waveform, the orthogonal frequency division multiplexing waveform includes at least one orthogonal frequency division multiplexing symbol with a cyclic prefix, each on-off keying symbol of the plurality of on-off keying symbols is mapped to at least one segment of a first integer quantity of segments of the orthogonal frequency division multiplexing waveform based at least in part on an on-off keying data rate

1915

Transmitting the orthogonal frequency division multiplexing waveform via a set of frequency resources, wherein a duration of each segment of the first integer quantity of segments of the orthogonal frequency division multiplexing waveform is based at least in part on the on-off keying data rate and a ratio between a duration of the cyclic prefix and a duration of a remainder of the orthogonal frequency division multiplexing symbol

Figure 20:
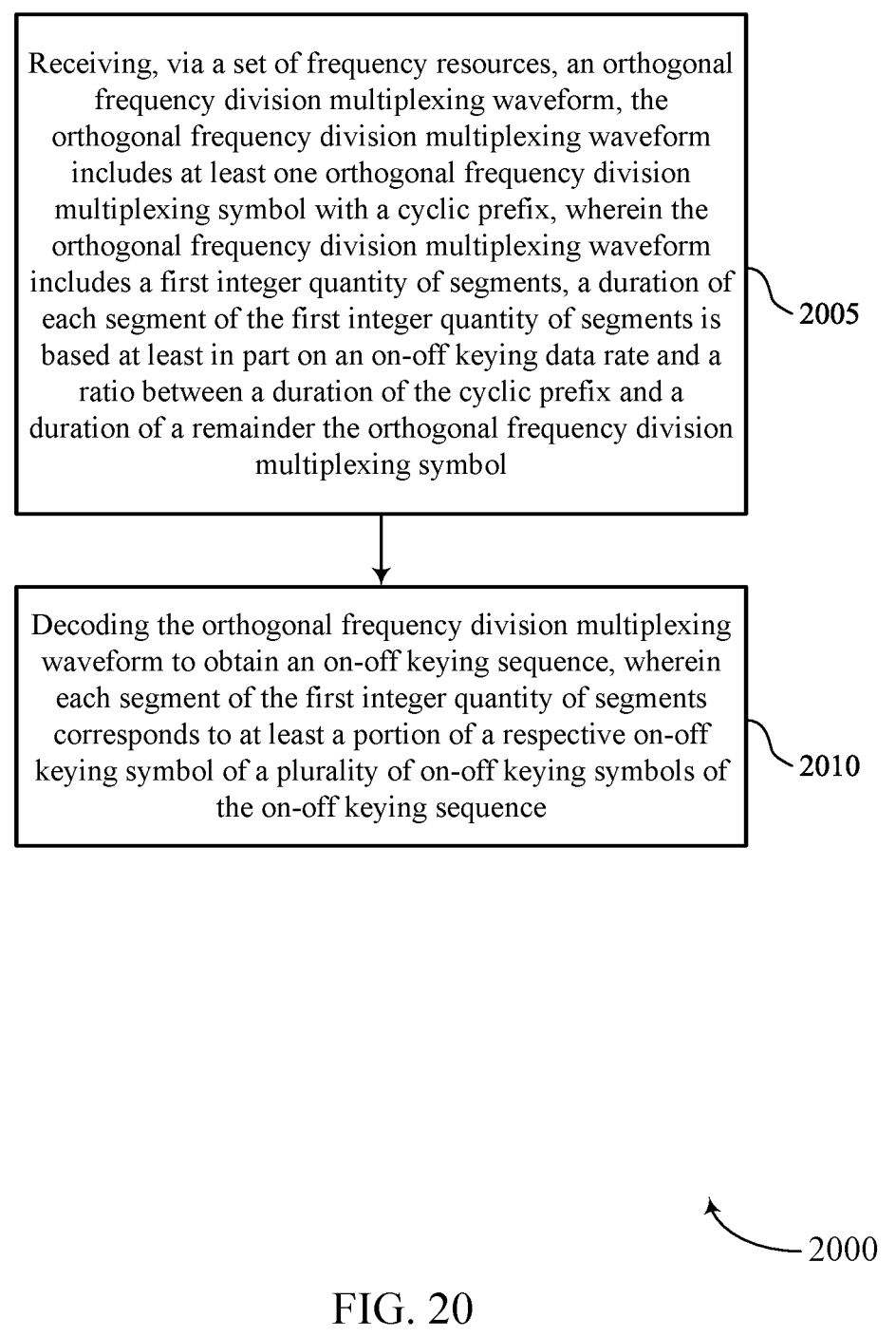

Receiving, via a set of frequency resources, an orthogonal frequency division multiplexing waveform, the orthogonal frequency division multiplexing waveform includes at least one orthogonal frequency division multiplexing symbol with a cyclic prefix, wherein the orthogonal frequency division multiplexing waveform includes a first integer quantity of segments, a duration of each segment of the first integer quantity of segments is based at least in part on an on-off keying data rate and a ratio between a duration of the cyclic prefix and a duration of a remainder the orthogonal frequency division multiplexing symbol

2005

Decoding the orthogonal frequency division multiplexing waveform to obtain an on-off keying sequence, wherein each segment of the first integer quantity of segments corresponds to at least a portion of a respective on-off keying symbol of a plurality of on-off keying symbols of the on-off keying sequence

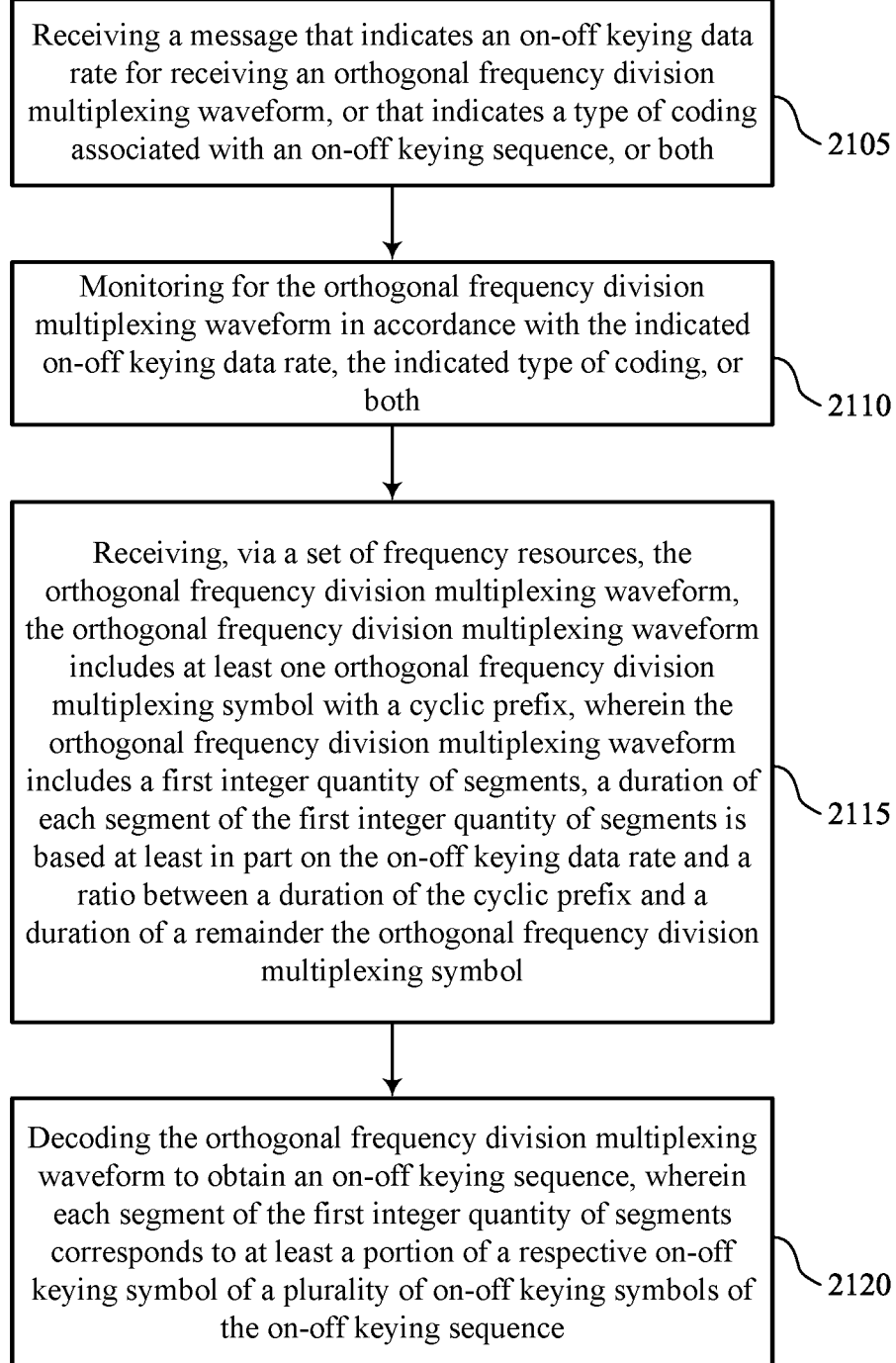

Receiving a message that indicates an on-off keying data rate for receiving an orthogonal frequency division multiplexing waveform, or that indicates a type of coding associated with an on-off keying sequence, or both

2105

Monitoring for the orthogonal frequency division multiplexing waveform in accordance with the indicated on-off keying data rate, the indicated type of coding, or both

2110

Receiving, via a set of frequency resources, the orthogonal frequency division multiplexing waveform, the orthogonal frequency division multiplexing waveform includes at least one orthogonal frequency division multiplexing symbol with a cyclic prefix, wherein the orthogonal frequency division multiplexing waveform includes a first integer quantity of segments, a duration of each segment of the first integer quantity of segments is based at least in part on the on-off keying data rate and a ratio between a duration of the cyclic prefix and a duration of a remainder the orthogonal frequency division multiplexing symbol

2115

Decoding the orthogonal frequency division multiplexing waveform to obtain an on-off keying sequence, wherein each segment of the first integer quantity of segments corresponds to at least a portion of a respective on-off keying symbol of a plurality of on-off keying symbols of the on-off keying sequence

TECHNIQUES FOR CONVEYING ON-OFF KEYING SIGNALING VIA ORTHOGONAL FREQUENCY DIVISION MULTIPLEXING WAVEFORMS

FIELD OF DISCLOSURE

The present disclosure, for example, relates to wireless communication systems, including techniques for conveying on-off keying (OOK) signaling via orthogonal frequency domain multiplexing (OFDM) waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread OFDM (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for conveying on-off keying (OOK) signaling via orthogonal frequency domain multiplexing (OFDM) waveforms. For example, the described techniques provide for a network entity to map OOK symbols of an OOK sequence to an OFDM waveform. The OFDM waveform may include at least one OFDM symbol with a cyclic prefix. The network entity may divide the OFDM waveform into an integer quantity of segments. The integer quantity of segments may be based on a target data rate for transmitting the waveform. A duration of each segment of the first integer quantity of segments of the OFDM waveform may be based on the OOK data rate and a ratio between a duration of the cyclic prefix and a duration of a remainder of the OFDM symbol. The network entity may map each OOK symbol of the OOK sequence to at least one segment of the integer quantity of segments of the OFDM waveform based on the target data rate. The network entity may transmit the OFDM waveform to a user equipment (UE) via a set of frequency resources (e.g., a frequency sub-band). The UE may receive the OFDM waveform, and the UE may decode the OFDM waveform to obtain the OOK sequence. For example, the UE may decode each segment of the integer quantity of segments of the OFDM waveform to identify at least a portion of a respective OOK symbol of the OOK sequence that is mapped to the respective segment. The network entity and the UE may thereby exchange information mapped to OOK sequences via OFDM waveforms with improved reliability and throughput.

A method for wireless communication at a network entity is described. The method may include mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate and transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

An apparatus for wireless communication at a network entity is described. The apparatus may include a processor, memory coupled with the processor, and instructions stored in the memory. The instructions may be executable by the processor to cause the apparatus to map a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate and transmit the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

Another apparatus for wireless communication at a network entity is described. The apparatus may include means for mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate and means for transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

A non-transitory computer-readable medium storing code for wireless communication at a network entity is described. The code may include instructions executable by a processor to map a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate and transmit the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

Some examples of the method, apparatuses, and non-transitory computer-readable medium described herein may further include operations, features, means, or instructions for determining the OOK data rate based on the ratio between the duration of the cyclic prefix and the duration of the remainder of the OFDM symbol, where the cyclic prefix includes a second integer quantity of segments and the OFDM symbol includes a third integer quantity of segments based on the determined OOK data rate, the first integer quantity equal to a sum of the second integer quantity and the third integer quantity.

Some examples of the method, apparatuses, and non-transitory computer-readable medium described herein may further include operations, features, means, or instructions for transmitting a message that indicates the OOK data rate for transmitting the OFDM waveform, or that indicates a type of coding associated with the OOK sequence, or both.

Some examples of the method, apparatuses, and non-transitory computer-readable medium described herein may further include operations, features, means, or instructions for receiving a message that indicates one or more parameters associated with a UE in communication with the network entity, where the one or more parameters include a signal-to-noise ratio (SNR) measured by the UE, a velocity of the UE, or both and determining the OOK data rate for transmitting the OFDM waveform, or a type of coding for generating the OOK sequence, or both based on the one or more parameters.

Some examples of the method, apparatuses, and non-transitory computer-readable medium described herein may further include operations, features, means, or instructions for determining a second integer quantity of segments of the OFDM waveform based on the ratio between duration of the cyclic prefix and the duration of the OFDM symbol and a subcarrier spacing for communications by the network entity, where the second integer quantity of segments may be associated with a base OOK data rate, and where the cyclic prefix includes a first segment of the second integer quantity of segments and the OFDM symbol includes a remainder of the second integer quantity of segments in accordance with the base OOK data rate.

In some examples of the method, apparatuses, and non-transitory computer-readable medium described herein, transmitting the OFDM waveform may include operations, features, means, or instructions for transmitting the OFDM waveform in accordance with the base OOK data rate, where the OOK data rate may be equal to the base OOK data rate and the first integer quantity of segments of the OFDM waveform may be equal to the second integer quantity of segments associated with the base OOK data rate, and where the first segment included in the cyclic prefix includes a same OOK symbol as a final segment of the OFDM symbol.

Some examples of the method, apparatuses, and non-transitory computer-readable medium described herein may further include operations, features, means, or instructions for multiplying the base OOK data rate by an integer multiplier to obtain the OOK data rate, the OOK data rate associated with more OOK symbols per OFDM symbol than the base OOK data rate based on the multiplying, where the first integer quantity of segments of the OFDM waveform may be equal to a product of the second integer quantity of segments associated with the base OOK data rate and the integer multiplier, and where each OOK symbol of the set of multiple OOK symbols may be mapped to a respective segment of the first integer quantity of segments.

In some examples of the method, apparatuses, and non-transitory computer-readable medium described herein, the cyclic prefix includes a quantity of segments that may be equal to the integer multiplier and a set of OOK symbols conveyed via the quantity of segments of the cyclic prefix may be also conveyed via a same quantity of segments of a final portion of the OFDM waveform.

Some examples of the method, apparatuses, and non-transitory computer-readable medium described herein may further include operations, features, means, or instructions for dividing the base OOK data rate or a product of the base OOK data rate and an integer multiplier by an integer divisor to obtain the OOK data rate, the OOK data rate associated with fewer OOK symbols per OFDM symbol than the base OOK data rate or the product of the base OOK data rate and the integer multiplier based on the dividing, where the first integer quantity of segments of the OFDM waveform may be equal to the second integer quantity of segments associated with the base OOK data rate or a product of the second integer quantity and the integer multiplier, and where each OOK symbol of the set of multiple OOK symbols may be mapped to a subset of the first integer quantity of segments, the subset including a quantity of segments equal to the integer divisor.

In some examples of the method, apparatuses, and non-transitory computer-readable medium described herein, the OFDM waveform includes at least a first quantity of OFDM symbol and cyclic prefix pairs, the first quantity equal to the integer divisor based on the OOK data rate and a final subset of segments of each OFDM symbol and cyclic prefix pair conveys at least a portion of an OOK symbol that may be the same as a portion of an OOK symbol conveyed via a beginning subset of segments of each OFDM symbol and cyclic prefix pair.

In some examples of the method, apparatuses, and non-transitory computer-readable medium described herein, each OOK symbol of the set of multiple OOK symbols indicates a value of zero or a value of one, transmitting energy via the OFDM waveform for an OOK symbol duration corresponds to the value of one, and refraining from transmitting the energy via the OFDM waveform for the OOK symbol duration corresponds to the value of zero.

In some examples of the method, apparatuses, and non-transitory computer-readable medium described herein, a pair of two OOK symbols of the set of multiple OOK symbols indicates a value of zero or a value of one based on a Manchester coding scheme, a first OOK symbol of the pair of two OOK symbols includes an absence of energy trans-mitted via the OFDM waveform during a corresponding OOK symbol duration, a second OOK symbol of the pair of two OOK symbols includes a presence of energy transmitted via the OFDM waveform during a corresponding OOK symbol duration, and an order of the first OOK symbol and the second OOK symbol in time indicates the value of zero or the value of one.

In some examples of the method, apparatuses, and non-transitory computer-readable medium described herein, mapping the set of multiple OOK symbols to the OFDM waveform may include operations, features, means, or instructions for mapping each of the first OOK symbol or the second OOK symbol to at least one segment of the first integer quantity of segments based on the Manchester coding scheme and the OOK data rate.

In some examples of the method, apparatuses, and non-transitory computer-readable medium described herein, the duration of each segment of the first integer quantity of segments may be further based on a subcarrier spacing (SCS) for communications by the network entity and a quantity of OFDM symbols and corresponding cyclic prefixes in the OFDM waveform may be based on the duration of each segment and the OOK data rate.

In some examples of the method, apparatuses, and non-transitory computer-readable medium described herein, transmitting the OFDM waveform may include operations, features, means, or instructions for multiplexing the set of frequency resources in a frequency domain with other sets of frequency resources for conveying data channels, where a second set of frequency resources that may be next to the set of frequency resources in the frequency domain include guard bands to separate the set of frequency resources from the other sets of frequency resources for conveying the data channels.

Some examples of the method, apparatuses, and non-transitory computer-readable medium described herein may further include operations, features, means, or instructions for modulating a set of bits associated with a wake-up signal (WUS) into the OOK sequence, the WUS indicating a request for a UE to operate in a wake mode for communications with the network entity, where the OFDM waveform conveys the WUS to the UE.

A method for wireless communication at UE is described. The method may include receiving, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol and decoding the OFDM waveform to obtain an OOK sequence, where each segment of the first integer quantity of segments corresponds to at least a portion of a respective OOK symbol of a set of multiple OOK symbols of the OOK sequence.

An apparatus for wireless communication at UE is described. The apparatus may include a processor, memory coupled with the processor, and instructions stored in the memory. The instructions may be executable by the processor to cause the apparatus to receive, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol and decode the OFDM waveform to obtain an OOK sequence, where each segment of the first integer quantity of segments corresponds to at least a portion of a respective OOK symbol of a set of multiple OOK symbols of the OOK sequence.

Another apparatus for wireless communication at UE is described. The apparatus may include means for receiving, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol and means for decoding the OFDM waveform to obtain an OOK sequence, where each segment of the first integer quantity of segments corresponds to at least a portion of a respective OOK symbol of a set of multiple OOK symbols of the OOK sequence.

A non-transitory computer-readable medium storing code for wireless communication at UE is described. The code may include instructions executable by a processor to receive, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol and decode the OFDM waveform to obtain an OOK sequence, where each segment of the first integer quantity of segments corresponds to at least a portion of a respective OOK symbol of a set of multiple OOK symbols of the OOK sequence.

In some examples of the method, apparatuses, and non-transitory computer-readable medium described herein, the OOK data rate may be based on the ratio between the duration of the cyclic prefix and the duration of the remainder of the OFDM symbol and the cyclic prefix includes a second integer quantity of segments and the OFDM symbol includes a third integer quantity of segments based on the OOK data rate, the first integer quantity equal to a sum of the second and third integer quantities.

Some examples of the method, apparatuses, and non-transitory computer-readable medium described herein may further include operations, features, means, or instructions for receiving a message that indicates the OOK data rate for receiving the OFDM waveform, or that indicates a type of coding associated with the OOK sequence, or both and monitoring for the OFDM waveform in accordance with the indicated OOK data rate, the indicated type of coding, or both.

Some examples of the method, apparatuses, and non-transitory computer-readable medium described herein may further include operations, features, means, or instructions for transmitting signaling that indicates a capability of the UE to monitor for a second OFDM waveform in accordance with a second OOK data rate, a second type of coding, or both based on one or more parameters associated with the UE and monitoring for the second OFDM waveform in accordance with the second OOK data rate, the second type of coding, or both based on the one or more parameters associated with the UE satisfying a threshold.

Some examples of the method, apparatuses, and non-transitory computer-readable medium described herein may further include operations, features, means, or instructions for transmitting a message that indicates one or more parameters associated with the UE, where the one or more parameters include a signal-to-noise ratio measured by the UE, a velocity of the UE, or both, and where the OOK data rate associated with the OFDM waveform, a type of coding associated with the OOK sequence, or both may be based on the one or more parameters.

In some examples of the method, apparatuses, and non-transitory computer-readable medium described herein, the first integer quantity of segments of the OFDM waveform may be based on the OOK data rate and an SCS for communications by the UE.

In some examples of the method, apparatuses, and non-transitory computer-readable medium described herein, each OOK symbol of the set of multiple OOK symbols indicates a value of zero or a value of one and determining whether an OOK symbol of the set of multiple OOK symbols corresponds to the value of one or the value of zero based on an amount of energy detected via the OFDM waveform during a corresponding OOK symbol duration.

In some examples of the method, apparatuses, and non-transitory computer-readable medium described herein, each pair of two OOK symbols of the set of multiple OOK symbols indicates a value of zero or a value of one based on a Manchester coding scheme and the method, apparatuses, and non-transitory computer-readable medium may include further operations, features, means, or instructions for determining whether a first pair of two OOK symbols corresponds to the value of zero or the value of one based on a first amount of energy detected via a first OOK symbol duration corresponding to a first OOK symbol of the first pair and a second amount of energy detected via a second OOK symbol duration corresponding to a second OOK symbol of the first pair.

In some examples of the method, apparatuses, and non-transitory computer-readable medium described herein, each of the first OOK symbol and the second OOK symbol of the first pair may be mapped to at least one segment of the first integer quantity of segments based on the Manchester coding scheme and the OOK data rate.

In some examples of the method, apparatuses, and non-transitory computer-readable medium described herein, the duration of each segment of the first integer quantity of segments may be further based on a subcarrier spacing for communications by UE and a quantity of OFDM symbols and corresponding cyclic prefixes in the OFDM waveform may be based on the duration of each segment and the OOK data rate.

In some examples of the method, apparatuses, and non-transitory computer-readable medium described herein, receiving the OFDM waveform may include operations, features, means, or instructions for receiving the OFDM waveform via the set of frequency resources multiplexed in a frequency domain with other sets of frequency resources conveying data channels, where a second set of frequency resources that may be next to the set of frequency resources in the frequency domain include guard bands to separate the set of frequency resources from the other sets of frequency resources for conveying the data channels.

Some examples of the method, apparatuses, and non-transitory computer-readable medium described herein may further include operations, features, means, or instructions for transitioning from a sleep mode of the UE to a wake mode of the UE based on a WUS conveyed via the OFDM waveform, where the OOK sequence may be modulated with a set of bits associated with the WUS.

BRIEF DESCRIPTION OF THE DRAWINGS

FIG. 4 illustrates an example of an OOK mapping table that supports techniques for conveying OOK signaling via OFDM waveforms in accordance with various aspects of the present disclosure.

FIGS. 6A and 6B illustrate examples of OOK mapping tables that support techniques for conveying OOK signaling via OFDM waveforms in accordance with various aspects of the present disclosure.

FIG. 7 illustrates an example of an OOK mapping table that supports techniques for conveying OOK signaling via OFDM waveforms in accordance with various aspects of the present disclosure.

8

Figure 8:
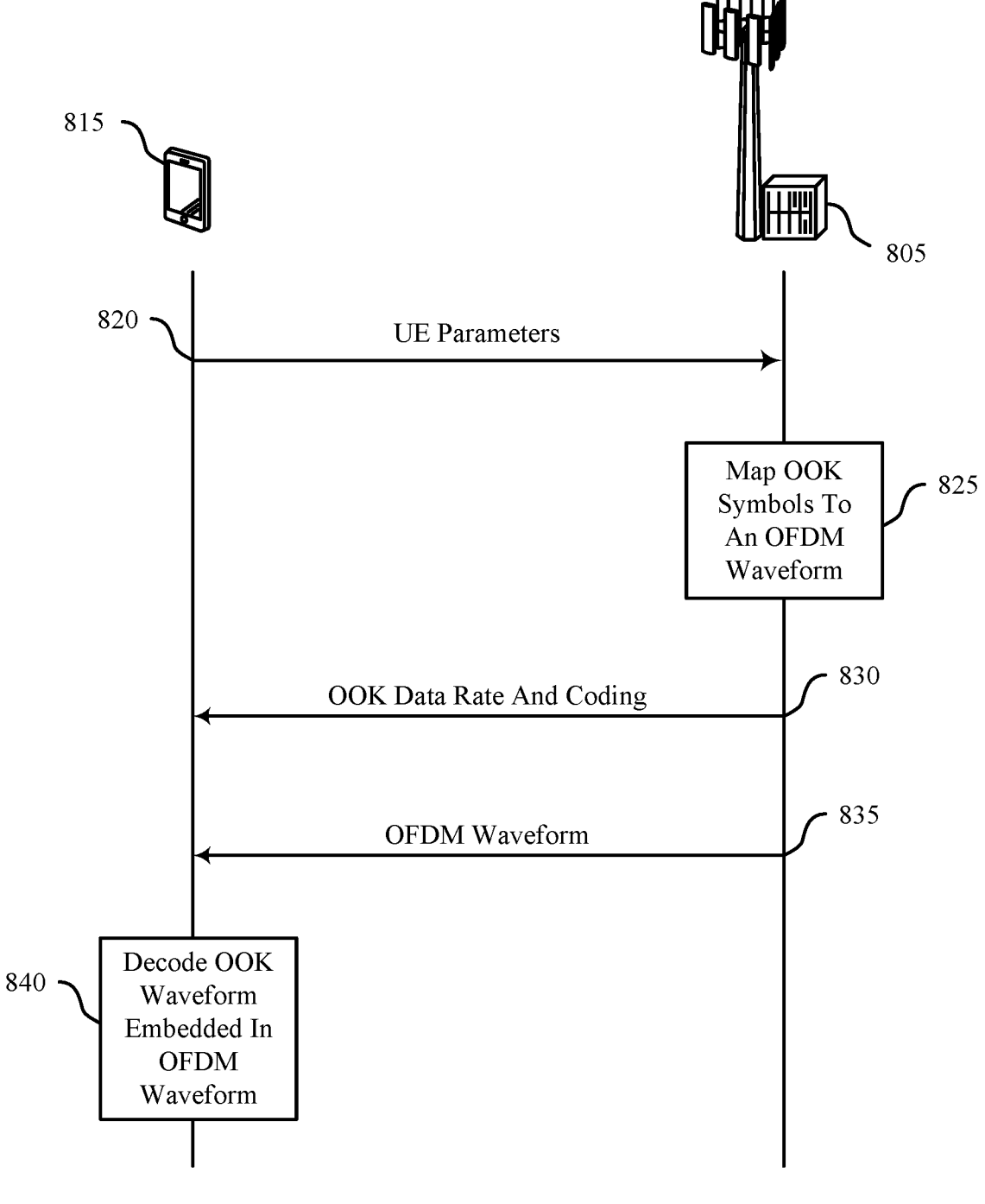

FIG. 8 illustrates an example of a process flow that supports techniques for conveying OOK signaling via OFDM waveforms in accordance with various aspects of the present disclosure.

Figure 9:
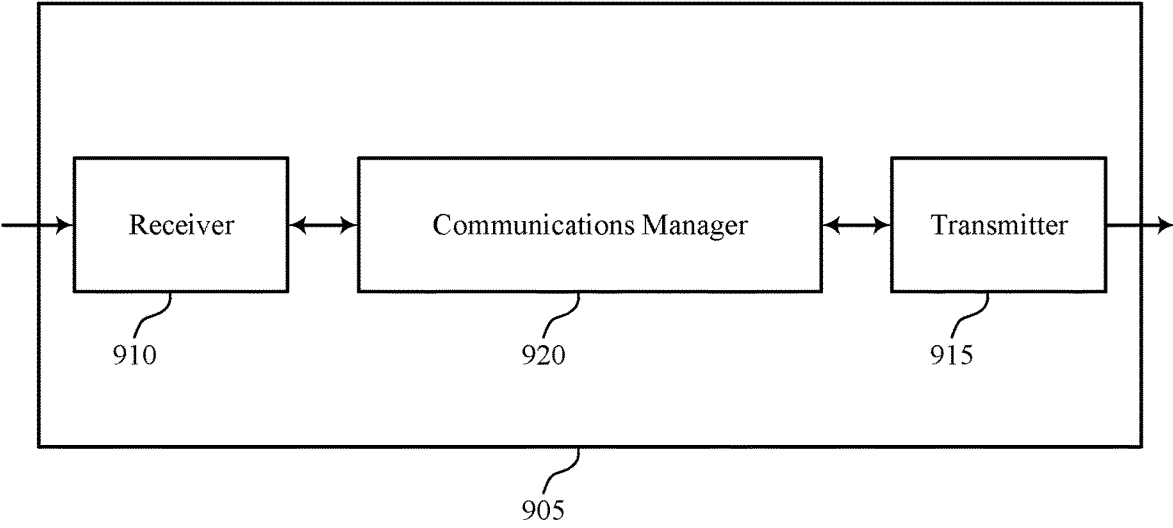
Figure 10:
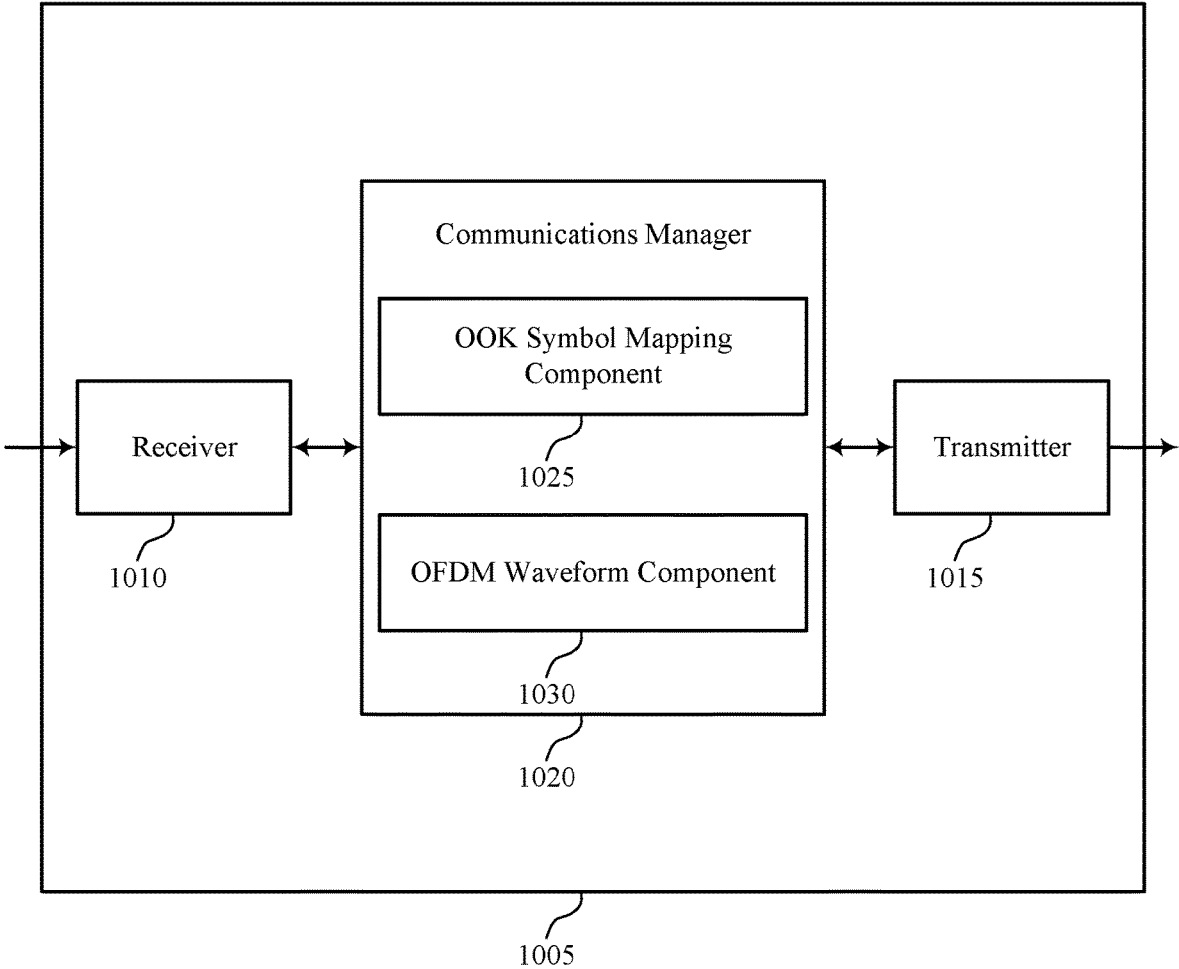

FIGS. 9 and 10 show block diagrams of devices that support techniques for conveying OOK signaling via OFDM waveforms in accordance with various aspects of the present disclosure.

Figure 11:
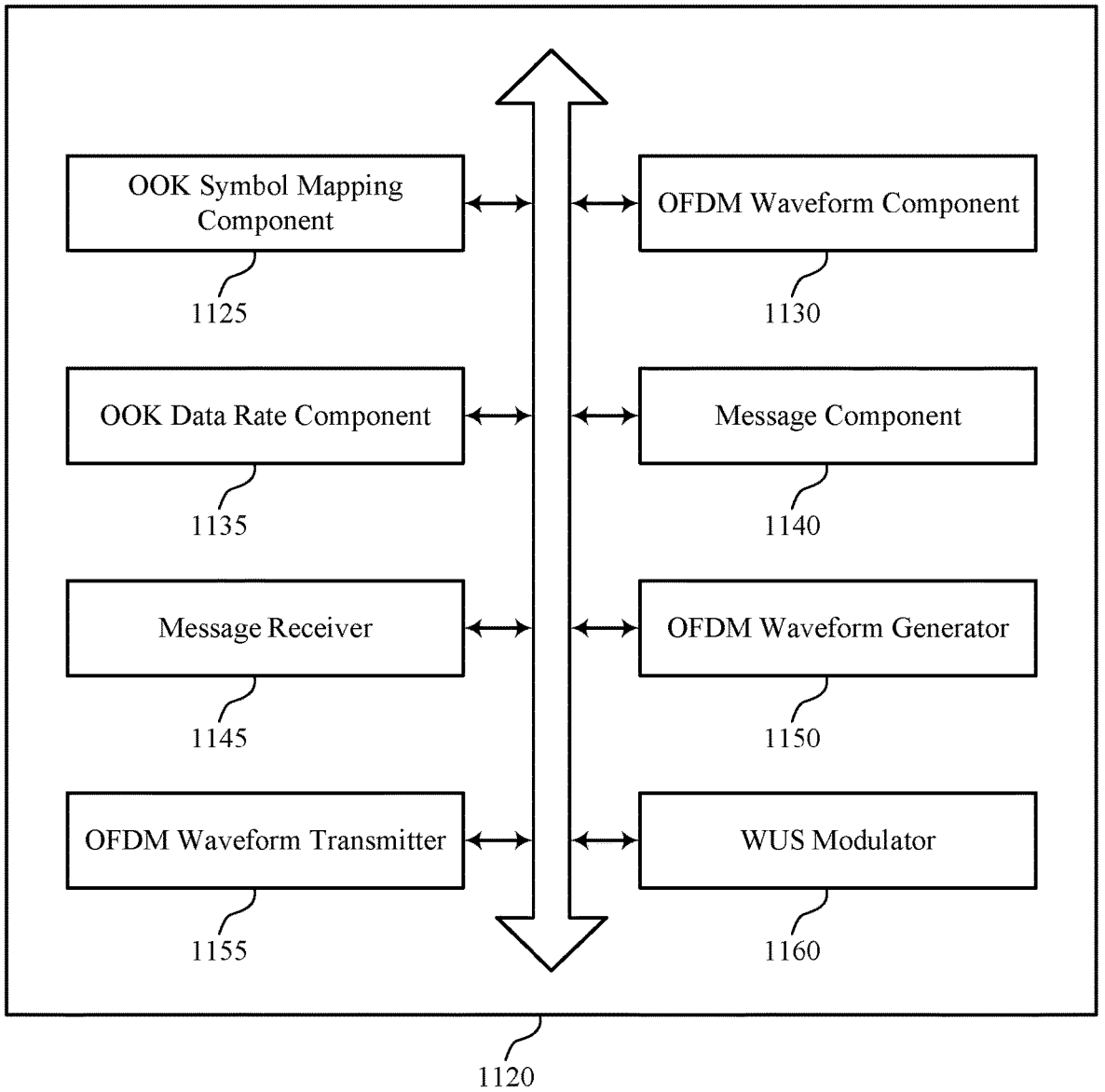

FIG. 11 shows a block diagram of a communications manager that supports techniques for conveying OOK signaling via OFDM waveforms in accordance with various aspects of the present disclosure.

Figure 12:

FIG. 12 shows a diagram of a system including a device that supports techniques for conveying OOK signaling via OFDM waveforms in accordance with various aspects of the present disclosure.

Figure 13:
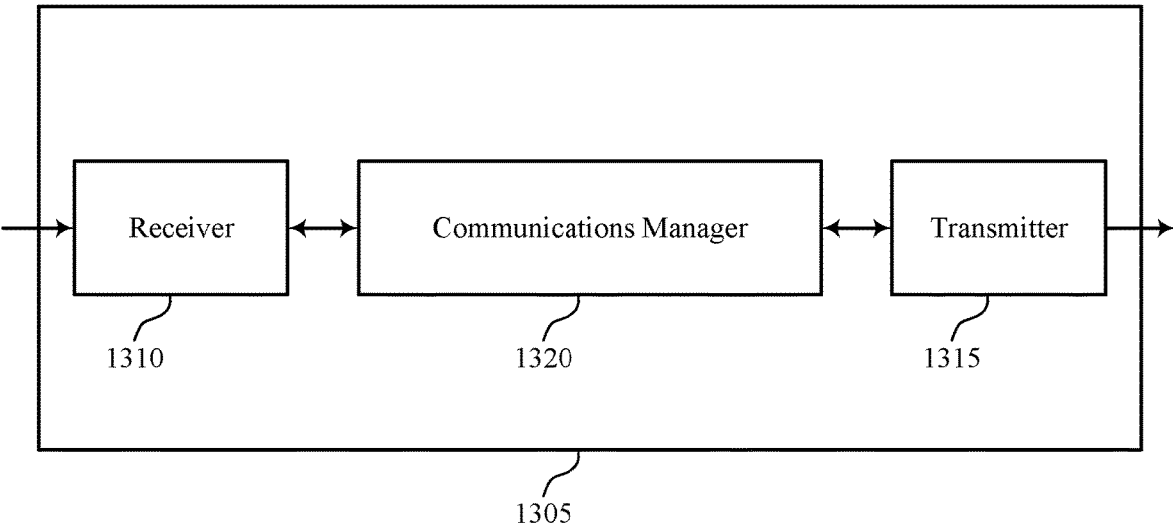
Figure 14:
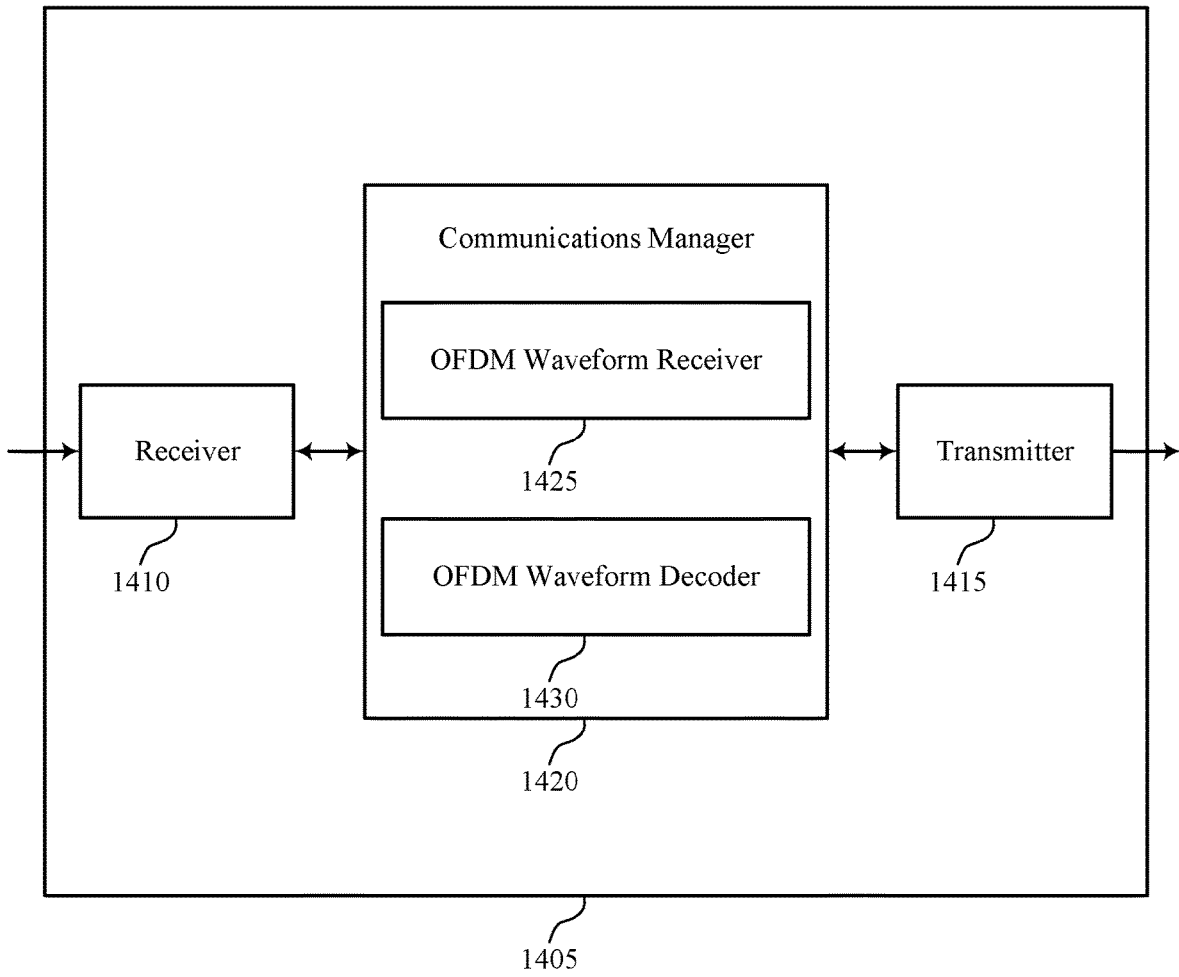

FIGS. 13 and 14 show block diagrams of devices that support techniques for conveying OOK signaling via OFDM waveforms in accordance with various aspects of the present disclosure.

Figure 15:
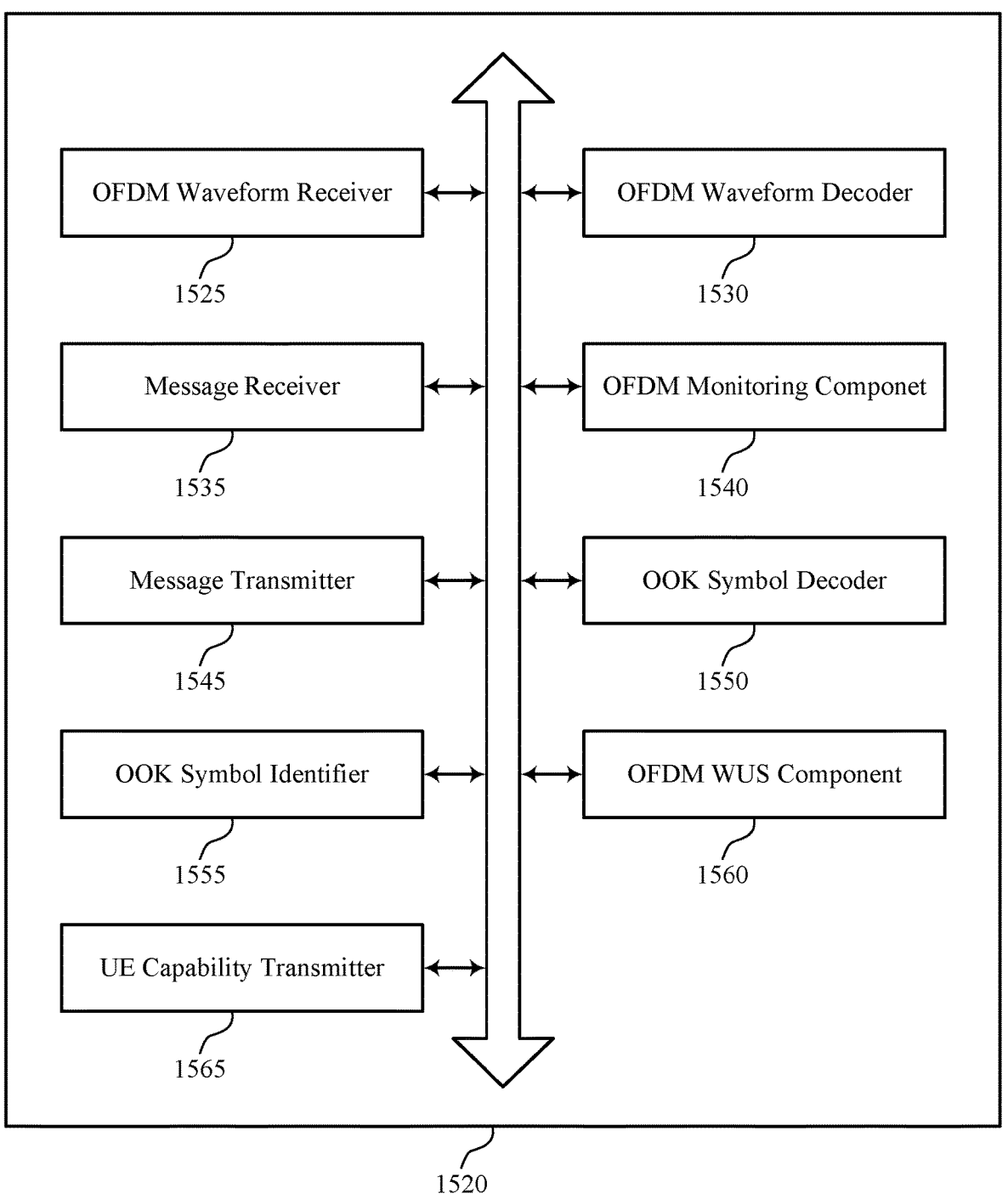

FIG. 15 shows a block diagram of a communications manager that supports techniques for conveying OOK signaling via OFDM waveforms in accordance with various aspects of the present disclosure.

Figure 16:
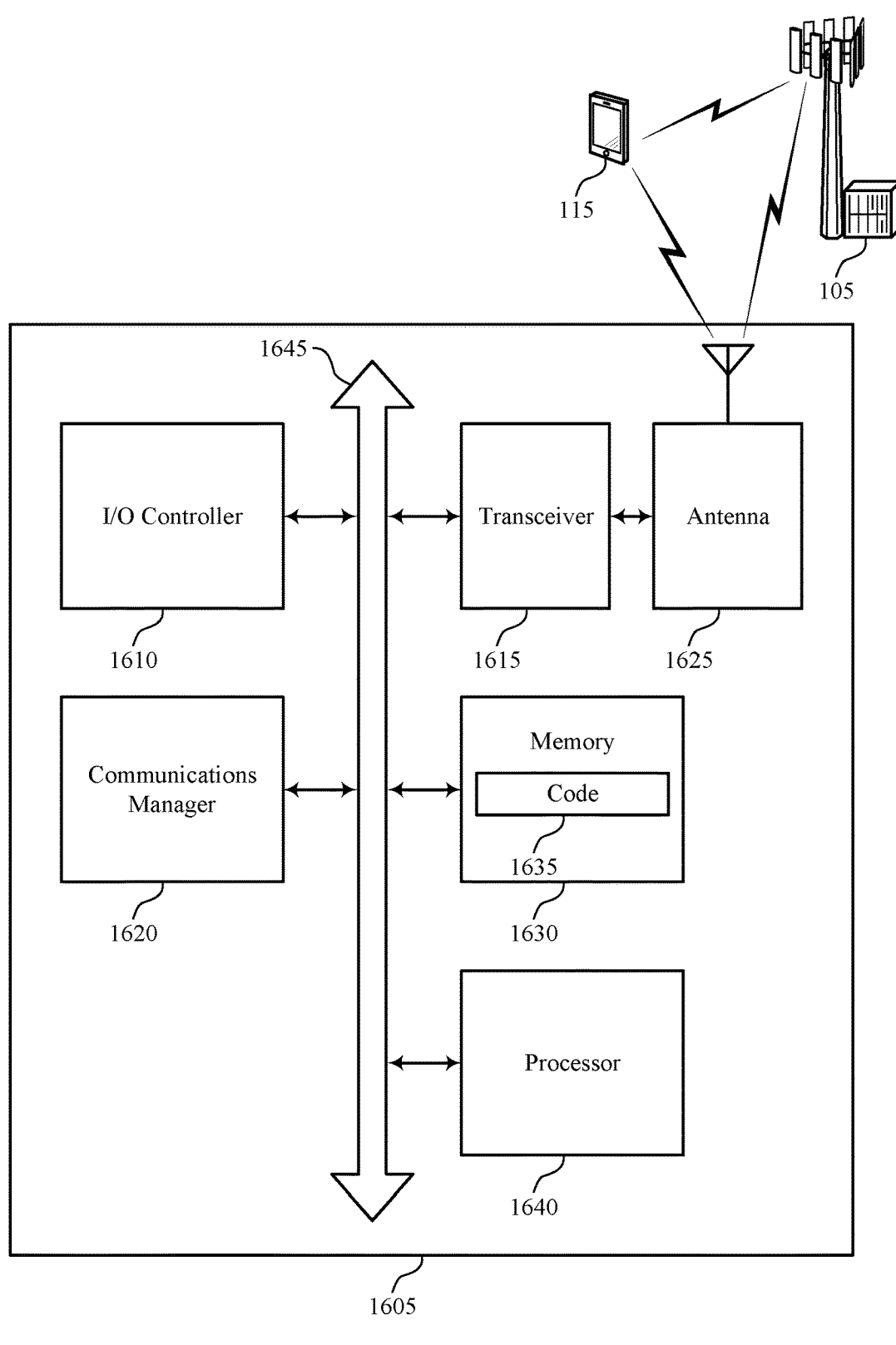

FIG. 16 shows a diagram of a system including a device that supports techniques for conveying OOK signaling via OFDM waveforms in accordance with various aspects of the present disclosure.

FIGS. 17 through 21 show flowcharts illustrating methods that support techniques for conveying OOK signaling via OFDM waveforms in accordance with various aspects of the present disclosure.

DETAILED DESCRIPTION

In some systems, information exchanged between a user equipment (UE) and a network entity may be modulated in accordance with an on-off keying (OOK) modulation scheme. For example, a wake up signal (WUS), which may be used to trigger a UE to enter a wake mode when a network entity has data to transmit to the UE, may be modulated in accordance with the OOK modulation scheme. Each OOK symbol in an OOK sequence may represent at least a portion of a logical bit. For example, transmission of energy during an OOK symbol duration may represent a logical 1 and an absence of energy transmitted during the OOK symbol duration (e.g., an idle or off period) may represent a logical 0. In some aspects, Manchester coding may be applied to the OOK modulation. In such cases, a pair of two OOK symbols may represent a logical bit. A transition between an absence of energy and a presence of energy, or vice versa, across the pair of two OOK symbols may represent the value of the logic bit (e.g., a logical 0 or a logical 1). The devices may transmit uplink or downlink signals that convey information modulated into an OOK sequence by multiplexing the uplink or downlink signals with other channels, such as orthogonal frequency domain multiplexing (OFDM) channels.

To maintain orthogonality between the signals conveying the OOK sequence (e.g., a WUS or some other signal) and the other OFDM channels, the OOK signals may be generated in accordance with a symbol generation process that is the same as or similar to a symbol generation process for the other OFDM channels. For example, the OOK sequences may be mapped to an OFDM symbol that includes a cyclic prefix. However, mapping OOK symbols to a cyclic prefix and OFDM symbol structure may increase complexity and reduce reliability of communications, in some examples.

Aspects of the present disclosure may describe techniques for mapping OOK symbols of an OOK sequence to an OFDM waveform. The OFDM waveform may include at least one OFDM symbol with a corresponding cyclic prefix. The techniques described herein provide for the OFDM waveform to be divided into an integer quantity of segments. The integer quantity of segments may be based on (e.g., the same as or an integer multiple of) a ratio between a duration of the cyclic prefix and a duration of a remainder of the OFDM symbol. A duration of each segment may also be based on the ratio and a subcarrier spacing (SCS) configured for the communications. A transmitting device, such as a network entity, may map each OOK symbol of the OOK sequence to at least one of the segments. The mapping of the OOK symbols to the OOK sequence may be based on a target data rate for the OOK signaling. Thus, each OFDM symbol and cyclic prefix may include an integer quantity of OOK symbols and may support a variety of target data rates, which may support compatibility between an OOK modulation structure and an OFDM waveform structure while reducing complexity and improving reliability of the signaling.

In some examples, multiple data rates for the OOK signaling (e.g., OOK data rates) may be obtained using the described techniques. For example, a base data rate may be achieved by dividing an OFDM symbol into a quantity of segments each having a duration that is approximately the same as a duration of the cyclic prefix for the OFDM symbol. To perform communications according to the base data rate, a device may transmit each OOK symbol via a single segment of the OFDM waveform. In some examples, higher data rates may be achieved by multiplying the quantity of segments associated with the base data rate by an integer multiplier and mapping each OOK symbol to a respective segment. The higher data rates may be equal to a product of the base data rate and the integer. In some other examples, data rates that are higher or lower than the base data rate may be achieved by dividing the base data rate, or a product of the base data rate and an integer multiplier, by an integer divisor. In this case, the quantity of segments in each OFDM symbol may be the same as the base rate or a product of the base rate and an integer multiplier, and each OOK symbol may be mapped to a subset of one or more of segments. A quantity of segments included in the subset may be equal to the integer divisor. In some cases, a UE and a network entity may exchange signaling to indicate a data rate to be used for conveying an OOK sequence, whether Manchester coding is applied to the sequence, one or more conditions or communication parameters associated with the data rate and the OOK signaling, or any combination thereof.

Aspects of the disclosure are initially described in the context of wireless communications systems. Additional aspects of the disclosure are described with reference to an OOK signaling diagram, OOK mapping tables, and a process flow. Aspects of the disclosure are further illustrated by and described with reference to apparatus diagrams, system diagrams, and flowcharts that relate to techniques for conveying OOK signaling via OFDM waveforms.

Figure 1:
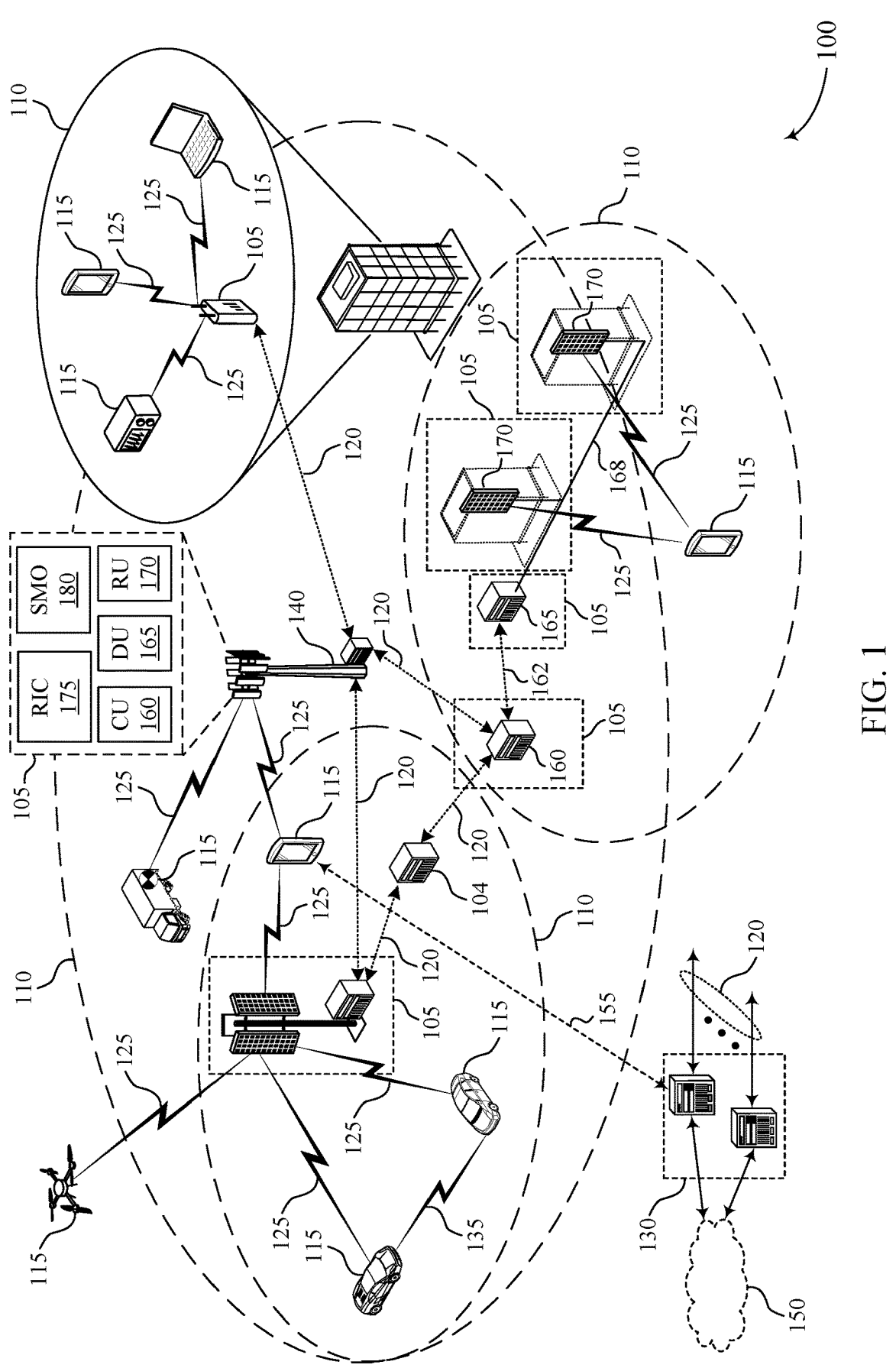
FIG. 1 illustrates an example of a wireless communications system that supports techniques for conveying on-off keying (OOK) signaling via orthogonal frequency domain multiplexing (OFDM) waveforms in accordance with various aspects of the present disclosure.

FIG. 1 illustrates an example of a wireless communications system 100 that supports techniques for conveying OOK signaling via OFDM waveforms in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for conveying OOK signaling via OFDM waveforms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNB s or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell may, for example, cover a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), unlicensed radio frequency spectrum band technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communication system 100, a network entity 105 may modulate information for transmission to a UE 115 using OOK modulation. For example, the network entity 105 may transmit a WUS that is modulated using OOK modulation. Each OOK symbol in an OOK sequence may represent at least a portion of a logical bit. For example, transmission of energy during an OOK symbol duration may represent a logical 1 and an absence of energy transmitted during the OOK symbol duration (e.g., an idle or off period) may represent a logical 0. In some aspects, Manchester coding may be applied to the OOK modulation. In such cases, a pair of two OOK symbols may represent a logical bit. A transition between an absence of energy and a presence of energy, or vice versa, across the pair of two OOK symbols may represent the value of the logic bit (e.g., a logical 0 or a logical 1). The devices may transmit uplink or downlink signals that convey information modulated into an OOK sequence by multiplexing the uplink or downlink signals with other channels, such as OFDM channels.

To maintain orthogonality between the signals conveying the OOK sequence (e.g., a WUS or some other signal) and the other OFDM channels, the OOK signals may be generated in accordance with a symbol generation process that is the same as or similar to a symbol generation process for the other OFDM channels. For example, the OOK sequences may be mapped to an OFDM symbol that includes a cyclic prefix. However, mapping OOK symbols to a cyclic prefix and OFDM symbol structure may increase complexity and reduce reliability of communications, in some examples.

Aspects of the present disclosure may describe techniques for mapping OOK symbols of an OOK sequence to an OFDM waveform. The OFDM waveform may include at least one OFDM symbol with a corresponding cyclic prefix. The techniques described herein provide for the OFDM waveform to be divided into an integer quantity of segments. The integer quantity of segments may be based on (e.g., the same as or an integer multiple of) a ratio between a duration of the cyclic prefix and a duration of a remainder of the OFDM symbol. A duration of each segment may also be based on the ratio and a SCS configured for the communications. A transmitting device, such as a network entity 105, may map each OOK symbol of the OOK sequence to at least one of the segments. The mapping of the OOK symbols to the OOK sequence may be based on a target data rate for the OOK signaling. Thus, each OFDM symbol and cyclic prefix may include an integer quantity of OOK symbols and may support a variety of target data rates, which may support compatibility between an OOK modulation structure and an OFDM waveform structure while reducing complexity and improving reliability of the signaling.

In some examples, multiple data rates for the OOK signaling (e.g., OOK data rates) may be obtained using the described techniques. For example, a base data rate may be achieved by dividing an OFDM symbol into a quantity of segments each having a duration that is approximately the same as a duration of the cyclic prefix for the OFDM symbol. To perform communications according to the base data rate, a device may transmit each OOK symbol via a single segment of the OFDM waveform. In some examples, data rates that are higher than the base data rate may be achieved by multiplying the quantity of segments associated with the base data rate by an integer multiplier and mapping each OOK symbol to a respective segment. The higher data rates may be equal to a product of the base data rate and the integer. In some other examples, data rates that are lower than the base data rate may be achieved by dividing the base data rate, or a product of the base data rate and an integer multiplier, by an integer divisor. In this case, the quantity of segments in each OFDM symbol may be the same as the base rate or a product of the base rate and the integer multiplier, and each OOK symbol may be mapped to a subset of one or more of segments. A quantity of segments included in the subset may be equal to the integer divisor. In some cases, a UE 115 and a network entity 105 may exchange signaling to indicate a data rate to be used for conveying an OOK sequence, whether Manchester coding is applied to the sequence, one or more conditions or communication parameters associated with the data rate and the OOK signaling, or any combination thereof.

Figure 2:
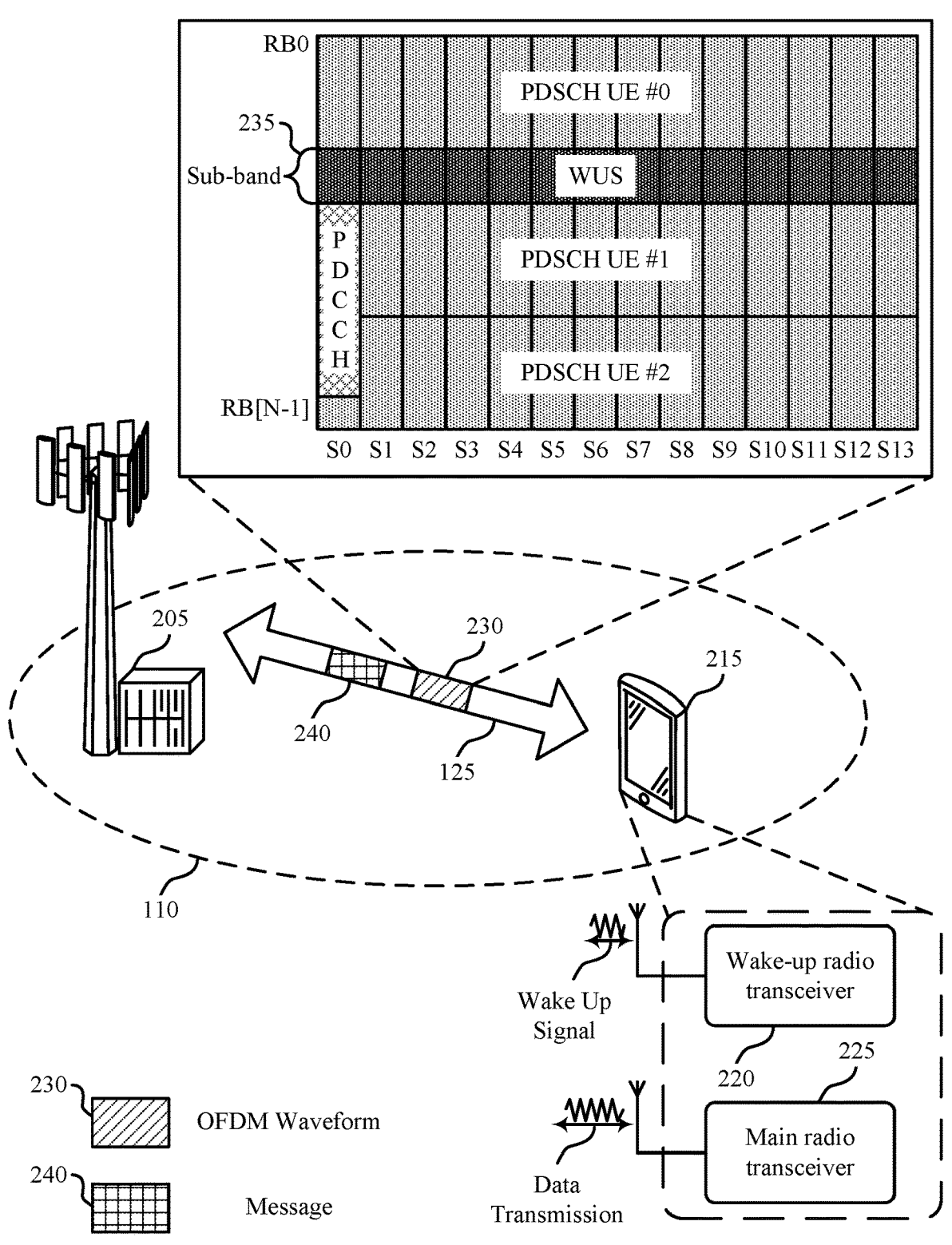
FIG. 2 illustrates an example of a wireless communication system that supports techniques for conveying OOK signaling via OFDM waveforms in accordance with various aspects of the present disclosure.

FIG. 2 illustrates an example of a wireless communication system 200 that supports techniques for conveying OOK signaling via OFDM waveforms in accordance with various aspects of the present disclosure. In some examples, the wireless communications system 200 may implement aspects of the wireless communications system 100 or may be implemented by aspects of the wireless communications system 100. For example, the wireless communications system 200 may include a UE 215 and a network entity 205, which may be examples of corresponding devices described herein. The network entity 205 may communicate with the UE 215 via a communication link 125 and within a geographic coverage area 110. In this example, the network entity 205 may modulate information for the UE 215 using an OOK modulation scheme and transmit the information via an OFDM waveform 230.

In some examples, the UE 215 may operate in a discontinuous reception (DRX) mode, where the UE 215 may periodically cycle between DRX on and DRX off durations of a DRX cycle. During the DRX on durations, the UE 215 may use a main radio transceiver 225 of the UE 215 to monitor for a WUS or other signaling indicating a scheduled transmission from the network entity 205. The network entity 205 may transmit a WUS to the UE 215 when the network entity 205 has data to communicate with the UE 215. In some cases, the UE 215 may utilize a wake-up radio transceiver 220 (which may be referred to as a low-power wake-up radio (LP-WUR) in some aspects herein), such that the UE 215 may continuously monitor for a WUS (e.g., even if the UE 215 is in a DRX off duration or if the UE 215 does not support DRX). The wake-up radio transceiver 220 may be associated with reduced power consumption as compared with the main radio transceiver 225 or other transceivers of the UE 215. Thus, utilizing the wake-up radio transceiver 220 to monitor for a WUS while the main radio transceiver 225 is deactivated may provide reduced power consumption as compared to using the main radio transceiver 225 continuously or during DRX on durations.

In response to detecting the WUS, the wake-up radio transceiver 220 may indicate, to a main microcontroller unit (MCU) interrupt of the UE 215, that the WUS was received (e.g., via an electrical signal or flag between the wake-up radio transceiver 220 and the MCU). The MCU interrupt, or the wake-up radio transceiver 220, or both may indicate the WUS to the main radio transceiver 225. The main radio transceiver 225 may be activated or "wake-up" to begin transmission and reception of data with the network entity 205 based on the WUS. That is, the UE 215 may transition from a lower power state or mode of operation (e.g., a sleep mode) using the wake-up radio transceiver 220 to a relatively higher power state or mode of operation (e.g., a wake mode) using the main radio transceiver 225 in response to a WUS.

In some examples, the network entity 205 may use OOK modulation to modulate the WUS or some other signaling for transmission to the UE 215. OOK modulation may be relatively efficient and may reduce transmission and reception complexity of the signaling as compared with other types of waveforms for conveying information such as a WUS. The network entity 205 may modulate information into an OOK sequence, where each OOK symbol of the OOK sequence may carry one logical bit. A logical one may be indicated by transmitting energy during an OOK symbol duration (e.g., an on period) and a logical zero may be indicated by no energy being transmitted during the OOK symbol duration (e.g., an off period). In some examples, Manchester coding may be applied to the OOK modulation. The Manchester coding may further simplify reception at the wake-up radio transceiver 220. OOK modulation with and without Manchester coding is described in further detail elsewhere herein, including with reference to FIG. 3.

OOK modulation may reduce complexity of a waveform. As such, OOK modulation may be useful for wake-up signaling or other relatively low power communications. For example, OOK signaling may be associated with a relatively simple waveform that may be supported by analog receivers (e.g., such as the wake-up radio transceiver 220). If the wake-up radio transceiver 220 is analog, power consumption by the wake-up radio transceiver 220 may be reduced as compared to a digital transceiver (e.g., the wake-up radio transceiver 220 may be analog to be considered a LP-WUR). OOK signaling may be supported by receivers that utilize non-coherent detection (e.g., an energy or envelope detector). Additionally, or alternatively, an OOK signal may have a relatively high tolerance for frequency or time errors thus reducing a quantity of times the UE 215 may wake up for time or frequency synchronization loops maintenance.

In some systems, a bandwidth allocated for relatively low power transmissions, such as a WUS, may be relatively small as compared with the available system bandwidth (e.g., one hundred kilohertz (KHz) may be reserved for wake-up signaling out of a ten hundred megahertz (MHz) system bandwidth, or some other quantities). For example, as illustrated in FIG. 2, a system bandwidth may occupy a set of RBs (e.g., RB0 through RB [N−1] illustrated in FIG. 2) in the frequency domain and a set of symbols (e.g., S0 through S13) in the time domain. The network entity 205, one or more other network entities (not pictured in FIG. 2), or any combination thereof may transmit one or more OFDM downlink channels via the available system bandwidth. The channels may be, for example, physical downlink control channels (PDCCHs), physical downlink shared channels (PDSCHs) (e.g., PDSCHs for one or more UEs, such as the PDSCHs for UEs 0 through 2), or some other types of channels.

In some cases, the WUS may be transmitted in accordance with a TDM scheme (e.g., the WUS may be transmitted during time periods at which other downlink channels are not transmitted). However, as the bandwidth allocated for the WUS may be relatively small compared to the bandwidth allocated for other downlink channels (e.g., PDSCH and PDCCH), it may be beneficial to embed an OOK waveform that conveys the WUS within the other OFDM transmissions (e.g., applying FDM to multiplex both the OOK WUS and the PDSCH or PDCCH in the frequency domain). As such, the WUS may be modulated into an OFDM waveform 230 and transmitted via a sub-band 235 of the system bandwidth. When multiplexing the WUS with the other downlink channels, it may be desired to maintain orthogonality between the different signals in order to reduce degradation of both the downlink channel performance and the WUS reception requirements. In some cases, to support the orthogonality of the signals in the system bandwidth and to reduce filtering at the receiver of the WUS, there may guard bands allocated around the sub-band 235. The guard bands (not illustrated in FIG. 2) may occupy a relatively small frequency range before and after the sub-band 235 in the frequency domain, which may reduce interference between the WUS transmitted via the sub-band 235 and the other downlink channels and may reduce filtering performed by the receiver to filter out non-WUS signals. The sub-band 235 and the corresponding guard bands may span across a quantity of subcarriers that include an integer quantity of resource blocks in the frequency domain. For example, if 24 subcarriers (e.g., two resource blocks) are used, 18 center subcarriers may be included in the sub-band 235 to convey the WUS and three subcarriers on each side of the center subcarriers may be used as guard subcarriers. It is to be understood that discussion of a WUS herein may refer to the WUS or the WUS and the guard bands in the frequency domain, if the guard bands are applied.

The use of the guard bands in conjunction with the sub-band 235 may support the WUS being accurately filtered from the OFDM waveform 230. For example, as the guard bands may create a gap in the OFDM waveform 230 between other downlink channels, the receiver may be able to filter the WUS more accurately from the other downlink channels than if the guard bands are not present. In some examples, the receiver may receive the OFDM waveform including the WUS in a nonlinear fashion (e.g., received through a compressed power amplifier) and the subcarriers may no longer be orthogonal. In such cases, the guard bands may add a separation between the other downlink channels and the sub-band 235 to prevent leakage of the WUS into the other downlink channels or vice-versa.

Additionally, or alternatively, orthogonality between the WUS and the other OFDM channels may be achieved by generating the WUS using the same OFDM symbol generation flow as other OFDM channels. The OFDM symbol generation may include modulating each signal included in the system bandwidth separately using a modulation and coding scheme as defined by the network entity 205. For example, the network entity 205 may use the OOK modulation scheme to modulate the WUS, and the network entity 205 may use other modulation schemes to modulate other data and control channels. Following the modulation, the separate signals may be multiplexed together in the frequency domain while remaining orthogonal to each other. OFDM may be a subset of FDM where in addition to modulating and multiplexing the signals included in a waveform, each signal may maintain orthogonality by using cyclic prefixes between OFDM symbols.

In some examples, when the WUS is multiplexed with the other downlink channels in the frequency domain, an inverse fast Fourier transform (IFFT) may be applied before transmission. Inputs to the IFFT may include the WUS and the other downlink channels in the frequency domain. The IFFT may output a time domain signal (e.g., the IFFT may translate a frequency domain signal to a time domain signal). The IFFT may be applied after the WUS and other downlink channels are multiplexed together in the frequency domain, such that a single frequency domain signal is provided to the IFFT. In some other examples, the IFFT may be applied to the WUS and the other downlink channels separately before the multiplexing, and the WUS and the other downlink channels may be multiplexed in the time domain after the IFFT to the individual signals. In some cases, the WUS, and the associated guard bands subcarriers, if allocated, may occupy a relatively small part of the available frequency domain resources (e.g., a few resource blocks in the frequency domain) with those resources resulting in the OOK waveform at the time domain (e.g., after the IFFT has been applied). As such, the remaining resource blocks may be used for the other downlink channel transmissions.

After applying the IFFT to the WUS and the other channels, a cyclic prefix may be added to the IFFT output. The cyclic prefix may be a copy of a final (e.g., last or ending) segment of an OFDM symbol in the time domain. If the IFFT is applied to the WUS and the other downlink channels separately, a cyclic prefix may be applied to each IFFT output (e.g., the output of each downlink channel and the WUS) before the signals are multiplexed in the time domain, or a common cyclic prefix may be applied after the signals are multiplexed in the time domain. If the IFFT is applied after the WUS and other downlink channels are multiplexed, a common cyclic prefix may also be added to the WUS and the other downlink channels following the IFFT. The cyclic prefix may be used to reduce interference between consecutive OFDM symbols in the OFDM waveform 230. In some cases, however, the addition of the cyclic prefix may cause various issues when mapping OOK symbols to an OFDM symbol of the OFDM waveform 230.

For example, in some cases, when mapping a single OOK symbol to an OFDM symbol, the OOK rate may be restricted to be equal to the OFDM symbol and cyclic prefix rate. In some other cases, the OOK signal may be mapped to the OFDM symbol parts of the OFDM symbol, excluding the cyclic prefix parts. In such cases, the OOK symbol timing may not be maintained, which may increase complexity of the wake-up radio transceiver 220. Additionally, or alternatively, due to the increased complexity, the wake-up radio transceiver 220 may not support analog signaling, which may increase power. In some other cases, the OOK waveform may be mapped to both the OFDM symbol parts and cyclic prefix parts. However, because a non-integer quantity of OOK symbols may be mapped to the OFDM symbol and cyclic prefix portions, the OOK symbol timing may not be maintained during the cyclic prefix parts, which may introduce a bit error rate floor to the OOK demodulation.

Techniques, systems, and devices described herein provide for a transmitting device (e.g., the network entity 205) to map an OOK sequence to an OFDM waveform 230 while achieving a target data rate. For example, the transmitting device may divide the OFDM waveform 230 into an integer quantity of segments each having a same or similar duration. The transmitting device may map each OOK symbol of the OOK sequence to at least one segment of the OFDM waveform. The mapping of the OOK symbols to the OOK sequence may be based on a target data rate for the OOK signaling, which may be determined by the transmitting device based on one or more system conditions or parameters. Thus, each OFDM symbol and cyclic prefix may include an integer quantity of OOK symbols and may support a variety of target data rates, which may support compatibility between an OOK modulation structure and an OFDM waveform structure while reducing complexity and improving reliability of the signaling. Techniques for achieving the data rates are described in further detail elsewhere herein, including with reference to FIGS. 3 through 7.

In some implementations of the wireless communication system 200, there may be one or more messages 240 exchanged between the UE 215 and the network entity 205 to support the OOK mapping techniques described herein. For example, the UE 215 may transmit a message 240 to the network entity 205 via the communication link 125 to indicate one or more parameters associated with the UE 215. The one or more parameters may include an SNR measured by the UE 215, a velocity of the UE 215, one or more other parameters, or any combination thereof. In some examples, the network entity 205 may determine an OOK data rate for the transmitting the OFDM waveform based on the one or more parameters indicated from the UE 215. Additionally, or alternatively, the network entity 205 may determine a type of coding for generating an OOK sequence based on the one or more parameters indicated from the UE 215.

In some examples, the network entity 205 may transmit a message 240 to the UE 215 via the communication link 125 to indicate an OOK data rate the network entity 205 may use for transmitting the OFDM waveform 230, a type of coding associated with the OOK sequence, or both. In some cases, the network entity 205 may indicate, in the message 240, that Manchester coding is applied to the OOK sequence.

The UE 215 may monitor for the WUS based on the WUS waveform rate and coding types indicated via the message 240 from the network entity. In some examples, if a measured SNR at the UE 215 drops while the UE 215 operates in a low power mode (e.g., using the wake-up radio transceiver 220), the UE 215 may switch, for a period of time indicated, to a different type of WUS monitoring (e.g., a relatively more robust detection technique) in accordance with a fallback rate and coding type. The network entity 205 may configure the period of time, the fallback or default rate, the fallback coding type, or any combination thereof.

A network entity 205 as described herein may thereby transmit a signal, such as a WUS, or some other signal that is modulated into an OOK sequence, to a UE 215 via an OFDM waveform 230. The techniques for mapping OOK sequences to OFDM waveforms 230 described herein provide for improved efficiency and reliability of communications.

Figure 3:
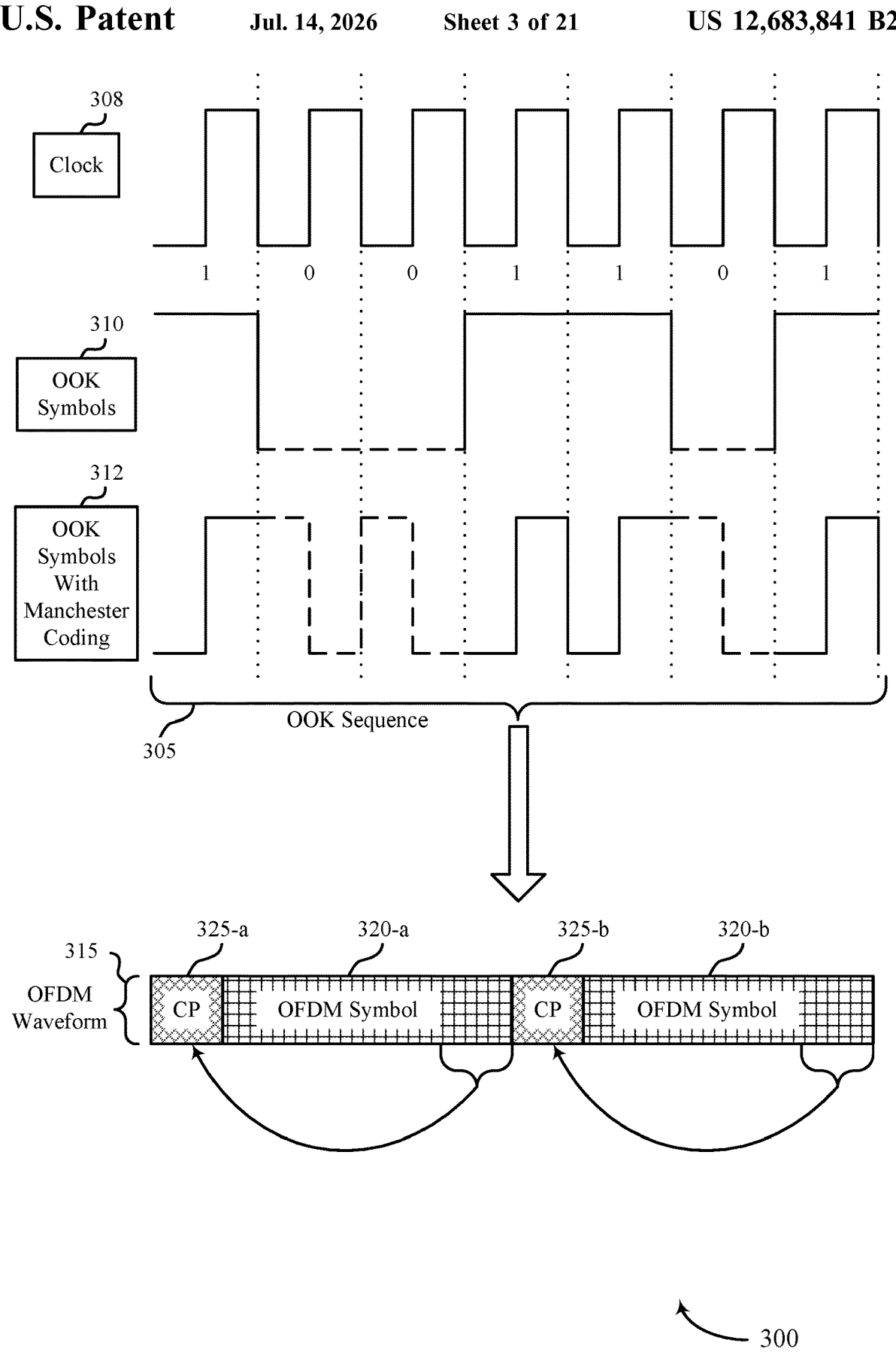
FIG. 3 illustrates an example of an OOK signaling diagram that supports techniques for conveying OOK signaling via OFDM waveforms in accordance with various aspects of the present disclosure.

FIG. 3 illustrates an example of an OOK signaling diagram 300 that supports techniques for conveying OOK signaling via OFDM waveforms in accordance with various aspects of the present disclosure. In some examples, the OOK signaling diagram 300 may implement aspects of the wireless communications system 100 or 200 or may be implemented by aspects of the wireless communications system 100 or 200. For example, the OOK signaling diagram 300 illustrates examples of signals that may be exchanged between a UE and a network entity, which may represent examples of corresponding devices described herein. In this example, a network entity 105 or some other transmitting device may use OOK modulation or OOK modulation with Manchester coding to modulate a sequence of logical bits, and may map the OOK sequence 305 to an OFDM waveform 315.

The network entity may determine a sequence of logical bits to be conveyed to a UE. In the example of FIG. 3, the sequence of logical bits may be 1, 0, 0, 1, 1, 0, 1. However, it is to be understood that any sequence of any quantity of bits may be modulated using OOK modulation and mapped to an OFDM waveform 315 in accordance with the techniques described herein. Each logical bit may be associated with a respective period of the clock 308, which may be referred to as a symbol duration, in some aspects. The network entity may modulate the sequence of logical bits in accordance with an OOK modulation scheme to obtain the OOK symbols 310. Additionally, or alternatively, the network entity may modulate the sequence of logical bits in accordance with the OOK modulation scheme with Manchester coding applied to obtain the OOK symbols with Manchester coding 312. Once modulated, the OOK symbols 310, the OOK symbols with Manchester coding 312, or both may represent an example of an OOK sequence 305.

When OOK modulation is applied without Manchester coding, a high signal (e.g., a signal conveying more than a threshold amount of energy for a clock period) may represent a logical one. A low signal (e.g., a signal with an absence of energy or less than the threshold amount of energy for the clock period) may represent a logical zero.

In some examples, the network entity may support OOK modulation with Manchester coding. When Manchester coding is applied, a logical zero may be signaled by an 'on-off' combination (e.g., 'on' period followed by an 'off' period) while a logical one may be signaled by an 'off-on' period combination (e.g., 'off' period followed by an 'on' period), or vice versa. For example, a logical one may be represented by an absence of energy or an amount of transmitted energy being less than a threshold amount for a first clock period or symbol duration followed by a presence of energy or an amount of transmitted energy being greater than the threshold amount for a second clock period or symbol duration (e.g., a low to high transition across clock periods). A logical zero may be represented by a presence of energy or an amount of transmitted energy being greater than a threshold amount for a first clock period or symbol duration followed by a transition to an absence of energy or an amount of transmitted being less than the threshold amount for a second clock period or symbol duration (e.g., a high to low transition across clock periods). In some aspects, although not illustrated in FIG. 3, a low to high transition across clock periods may represent a logical zero and a high to low transition may represent a logical one, or vice versa. In the OOK signaling diagram 300 illustrated in FIG. 3, a dashed line in the OOK symbols 310 or the OOK symbols with Manchester coding 312 may represent a logical zero and a solid line may represent a logical one, for clarity purposes.

The addition of Manchester coding may reduce complexity of a wake-up transceiver as compared with OOK modulation without Manchester coding, in some aspects. For example, the wake-up transceiver may compare an amount of energy received via a first clock period with an amount of energy received via a second clock period to determine a difference of transmit power. The transceiver (e.g., or the UE or other device that operates the transceiver) may use a value of the difference of transmit powers across two consecutive symbol durations to determine whether a logical one or logical zero was transmitted (e.g., if there is a difference or not). Without the addition of Manchester coding, the wake-up transceiver may detect an amount of energy received during a symbol duration compare that amount to a threshold, which may be relatively more complex than comparing two energy levels.

To transmit the OOK sequence 305 including the OOK symbols 310 or the OOK symbols with Manchester coding 312 to a UE, the network entity may map the OOK sequence 305 to an OFDM waveform 315, as described with reference to FIG. 2. The OFDM waveform 315 may contain one or more OFDM symbols 320 (e.g., OFDM symbols 320-a and 320-b). Each OFDM symbol 320 may include a cyclic prefix 325 (e.g., cyclic prefix 325-a and 325-b) in accordance with the OFDM modulation. Some techniques for mapping the OOK sequence 305 to the OFDM waveform 315 may reduce a range of achievable data rates, increase power, increase complexity, increase error rates, or any combination thereof.

In some examples, a single OOK symbol 310 may be mapped to a single OFDM symbol and cyclic prefix sample in time (e.g., such as the OFDM symbol 320-a and the cyclic prefix 325-a). For example, there may be either a presence of energy or an absence of energy (e.g., above or below a threshold amount) transmitted via the OFDM waveform 315 during the OFDM symbol 320-a and cyclic prefix 325-a to indicate a logical zero or a logical one. In some cases, resources used during the on period may be designed to achieve additional targets such as low peak-to-average power ratio (PAPR) or approximate constant envelope. In such examples, the cyclic prefix samples may be seen as additional energetic samples during the on period or additional zero energy samples during the off period. However, using this technique alone may reduce a range of an achievable OOK data rate, such that the OOK data rate may be equal to the OFDM symbol and cyclic prefix rate.

In some examples, the OOK sequence 305 may be mapped to the OFDM symbol (e.g., such as the OFDM symbol 320-a) and not the cyclic prefix (e.g., such as the cyclic prefix 325-a). As such, frequency domain resources may be calculated to produce the time domain waveform, following IFFT, that may resemble the OOK waveform by means of a statistical procedure, such as a least squares (LS) method. The LS method may find a best fit for a set of data points (e.g., frequency domain coefficients) by minimizing a sum of offsets of points from a plotted curve. In some cases, this statistical procedure may generate a time domain waveform that resembles that of the OOK sequence 305. After generating the time domain waveform by means of LS, a cyclic prefix 325 may be added to the resulting symbol (e.g., as a copy of a final portion of the symbol). In some cases, the OOK rate may be N times faster than the OFDM symbol 320 rate as N OOK symbols 310 may be transmitted via a single OFDM symbol 320. In some cases, as the cyclic prefix 325 adds a non-integer quantity of OOK symbols between the OFDM symbols 320 (e.g., the OFDM symbol 320-a and the OFDM symbol 320-b), OOK symbol timing may not be maintained between the OFDM symbols 320. However, the timing may be maintained within each OFDM symbol 320. To improve timing, the cyclic prefix 325 may be removed prior to OOK detection to maintain OOK symbol timing. However, this may complicate a wake-up radio transceiver of a UE (e.g., the wake-up radio transceiver 220 described with reference to FIG. 2). Therefore, such modulation techniques may not be supported by analog transceivers and may increase power consumption.

In some other examples, the OOK sequence 305 may be mapped to the OFDM symbols 320 and cyclic prefixes 325 (e.g., without repeating an ending portion of each OFDM symbol 320 in the cyclic prefix 325). The OOK waveform parts that correspond to the OFDM symbol 320 may subsequently be generated using a statistical method (e.g., LS, or some other method) while the parts corresponding to the cyclic prefix 325 may be discarded and replaced with samples of the generated OFDM symbol 320. As such, the OOK rate may be detached and separate from the OFDM symbol 320 rate. The OOK symbol timing may be maintained before and after the cyclic prefix 325 but not during the cyclic prefix 325. For example, because the cyclic prefix 325 may not be a part of the OOK waveform, the OOK symbol time may not be maintained during the cyclic prefix 325. In some cases, this may degrade the OOK symbol synchronization as on or off transitions inside the cyclic prefix 325 may not occur on OOK symbol boundaries. Additionally, or alternatively, this may also introduce a bit error rate (BER) floor to the OOK demodulation.

Techniques, systems, and devices described herein provide for improved mapping of OOK symbols 310 or OOK symbols with Manchester coding 312 to the OFDM waveform 315. The described techniques may include dividing an OFDM waveform 315 into an integer quantity of segments and mapping the OOK symbols 310 to the integer quantity of segments of the OFDM waveform 315. As such, an integer quantity of OOK symbols may be mapped to both the OFDM symbols 320 and the cyclic prefixes 325 of an OFDM waveform 315. The described OOK modulation scheme may support a relatively low power signaling and receiver structure due to the OOK modulation, while maintaining compatibility with an OFDM structure (e.g., by supporting FDM between the OOK signal and other OFDM channels).

By using a combination of the techniques described herein, a relatively wide range of data rates may be achieved. For example, a base data rate may be achieved by dividing an OFDM waveform 315 into an integer quantity of segments each having a duration that is approximately the same as a duration of the cyclic prefix 325 for the OFDM waveform 315. In some cases, the base data rate may depend on an SCS configured for the communications (e.g., because the SCS may affect the duration of the cyclic prefix 325). Data rates that are higher than the base data rate may also be achieved by multiplying the integer quantity of segments associated with the base data rate by an integer multiplier and mapping each OOK symbol to a respective segment, or dividing the product of the integer quantity and the integer multiplier by an integer divisor that is less than the product. In some cases, data rates that are lower than the base rate may be achieved by dividing the base data rate, or a product of the base data rate and an integer multiplier, by an integer divisor, where the integer divisor is greater than the product of the base data rate and the integer multiplier.

In some other examples, relatively low data rates may be achieved by mapping a single OOK symbol to a whole OFDM symbol 320 and cyclic prefix 325 (e.g., such as the OFDM symbol 320-a and the cyclic prefix 325-a). The cyclic prefix 325 may provide energetic samples in addition to energetic samples in the OFDM symbol 320 during an on period (e.g., a logical one) or zero energy samples in addition to zero or reduced energy samples in the OFDM symbol 320 during an off period (e.g., a logical zero). In such cases, the achievable data rate may be referred to as a Low Rate (LR) and may be determined by $$\text{Low Rate } (LR) = \frac{1}{(T_{CP} + T_{OFDM})},$$

where $T_{CP}$ may correspond to a duration of the cyclic prefix 325 and $T_{OFDM}$ may correspond to a duration of the OFDM symbol 320. Such lower data rates may be advantageous for transmissions associated with relatively high SCSs. Examples of different rates for various SCSs may be described in Table 1 below.

TABLE 1

| Example cyclic prefix and OFDM symbol sizes for different SCSs | | | |
| --- | --- | --- | --- |
| SCS | $T_{CP}$ μSec | $T_{OFDM}$ μSec | LR kbps |
| 15 kHz | 4.687 | 66.667 | 14 |
| 30 kHz | 2.344 | 33.333 | 28 |
| 60 kHz | 1.172 | 16.667 | 56 |
| 120 kHz | 0.586 | 8.3333 | 112 |

The described techniques may thereby provide for a network entity to map an OOK sequence 305 to an integer quantity of segments of an OFDM waveform 315. By dividing both the OFDM symbol 320 and cyclic prefix 325 portions of the OFDM waveform 315 into an integer quantity of segments before performing the mapping, the network entity may maintain reliability and throughput of the communications while achieving a relatively wide range of target data rates for the transmission. Example techniques for achieving different target data rates are described in further detail elsewhere herein, including with reference to FIGS. 4 through 7.

FIG. 4 illustrates an example of a OOK mapping table 400 that supports techniques for conveying OOK signaling via OFDM waveforms in accordance with various aspects of the present disclosure. In some examples, the OOK mapping table 400 may implement aspects of the wireless communications system 100 or 200 or may be implemented by aspects of the wireless communications system 100 or 200. The OOK mapping table 400 illustrates techniques for mapping payload bits (e.g., B0 through B13) of an OOK sequence 405 to an OFDM waveform including at least one OFDM symbol 410 with a corresponding cyclic prefix 415. In some cases, an OOK sequence 405, an OFDM symbol 410, and a cyclic prefix 415, may be examples of the OOK sequence 305, the OFDM symbols 320, and the cyclic prefixes 325, as illustrated and described in the OOK signaling diagram 300.

In some examples, a base rate may be achieved by mapping one OOK symbol of the OOK sequence 405 to the cyclic prefix 415 and mapping a remainder of the OOK symbols of the OOK sequence 405 to the remainder of the OFDM symbol 410. In the example of the OOK mapping table 400 illustrated in FIG. 4, the OFDM symbol 410 and the cyclic prefix 415 may be divided into 15 segments having approximately a same duration. The cyclic prefix 415 may include one segment and the remainder of the OFDM symbol 410 may include the other 14 segments. Each segment of the OFDM symbol 410 and cyclic prefix 415 may include or be mapped to a single payload bit (B) of the OOK sequence 405 (e.g., B0 through B13, where segment 14 is mapped to the same payload bit, B0 as segment 0).

In accordance with OFDM modulation, the cyclic prefix 415 may include a repetition of a final portion of the OFDM symbol 410 to reduce inter-symbol interference. As such, the first OOK symbol in the OOK sequence 405 (e.g., B0 illustrated in FIG. 4 as the payload for segment 0) and the last OOK symbol in the OOK sequence 405 (e.g., B0 illustrated in FIG. 4 as the payload for segment 14) may convey the same bit to maintain the property of the cyclic prefix 415. In such examples, segments 0 through 13 illustrated in FIG. 4 may convey the payload bits 0 through 13 of a message (e.g., B0 through B13), and a final segment (e.g., segment 14) may convey a copy of the payload bit conveyed via the cyclic prefix 415 (e.g., payload B0) so that the cyclic prefix condition may be met. In some examples, this repetition may be considered as a simple code or be treated as overhead depending on the implementation.

An OFDM waveform may include one or more OFDM symbols 410 and corresponding cyclic prefixes 415. In some examples, a duration of a first or beginning cyclic prefix 415 in the OFDM waveform may be different than durations of subsequent cyclic prefixes 415. For example, a cyclic prefix for a first OFDM symbol of an OFDM waveform may be longer than the cyclic prefixes for the rest of the OFDM symbols in the OFDM waveform. Starting from the second cyclic prefix 415 of the second OFDM symbol 410 in an OFDM waveform, a ratio between a duration of the cyclic prefix 415, $T_{CP}$, and a duration of the OFDM symbol 410, $T_{OFDM}$, may be relatively constant or static (e.g., $T_{OFDM}/T_{CP}$ may be approximately equal to 14.22, or some other constant value across different SCSs). The OFDM symbol 410 and the cyclic prefix 415 illustrated in FIG. 4 may be associated with such a ratio. Examples of different $T_{CP}$ and $T_{OFDM}$ durations and corresponding base rates (BR) that may be achieved based on the durations are illustrated in Table 2. The base rates may be measured in kilobits per second (kbps) for different SCS values.

TABLE 2

| Example Cyclic Prefix and OFDM Symbol Durations | | | |
| --- | --- | --- | --- |
| SCS | $T_{CP}$ ($2^{nd}$ sym) μSec | $T_{OFDM}$ μSec | $T_{OFDM}/T_{CP}$ μSec | BR kbps |
| 15 kHz | 4.6875 | 66.667 | 14.22 | 210 |
| 30 kHz | 2.3438 | 33.333 | 14.22 | 420 |
| 60 kHz | 1.1719 | 16.667 | 14.22 | 840 |
| 120 kHz | 0.58594 | 8.3333 | 14.22 | 1680 |

In this example, the OOK sequence 405 may be mapped to one OFDM symbol 410 (e.g., length $N_{FFT}$) and one cyclic prefix 415 (e.g., length $N_{CP}$). For example, the OOK sequence 405 may be generated with OOK samples in accordance with the $N_{CP}$ and OOK sizes described Table 3. Table 3 shows an $N_{CP}$ sample size for the cyclic prefix 415, an average OOK size, a set of OOK sizes that may be used within the waveform, and an OFDM bandwidth (BW) corresponding to the different SCS, for the different OFDM symbol sizes when a base data rate is used.

TABLE 3

Example OOK sizes for different OFDM symbol lengths

| $N_{FFT}$ | $N_{CP}$ | Average OOK | OOK sizes | OFDM BW [MHz] 15/30/60/120 kHz |
|---|---|---|---|---|
| 2048 | 144 | 146.46 | [144*, 146, 147] | 20/40/80/160 |
| 1024 | 72 | 72.3 | [72*, 73, 74] | 10/20/40/80 |
| 512 | 36 | 36.6 | [36*, 37] | 5/10/20/40 |

The durations of each of the segments may be determined based on the SCS and a ratio between a duration of the cyclic prefix 415 and a duration of the remainder of the OFDM symbol 410. For example, the ratio between the duration of the cyclic prefix 415 and the duration of the remainder of the OFDM symbol 410 may be represented by the average OOK in Table 3 and may be calculated by $$\frac{N_{FFT} - N_{CP}}{13}.$$

In accordance with the base OOK data rate, an OOK waveform may be constructed in a time domain such that a first OOK symbol (e.g., BR0) and a last OOK symbol (e.g., BR14) may be generated using a same No) sample size. These symbols may be mapped to a first segment of the OFDM waveform and a final segment of the OFDM waveform that have approximately the same duration or size, which may be showed by the asterisks in Table 3. For example, the OOK size may be approximately 144 for the first and last OOK symbols when the $N_{FFT}$ size is 2048. In some examples, the $N_{CP}$ sample size may be a rounded version of the average OOK size.

Other OOK symbols (e.g., BR1 through BR13) may be generated using the average OOK size. The sizes of the other OOK symbols may be selected from a list of OOK samples (e.g., the integer samples listed in the OOK sizes column of Table 3) such that a total quantity of samples in the payloads BR0 through BR14 is equal to a duration of the OFDM waveform (e.g., $N_{FFT} + N_{CP}$). The list of OOK sizes may include the $N_{CP}$ sample size and a size greater than the sample size, less than the sample size, or both. Some jitter in OOK symbol sizes may occur, in some examples, but may have a negligible impact on demodulation performance. For the basic rate, the cyclic prefix 415 may convey a single OOK symbol, such that the OFDM symbol 410 with cyclic prefix 415 may convey approximately 14 OOK symbols. The base OOK data rate (BR) may thereby be equal to $$\frac{1}{\left(\frac{T_{OFDM}}{14}\right)} = \frac{1}{T_{CP}}.$$

Table 4 shows example durations of an integer quantity of segments of an OFDM symbol 410 and cyclic prefix 415 as described herein. The columns shown in Table 4 may represent indices of the segments of the OFDM waveform, as illustrated in FIG. 4. The rows of Table 4 may represent N FFT sizes, as shown in Table 3. The elements of Table 4 may represent durations of OOK symbols that are mapped to the respective segment of an OFDM waveform with the respective N FFT size.

TABLE 4

Example OOK durations per segment of the OFDM symbol for different OFDM symbol lengths

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 2048 | 144 | 146 | 146 | 147 | 146 | 147 | 146 | 147 | 146 | 147 | 146 | 147 | 146 | 147 | 144 |
| 1024 | 72 | 73 | 73 | 74 | 73 | 73 | 73 | 74 | 73 | 73 | 74 | 73 | 73 | 73 | 72 |
| 512 | 36 | 37 | 36 | 37 | 36 | 37 | 36 | 37 | 36 | 37 | 36 | 37 | 36 | 37 | 36 |

As shown in the example of Table 4, the first OOK symbol mapped to the first segment 0 (e.g., the cyclic prefix 415) may be the same duration as the last OOK symbol mapped to the last segment 14 of the OFDM waveform. For example, for the N FFT length of 2048 both segment 0 and segment 14 may be associated with a sample size of 144 to maintain the property of the cyclic prefix 415 being a copy of the final segment of the OFDM symbol 410 (e.g., segment 14). Other OOK symbols of the OOK sequence 405 (e.g., segments 1 through 13 of the OFDM symbol 410) may be represented by other sizes from the list of OOK sizes in the fourth column of table 3. The sizes represented in the segments of the OFDM symbol may be selected so that a duration of all 15 segments may be equal to $N_{FFT} + N_{CP}$.

After the network entity generates the time domain OOK waveform from the OOK sequence 405, the network entity may use a method (e.g., LS, or some other method) to calculate frequency domain coefficients for a waveform over the OFDM symbol 410 (e.g., segments 1 through 14). After IFFT is applied, the cyclic prefix 415 may be added and may produce segment 0 to be equivalent to segment 14.

A network entity as described herein may thereby map an OOK sequence 405 to both a cyclic prefix 415 and a OFDM symbol 410. A base data rate or OOK data rate may be achieved by mapping each OOK symbol to a respective segment of an integer quantity of segments of the ODFDM waveform, where the cyclic prefix 415 corresponds to one segment. Techniques for achieving data rates that are higher or lower than the base data rate are described in further detail elsewhere herein, including with reference to FIGS. 5 and 6. In some aspects, the network entity may apply Manchester coding to the OOK modulation, as described in further detail elsewhere herein, including with reference to FIG. 7.

Figure 5:
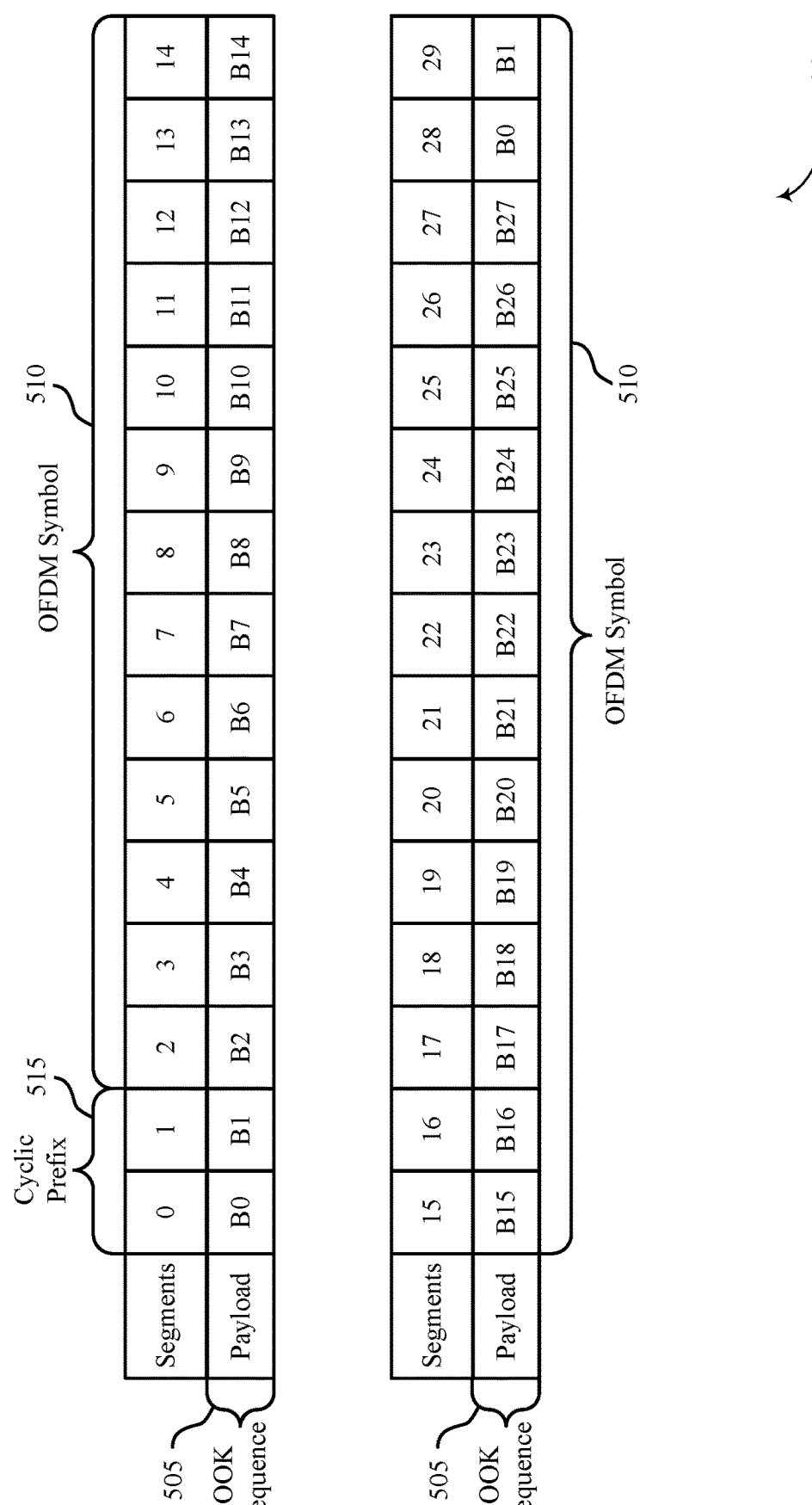
FIG. 5 illustrates an example of an OOK mapping table that supports techniques for conveying OOK signaling via OFDM waveforms in accordance with various aspects of the present disclosure.

FIG. 5 illustrates an example of a OOK mapping table 500 that supports techniques for conveying OOK signaling via OFDM waveforms in accordance with various aspects of the present disclosure. In some examples, the OOK mapping table 500 may implement aspects of the wireless communications system 100 or 200 or may be implemented by aspects of the wireless communications system 100 or 200. The OOK mapping table 500 illustrates techniques for mapping payload bits (e.g., B0 through B29) of an OOK sequence 505 to an OFDM waveform including at least on OFDM symbol 510 with a cyclic prefix 515. In some cases, an OOK sequence 505, an OFDM symbol 510, and a corresponding cyclic prefix 515, may be examples of the OOK sequence 305, the OFDM symbols 320, and the cyclic prefixes 325, as illustrated and described in the OOK signaling diagram 300.

In some examples, a network entity may multiply the base OOK data rate by an integer multiplier, M, to achieve a higher data rate than the base OOK data rate (e.g., OOK data rate=M*BR). A quantity of segments of the OFDM waveform may be equal to a product of the integer multiplier and the quantity of segments associated with the base data rate (e.g., 14 segments, as described with reference to FIG. 4). The cyclic prefix 515 may include a quantity of segments that is equal to the integer multiplier. In the example of FIG. 5, the integer multiplier may be two, the cyclic prefix may include two segments, and a data rate twice as high as the base data rate may be achieved (e.g., M=2, OOK data rate=2BR). Two OOK symbols of the OOK sequence 505 may be mapped to the cyclic prefix 515 and 28 OOK symbols of the OOK sequence 505 may be mapped to the OFDM symbol 510. When accounting for repetition in the cyclic prefix 515, a total of 28 unique OOK symbols may be mapped to an OFDM waveform including the OFDM symbol 510 and the cyclic prefix 515. The durations of the OFDM symbol 510 and the cyclic prefix 515 may be based on the SCS, as described with reference to FIG. 4. By mapping two times as many OOK symbols to an OFDM symbol 510 with a cyclic prefix 515, the network entity may increase the data rate by two times as compared to the base data rate.

The cyclic prefix 515 may include a repetition of a final portion of the OFDM symbol 510 to reduce inter-symbol interference, as described with reference to FIGS. 3 and 4. As the data rate increases by M, the cyclic prefix 515 may include more (e.g., M) segments. Thus, the payload bits transmitted via the cyclic prefix 515 may be repeated via the final M segments of the OFDM symbol 510. For example, as illustrated in FIG. 5, the segments 0 and 1 of the cyclic prefix 515 may contain payload bits B0 and B1, which may be duplicated and conveyed via segments 28 and 29 of the OFDM symbol 510 (e.g., where the OFDM symbol 510 includes segments 2 through 29).

The OOK data rate may be proportional to the SCS, as described with reference to FIG. 4. For example, as the SCS increases, the base data rate and the multiplied OOK data rate may increase. Table 5 shows example data rates that are achievable for different configured SCS values when the base data rate is multiplied by two (e.g., M=2). The achievable data rates are labeled as 2BR in the example of Table 5.

TABLE 5

| Example data rates for 2 times the base rate per different SCSs | |
| --- | --- |
| SCS | 2BR kbps |
| 15 kHz | 420 |
| 30 kHz | 840 |
| 60 kHz | 1680 |
| 120 kHz | 3360 |

In some cases, similar to the base data rate as described with reference to FIG. 4, there may be different OOK sizes used for the OOK symbols mapped to segments within the OFDM symbol 510. Sample sizes for the final M (e.g., two in the example of FIG. 5) OOK segments of the OFDM symbol 510 may remain the same as sizes or durations of the segments within the cyclic prefix 515 (e.g., durations of B0 and B1 may be the same). Example durations of each segment of the cyclic prefix 515 and the OFDM symbol 510 for different OFDM symbol sizes (e.g., and corresponding SCS values) are shown in Table 6 for a single OFDM symbol 510 and corresponding cyclic prefix 515. The columns shown in Table 6 may represent indices of the segments of the OFDM waveform, as illustrated in FIG. 5. The rows of Table 6 may represent NFFT sizes for different SCS values, as shown in Table 3. The elements of Table 6 may represent durations of OOK symbols that are mapped to the respective segment of an OFDM waveform with the respective NFFT size. In this example, because the data rate is two times the base rate, the durations may be relatively shorter than the durations for the base rate shown in Table 4.

TABLE 6

| Example OOK sizes for 2BR for different OFDM symbol sizes | | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 |
| 2048 | 72 | 72 | 73 | 73 | 73 | 73 | 74 | 74 | 73 | 73 | 73 | 73 | 73 | 73 | 74 |
| 1024 | 36 | 36 | 37 | 37 | 36 | 36 | 37 | 37 | 36 | 36 | 37 | 37 | 37 | 37 | 37 |
| 512 | 18 | 18 | 18 | 18 | 19 | 19 | 18 | 18 | 18 | 18 | 19 | 19 | 18 | 18 | 18 |
| | 15 | 16 | 17 | 18 | 19 | 20 | 21 | 22 | 23 | 24 | 25 | 26 | 27 | 28 | 29 |
| 2048 | 74 | 73 | 73 | 73 | 73 | 74 | 74 | 73 | 73 | 73 | 73 | 73 | 73 | 72 | 72 |
| 1024 | 37 | 36 | 36 | 37 | 37 | 36 | 36 | 37 | 37 | 36 | 36 | 37 | 37 | 36 | 36 |
| 512 | 18 | 18 | 18 | 19 | 19 | 18 | 18 | 18 | 18 | 19 | 19 | 18 | 18 | 18 | 18 |

As shown in the example of Table 6, the first OOK symbol mapped to the first segment 0 and the second OOK symbol mapped to the second segment 1 (e.g., the cyclic prefix 515) may each be the same duration as each other and as the second-to-last OOK symbol mapped to the second-to-last segment 28 of the OFDM symbol 510 and the last OOK symbol mapped to the last segment 29 of the OFDM symbol 510 (e.g., payload bits B0 and B1). For example, for the $N_{FFT}$ length of 2048, each of segments 0, 1, 28, and 29 may be associated with a sample size of 72 to maintain the property of the cyclic prefix 515 being a copy of the final segments of the OFDM symbol 510 (e.g., segments 28 and 29). Other OOK symbols of the OOK sequence 505 (e.g., segments 2 through 27 of the OFDM symbol 510) may be represented by other sizes from a list of OOK sizes, which may be similar to the sizes shown in the fourth column of table 3, but divided according to the target data rate (e.g., divided by approximately two in the example of FIG. 5, where the base data rate is multiplied by two). The sizes represented in the segments of the OFDM symbol may be selected so that a duration of all the segments in the cyclic prefix 515 and OFDM symbol 510 may be equal to $N_{FFT}+N_{CP}$.

In this example, segments 2 through 27 illustrated in FIG. 5 may convey the payload bits B2 through B27 of a message, while the cyclic prefix 515 may convey the payload bits B0 and B1, which may be repeated in the segments 28 and 29 of the OFDM symbol 510 so that the cyclic prefix condition may be met. In some examples, this repetition may be considered as a simple code or be treated as overhead depending on the implementation. In some cases, the message or the payload bits conveyed via the OFDM waveform may be an example of a WUS being transmitted from a network entity to a UE, or some other information.

Following the construction of the desired time domain OOK waveform (e.g., after applying the IFFT to the OOK sequence 505 mapped cyclic prefix 515 and OFDM symbol 510), a fitting method (e.g., LS) may be used to calculate the frequency domain resources for the WUS waveform over the OFDM symbol 510 (e.g., segments [2:29] for 2BR). Additionally, after the application of the IFFT, the cyclic prefix addition may produce segments [0:1] (e.g., the cyclic prefix 515) to be equivalent to segments [28:29] (e.g., the final two segments of the OFDM symbol 510).

Although the data rate illustrated in FIG. 5 is two times the base data rate described with reference to FIG. 4, it is to be understood that a transmitting device may multiply the base data rate by any integer multiplier in the manner described herein to achieve data rates that are higher than the base data rate while still mapping an integer quantity of OOK symbols to the cyclic prefix 515 and the OFDM symbol 510. The higher data rates may support faster communications between a network entity and a UE, a faster wake-up time at the UE, and the like. In some aspects, as the data rate increases, power consumption of the UE and the network entity may also increase. Due to the tradeoff between target data rates and power consumption, different data rates may be desired by a transmitting device in different times (e.g., depending on communication scenarios and parameters). The described techniques for mapping an integer quantity of OOK symbols to an OFDM waveform may support reduced data rates and reduced power consumption and reduced data rates elsewhere herein, including with reference to FIGS. 6 and 7.

FIGS. 6A and 6B illustrate examples of OOK mapping tables 600 and 601 that support techniques for conveying OOK signaling via OFDM waveforms in accordance with various aspects of the present disclosure. In some examples, the OOK mapping tables 600 and 601 may implement aspects of the wireless communications systems 100 or 200 or may be implemented by aspects of the wireless communications systems 100 or 200. The OOK mapping tables 600 and 601 may illustrate techniques for mapping payload bits of an OOK sequence to an OFDM waveform including at least one OFDM symbol 610 with a cyclic prefix 615. In some cases, an OOK sequence, the OFDM symbols 610 and the cyclic prefixes 615 may represent examples of the OOK sequence 305, the OFDM symbols 320, and the cyclic prefixes 325, as illustrated and described in the OOK signaling diagram 300. In this example, a network entity or other transmitting device may apply the OOK mapping techniques described herein to achieve a data rate that is different than the base data rate described with reference to FIGS. 4 and 5.

In some examples, a network entity may divide the base data rate by an integer divisor, N, to achieve a lower data rate than the base OOK data rate (e.g., OOK data rate=BR/N, where N may be equal to two, three, four, five, etc.). The network entity may achieve data rates that are equal to one half, one third, one fourth, etc. of the base data rate, for example. In some other aspects, the network entity may divide a product of the base data rate and an integer multiplier, M (e.g., BR*M) by the integer divisor (e.g., M*BR/N) to achieve a data rate that is different than the base OOK data rate. For example, if the double base rate (2BR) illustrated in FIG. 5 is used, achievable data rates may include two thirds of the base data rate, two fifths of the base data rate, and the like.

In these cases, a quantity of segments of the OFDM waveform may be equal to the quantity of segments associated with the base data rate (e.g., 15 segments per OFDM symbol 610 and cyclic prefix 615). However, each OOK symbol may be mapped to a subset of the segments, where the subset includes a quantity of segments that is greater than one. If the base data rate is divided by the integer divisor, N, the subset may include N segments. That is, each OOK symbol of an OOK sequence may be mapped to N segments. If the base data rate is multiplied by the integer multiplier, M, before being divided by the integer divisor, N, the quantity of segments of the OFDM waveform may be equal to a product of the quantity associated with the base data rate and the integer multiplier, and the subset may include N segments. Each OOK symbol of an OOK sequence may be mapped to N segments out of the M*15 segments, for example. In some examples, if the base data rate is divided by a large enough divisor (e.g., 15), a single OOK symbol may be mapped across all the segments of the cyclic prefix 615 and the OFDM symbol 610 to achieve relatively low data rates, as described with reference to Table 1. A quantity of OFDM symbols 610 and corresponding cyclic prefixes 615 in the OFDM waveform may be based on the OOK data rate. For example, the quantity of pairs of OFDM symbols 610 and cyclic prefixes 615 may be equal to the integer divisor, in some aspects.

FIG. 6A illustrates an example mapping table 600 when the base data rate is divided by two (e.g., BR/2). In this example, there may be two pairs of OFDM symbols 610 and corresponding cyclic prefixes 615 in the OFDM waveform to convey an OOK sequence having a same or similar quantity of payload bits as the OOK sequence illustrated in FIG. 4. Each OFDM symbol 610 and cyclic prefix 615 may include a same quantity of segments as the base data rate (e.g., one segment per cyclic prefix 615 and 14 segments per OFDM symbol 610).

To achieve the data rate that is two times less than the base data rate, the network entity may map each OOK symbol to two segments of the OFDM waveform. For example, the first payload bit B0 may be mapped to the first two segments 0 and 1 of the OFDM waveform, and the second payload bit B1 may be mapped to the next two segments 2 and 3 of the OFDM waveform, and so on. Once each of the segments 0 through 14 of the first OFDM symbol 610 (e.g., symbol 0) are mapped, the network entity may begin mapping OOK symbols to the segments 0 through 14 of the next OFDM symbol 610 (e.g., symbol 1).

A final segment of each OFDM symbol 610 may convey a same payload bit as the cyclic prefix 615 of the OFDM symbol 610, as described with reference to FIGS. 2 through 5. In this example, an addition rule may be applied so that the cyclic prefix 615 conveys a same payload bit as a final segment of the OFDM symbol 610 and the repetition factor of N is maintained throughout the OFDM waveform. For example, as illustrated in the mapping table 600, the final segment 14 of the first OFDM symbol 610 may convey the payload bit B0, which may be the same as the payload bit conveyed via the cyclic prefix 615. However, each OOK symbol may be mapped to two consecutive segments to achieve the target data rate (e.g., BR/2). Thus, the payload bit B0 may be repeated in the next consecutive segment of the OFDM waveform, which may be segment 0 of the second OFDM symbol 610 (symbol 1). The payload bit B0 may thereby be repeated again in the final two segments 13 and 14 of the second OFDM symbol 610. Although the OFDM symbols 610 are illustrated in a stacked manner in FIGS. 6A and 6B for clarity, it is to be understood that the OFDM symbols 610 may be transmitted via an OFDM waveform and may be subsequent to one another in a time domain (e.g., OFDM symbol 0 may be transmitted before OFDM symbol 1).

The network entity may thereby convey payload bits B0 through B12 over two OFDM symbols 610, which may correspond to a lower data rate than the base data rate illustrated in FIG. 4, in which payload bits B0 through B13 are conveyed via a single OFDM symbol 610 (e.g., approximately half the base data rate). Similar techniques may be applied to map an integer quantity of OOK symbols to an OFDM waveform and achieve various different target data rates.

FIG. 6B illustrates a second example of an OOK mapping table 601 when the base data rate is divided by four (e.g., BR/4). In this example, there may be four pairs of OFDM symbols 610 and corresponding cyclic prefixes 615 in the OFDM waveform to convey an OOK sequence having a same or similar quantity of payload bits as the OOK sequence illustrated in FIG. 4. Each OFDM symbol 610 and cyclic prefix 615 may include a same quantity of segments as the base data rate (e.g., one segment per cyclic prefix 615 and 14 segments per OFDM symbol 610).

To achieve the data rate that is approximately four times less than the base data rate, the network entity may map each OOK symbol to four segments of the OFDM waveform. For example, the first payload bit B0 may be mapped to the first four segments 0 through 3 of the OFDM waveform, and the second payload bit B1 may be mapped to the next four segments 4 through 7 of the OFDM waveform, and so on. Once each of the segments 0 through 14 of the first OFDM symbol 610 (e.g., symbol 0) are mapped, the network entity may begin mapping OOK symbols to the segments 0 through 14 of the next OFDM symbol 610 (e.g., symbol 1), and so on (e.g., symbols 2 and 3).

The addition rule for the cyclic prefix 615 may be relatively more noticeable as the integer divisor increases. For example, to ensure a final segment 14 of each OFDM symbol 610 is the same as the cyclic prefix 615 for the respective OFDM symbol 610, the payload bit that is conveyed at least partially via the cyclic prefix 615 and three other segments of the OFDM symbol 610 may be transmitted again via four segments of the OFDM waveform, the four segments including a final segment of the OFDM symbol 610. In the example of FIG. 6B, the payload bit B0 may be conveyed via segments 0 through 3 and 12 through 14 of the symbol 0, via segments 0, 13, and 14 of the symbol 1, via segments 0, 1, and 14 of the symbol 2, and via segments 0 through 2 and 11 through 14 of the symbol 3. Thus, the payload bit B0 may be conveyed via the cyclic prefixes 615 of each of the symbols and a final segment of each of the symbols.

In similar examples, the product of the base rate and the integer multiplier, M, (e.g., M*BR) may be divided by the integer divisor, N, to produce additional data rates data rates $$\left( e.g., \frac{M*BR}{N} \right).$$

For example, for a double base rate (e.g., 2BR), and an integer divisor, N, value of three, the rate may be equal to $$\frac{2BR}{3} = \frac{BR}{1.5},$$

or for an integer divisor, N, value of five, the rate may be equal $$\frac{2BR}{5} = \frac{BR}{2.5}.$$

As such, a relatively wide range of data rates may be achieved. The achievable data rates may be based on an SCS configured for communications. Table 7 shows example data rates for different SCS values. The columns of Table 7 represent example target or achievable data rates, where BR may represent the base data rate, as described with reference to FIG. 4, and LR may represent a low data rate, where a single OOK symbol may be mapped to a single OFDM symbol 610, as described with reference to Table 1.

TABLE 7

| Example OOK data rates for different SCSs | | | | | | | |
|---|---|---|---|---|---|---|---|
| SCS | 2BR | BR | $\frac{BR}{1.5}$ | $\frac{BR}{2}$ | $\frac{BR}{2.5}$ | $\frac{BR}{3}$ | $\frac{BR}{3.5}$ |
| 15 kHz | 420 | 210 | 140 | 105 | 84 | 70 | 60 |
| 30 kHz | 840 | 420 | 280 | 210 | 168 | 140 | 120 |
| 60 kHz | 1680 | 840 | 560 | 420 | 336 | 280 | 240 |
| 120 kHz | 3360 | 1680 | 1120 | 840 | 8672 | 860 | 480 |

| SCS | $\frac{BR}{4}$ | $\frac{BR}{4.5}$ | $\frac{BR}{5}$ | $\frac{BR}{6}$ | LR | $\frac{LR}{2}$ | $\frac{LR}{4}$ |
|---|---|---|---|---|---|---|---|
| 15 kHz | 52.5 | 46.7 | 42 | 35 | 14 | 7 | — |
| 30 kHz | 105 | 93.3 | 84 | 70 | 28 | 14 | 7 |
| 60 kHz | 210 | 186.7 | 168 | 140 | 56 | 28 | 14 |
| 120 kHz | 420 | 373.3 | 336 | 180 | 112 | 56 | 28 |

As shown in Table 7, the techniques for mapping OOK symbols to OFDM waveforms described herein may provide for a network entity to transmit information according to a relatively large range of target data rates. The network entity may determine a target data rate based on one or more communication parameters, which may be signaled by a UE or some other device, as described with reference to FIG. 2.

In some aspects, some resources of the OFDM waveform may be allocated for repetition of payload bits in accordance with the repetition rules for the cyclic prefix 615 (e.g., constrained bits). A percentage of resources that are allocated for such repetition may vary based on the target data rate. For example, a data rate that is equal to the base rate divided by six may be associated with a relatively high percentage of resources allocated for repetition, and a data rate that is two times the base data rate may be associated with a relatively low percentage of resources that are allocated for repetition. The network entity may account for such percentages when determining a target data rate, in some aspects.

The techniques described herein may thereby support a relatively wide range of OOK data rates for the network entity to choose from. In some cases, lower data rates may be used to be reduce power consumption at the UE and the network entity. Additional data rates and data rates that are achievable when Manchester coding is applied to the OOK modulation may described in further detail elsewhere herein, with reference to FIG. 7.

FIG. 7 illustrates an example of a OOK mapping table 700 that supports techniques for conveying OOK signaling with Manchester coding via OFDM waveforms in accordance with various aspects of the present disclosure. In some examples, the OOK mapping table 700 may implement aspects of the wireless communications system 100 or 200 or may be implemented by aspects of the wireless communications system 100 or 200. The OOK mapping table 700 illustrates techniques for mapping payload bits of an OOK sequence to an OFDM waveform including at least a set of OFDM symbols 710 with a cyclic prefix 715. In some cases, an OOK sequence, an OFDM symbol 710, and a corresponding cyclic prefix 715 may be examples of the OOK sequence 305, the OFDM symbols 320, and the cyclic prefixes 325, as illustrated and described in the OOK signaling diagram 300. In this example, a network entity may apply Manchester coding to OOK modulation before mapping an OOK sequence to an OFDM waveform.

As described with reference to FIG. 3, when Manchester coding is applied to OOK modulation, a pair of two consecutive OOK symbols with differing energy levels may represent a value of zero or a value of one. In some cases, the addition of Manchester coding may impact a range of data rates that are achievable in accordance with the described techniques. For example, when using Manchester coding, a value of one (e.g., an on value) may be represented by an "off-on" combination (e.g., a transition from low to high energy levels) and a value of zero may (e.g., an off value) may be represented by an "on-off" combination (e.g., a transition from high to low energy levels), or vice versa. Thus, each payload bit may be transmitted with a negated version of the payload bit. For example, to convey a bit equal to one, the network entity may transmit a value of one (e.g., an amount of energy above a threshold) in a first OOK symbol duration and a negated value of one (e.g., zero, or an absence of energy) in a second, consecutive OOK symbol duration.

The OOK data rates that are achievable when Manchester coding is applied may be similar to the reduced data rates described with reference to FIGS. 6A and 6B. For example, because the Manchester coding scheme involves the transmission of at least two OOK symbols to convey a single bit, a base data rate for Manchester coding may be similar to half of the base data rate described with reference to FIG. 4 (e.g., BR/2).

FIG. 7 illustrates an example of an OOK sequence with Manchester coding that is mapped to an OFDM waveform in accordance with a target data rate. The target data rate illustrated in FIG. 7 may be equal to the base rate divided by four (e.g., an integer divisor, N, equal to four). In this example, each OOK symbol may be mapped to two consecutive segments of the OFDM symbols 710 (e.g., N/2 segments). However, because two consecutive OOK symbols are used to convey a logical bit when Manchester coding is applied, four segments may be used to convey each logical bit. Thus, each logical bit may be conveyed via N segments, which is why the corresponding data rate may be N times less than the base data rate.

In the example of FIG. 7, the payload bit B1 may be conveyed via segments 4 through 7 of the first OFDM symbol 710 (e.g., symbol 1). Segments 4 and 5 may convey a first OOK symbol that indicates a first value (B0) and segments 6 and 7 may convey a second OOK symbol that indicates a negated version of the first value (B1), in accordance with the Manchester coding scheme. For example, to represent a value of one in a pair of OOK symbols using Manchester coding, a first OOK symbol in the pair may include an absence of energy (e.g., a value of zero), and a second OOK symbol in the pair may include a presence of energy (e.g., a value of one). The other payload bits B0 through B10 may be conveyed similarly.

A final segment of each OFDM symbol 710 may convey a same payload bit as the cyclic prefix 715 of the OFDM symbol 710, as described with reference to FIGS. 2 through 6. In this example, an addition rule may be applied so that the cyclic prefix 715 conveys a same payload bit as a final segment of the OFDM symbol 710 and the repetition factor of N is maintained throughout the OFDM waveform. For example, as illustrated in the mapping table 700, the final segment 14 of the first OFDM symbol 710 may convey the payload bit B0, which may be the same as the payload bit conveyed via the cyclic prefix 715. However, each OOK symbol may be paired with a negated version in accordance with Manchester coding, and each OOK symbol be mapped to two consecutive segments to achieve the target data rate (e.g., BR/4). Thus, in the example of FIG. 7, the payload bit B0 may be repeated in the next consecutive segment of the OFDM waveform, which may be segment 0 of the second OFDM symbol 710 (symbol 1). For example, the payload bit B0 may also be preceded by the negated version B0 in an OOK symbol conveyed via segments 12 and 13, such that the segments 12 through 14 of symbol 0 and segment 0 of symbol 1 may convey a corresponding logical bit.

Such repetition of the payload bit B0 and the negated version B0 may be repeated for each of the OFDM symbols 710 to align with OFDM modulation schemes. Although the OFDM symbols 710 are illustrated in a stacked manner in FIG. 7 for clarity, it is to be understood that the OFDM symbols 710 may be transmitted via an OFDM waveform and may be subsequent to one another in a time domain (e.g., symbol 0 may be transmitted before symbols 1, 2, and 3 in time).

Some examples of achievable data rates when Manchester coding is applied are shown in Table 8. The columns of Table 8 represent example target or achievable data rates, where BR may represent the base data rate, as described with reference to FIG. 4, and LR may represent a low data rate, where a single OOK symbol may be mapped to a single OFDM symbol 710, as described with reference to Table 1.

43

TABLE 8

| | Example OOK data rates for different SCSs | | | | | |
|---|---|---|---|---|---|---|
| SCS | $\frac{2BR}{2}$ | $\frac{BR}{2}$ | $\frac{BR}{4}$ | $\frac{BR}{6}$ | $\frac{LR}{2}$ | $\frac{LR}{4}$ |
| 15 kHz | 210 | 105 | 52.5 | 35 | 7 | — |
| 30 kHz | 420 | 210 | 105 | 70 | 14 | 7 |
| 60 kHz | 840 | 420 | 210 | 140 | 28 | 14 |
| 120 kHz | 1680 | 840 | 420 | 180 | 58 | 28 |

In some aspects, as described with reference to FIG. 6, some resources of the OFDM waveform may be allocated for repetition of payload bits in accordance with the repetition rules for the cyclic prefix 715 (e.g., constrained bits). A percentage of resources that are allocated for such repetition may vary based on the target data rate. For example, a data rate that is equal to the base rate divided by six may be associated with a relatively high percentage of resources allocated for repetition (e.g., 40 percent, or some other percentage), and a data rate that is half of the base data rate may be associated with a relatively low percentage of resources that are allocated for repetition (e.g., 13 percent, or some other percentage). The network entity may account for such percentages when determining a target data rate, in some aspects.

In some examples, the use of the Manchester coding scheme may simplify a wake-up transceiver radio transceiver of a UE (e.g., such as the wake-up radio transceiver 220 described with reference to FIG. 2). The UE may compare values conveyed via two OOK symbols with each other, which may reduce the power consumption of the UE as compared with determining a relative value of a single OOK symbol. However, the achievable data rates with Manchester coding may be slightly different than those when Manchester coding is not applied.

As such, a network entity may determine whether to apply Manchester coding to an OOK sequence for wireless communications based on a target power consumption and a target data rate. If Manchester coding is applied, the network entity may map the resulting OOK sequence to an OFDM waveform in accordance with the techniques described herein.

FIG. 8 illustrates an example of a process flow 800 that supports techniques for conveying OOK signaling via OFDM waveforms in accordance with various aspects of the present disclosure. In some examples, the process flow 800 may implement aspects of the wireless communications system 100 or 200 or may be implemented by aspects of the wireless communications system 100 or 200. For example, the process flow 800 illustrates examples of signals that may be exchanged between a UE 815 and a network entity 805, which may represent examples of corresponding devices described herein. In this example, the network entity 805 may map an OOK sequence to an OFDM waveform and may transmit the OFDM waveform to the UE 815 via a set of frequency resources.

In the following description of the process flow 800, the operations between the UE 815 and the network entity 805 may be performed in different orders or at different times. Some operations may also be left out of the process flow 800, or other operations may be added. Although the UE 815 and the network entity 805 are shown performing the operations of the process flow 800, some aspects of some operations may also be performed by one or more other wireless devices.

At 820, in some examples, the UE 815 may transmit a message to the network entity 805. The message may indicate one or more parameters associated with the UE 815. The one or more parameters may include an SNR measured by the UE 815, a velocity of the UE 815, one or more other parameters or conditions associated with the UE 815, or any combination thereof. The network entity 805 may determine an OOK data rate for transmitting an OFDM waveform, or a type of coding for generating an OOK sequence, or both based on the one or more parameters.

At 825, the network entity 805 may map one or more OOK symbols of an OOK sequence to an OFDM waveform. The OFDM waveform may include at least one OFDM symbol with a cyclic prefix (or more), as described with reference to FIGS. 2 through 7. The network entity 805 may map each OOK symbol of the OOK sequence to at least one segment of a first integer quantity of segments of the OFDM waveform based on an OOK data rate. A duration of each segment of the first integer quantity of segments of the OFDM waveform may be based on the OOK data rate and a ratio between a duration of the cyclic prefix and a duration of a remainder of the OFDM symbol In some cases, the network entity 805 may determine the OOK data rate based on the ratio between the duration of the cyclic prefix and the duration of the remainder of the OFDM symbol. In some examples, the cyclic prefix may include a second integer quantity of segments and the OFDM symbol may include a third integer quantity of segments based on the determined OOK data rate. In some cases, the first integer quantity of segments may be equal to a sum of the second integer quantity and the third integer quantity of segments.

In some examples, the network entity 805 may determine a base OOK data rate associated with a quantity of integer segments in the OFDM waveform, and the network entity 805 may use the base OOK data rate for mapping the OOK sequence, as described with reference to FIG. 4, or the network entity 805 may multiple the base OOK data rate by an integer multiplier to achieve a higher data rate, as described with reference to FIG. 5. Additionally, or alternatively, the network entity 805 may divide the base data rate or a product of the base data rate and the integer multiplier by an integer divisor to achieve a lower data rate, as described with reference to FIGS. 6A and 6B.

At 830, in some examples, the network entity 805 may transmit a message to the UE 815 that indicates the OOK data rate for transmitting the OFDM waveform, or that indicates a type of coding associated with the OOK sequence (e.g., whether Manchester coding is used, a modulation and coding scheme, or the like), or both. In some cases, in response to the message, the UE 815 may monitor for the OFDM waveform in accordance with the indicated OOK data rate, the indicated type of coding, or both.

At 835, the network entity 805 may transmit, to the UE 815, the OFDM waveform via a set of frequency resources. In some cases, the network entity 805 may transmit the OFDM waveform to the UE 815 in accordance with the base OOK data rate. In such cases, the cyclic prefix may include a single segment, as described with reference to FIG. 4. In some other cases, the network entity 805 may transmit the OFDM waveform to the UE 815 in accordance with a higher OOK data rate or a lower OOK data rate. In some examples, the network entity 805 may apply a Manchester coding scheme for OOK modulation, and the data rate may be based on the Manchester coding scheme.

In some examples, transmitting the OFDM waveform to the UE 815 may include multiplexing the set of frequency resources in a frequency domain with other sets of frequency resources for conveying data channels. In some cases, a second set of frequency resources in the frequency domain may include guard bands to separate the set of frequency resources from the other sets of frequency resources. In some examples, the network entity 805 may modulate a set of bits associated with a WUS into the OOK sequence and transmit the WUS via the OFDM waveform. The WUS may indicate a request for the UE 815 to operate in a wake mode for communications with the network entity 805.

At 840, the UE 815 may decode the OOK waveform embedded in the OFDM waveform to obtain the OOK sequence. Each segment of the first integer quantity of segments may correspond to at least a portion of a respective OOK symbol of the plurality of OOK symbols in the OOK sequence. In some cases, the UE 815 may transition from a sleep mode to a wake mode based on a WUS conveyed via the OFDM waveform transmitted from the network entity 805 to the UE 815.

Although the OFDM waveform is described as being transmitted by a network entity 805 to a UE 815 in the example illustrated in FIG. 8, it is to be understood that the described techniques for mapping an OOK sequence to an OFDM waveform may be applied and used by any type of transmitting device, including UEs or other transmitting devices. The described techniques may thereby support improved communication reliability, improved throughput, and reduced complexity by supporting OOK signaling via OFDM waveforms.

FIG. 9 shows a block diagram 900 of a device 905 that supports techniques for conveying OOK signaling via OFDM waveforms in accordance with various aspects of the present disclosure. The device 905 may be an example of aspects of a network entity as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for conveying OOK signaling via OFDM waveforms as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate. The communications manager 920 may be configured as or otherwise support a means for transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption, and more efficient utilization of communication resources.

FIG. 10 shows a block diagram 1000 of a device 1005 that supports techniques for conveying OOK signaling via OFDM waveforms in accordance with various aspects of the present disclosure. The device 1005 may be an example of aspects of a device 905 or a network entity as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for conveying OOK signaling via OFDM waveforms as described herein. For example, the communications manager 1020 may include a OOK symbol mapping component 1025 an OFDM waveform component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The OOK symbol mapping component 1025 may be configured as or otherwise support a means for mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate. The OFDM waveform component 1030 may be configured as or otherwise support a means for transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

FIG. 11 shows a block diagram 1100 of a communications manager 1120 that supports techniques for conveying OOK signaling via OFDM waveforms in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for conveying OOK signaling via OFDM waveforms as described herein. For example, the communications manager 1120 may include a OOK symbol mapping component 1125, an OFDM waveform component 1130, a OOK data rate component 1135, a message component 1140, a message receiver 1145, an OFDM waveform generator 1150, an OFDM waveform transmitter 1155, a WUS modulator 1160, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity, between devices, components, or virtualized components associated with a network entity), or any combination thereof.

The communications manager 1120 may support wireless communication at a network entity in accordance with examples as disclosed herein. The OOK symbol mapping component 1125 may be configured as or otherwise support a means for mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate. The OFDM waveform component 1130 may be configured as or otherwise support a means for transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

In some examples, the OOK data rate component 1135 may be configured as or otherwise support a means for determining the OOK data rate based on the ratio between the duration of the cyclic prefix and the duration of the remainder of the OFDM symbol, where the cyclic prefix includes a second integer quantity of segments and the OFDM symbol includes a third integer quantity of segments based on the determined OOK data rate, the first integer quantity equal to a sum of the second integer quantity and the third integer quantity.

In some examples, the message component 1140 may be configured as or otherwise support a means for transmitting a message that indicates the OOK data rate for transmitting the OFDM waveform, or that indicates a type of coding associated with the OOK sequence, or both.

In some examples, the message receiver 1145 may be configured as or otherwise support a means for receiving a message that indicates one or more parameters associated with a UE in communication with the network entity, where the one or more parameters include a signal-to-noise ratio measured by the UE, a velocity of the UE, or both. In some examples, the OOK data rate component 1135 may be configured as or otherwise support a means for determining the OOK data rate for transmitting the OFDM waveform, or a type of coding for generating the OOK sequence, or both based on the one or more parameters.

In some examples, the OFDM waveform generator 1150 may be configured as or otherwise support a means for determining a second integer quantity of segments of the OFDM waveform based on the ratio between duration of the cyclic prefix and the duration of the OFDM symbol and a subcarrier spacing for communications by the network entity, where the second integer quantity of segments is associated with a base OOK data rate, and where the cyclic prefix includes a first segment of the second integer quantity of segments and the OFDM symbol includes a remainder of the second integer quantity of segments in accordance with the base OOK data rate.

In some examples, to support transmitting the OFDM waveform, the OFDM waveform transmitter 1155 may be configured as or otherwise support a means for transmitting the OFDM waveform in accordance with the base OOK data rate, where the OOK data rate is equal to the base OOK data rate and the first integer quantity of segments of the OFDM waveform is equal to the second integer quantity of segments associated with the base OOK data rate, and where the first segment included in the cyclic prefix includes a same OOK symbol as a final segment of the OFDM symbol.

In some examples, the OOK data rate component 1135 may be configured as or otherwise support a means for multiplying the base OOK data rate by an integer multiplier to obtain the OOK data rate, the OOK data rate associated with more OOK symbols per OFDM symbol than the base OOK data rate based on the multiplying, where the first integer quantity of segments of the OFDM waveform is equal to a product of the second integer quantity of segments associated with the base OOK data rate and the integer multiplier, and where each OOK symbol of the set of multiple OOK symbols is mapped to a respective segment of the first integer quantity of segments.

In some examples, the cyclic prefix includes a quantity of segments that is equal to the integer multiplier. In some examples, a set of OOK symbols conveyed via the quantity of segments of the cyclic prefix are also conveyed via a same quantity of segments of a final portion of the OFDM waveform.

In some examples, the OOK data rate component 1135 may be configured as or otherwise support a means for dividing the base OOK data rate or a product of the base OOK data rate and an integer multiplier by an integer divisor to obtain the OOK data rate, the OOK data rate associated with fewer OOK symbols per OFDM symbol than the base OOK data rate or the product of the base OOK data rate and the integer multiplier based on the dividing, where the first integer quantity of segments of the OFDM waveform is equal to the second integer quantity of segments associated with the base OOK data rate or a product of the second quantity and the integer multiplier, and where each OOK symbol of the set of multiple OOK symbols is mapped to a subset of the first integer quantity of segments, the subset including a quantity of segments equal to the integer divisor.

In some examples, the OFDM waveform includes at least a first quantity of OFDM symbol and cyclic prefix pairs, the first quantity equal to the integer divisor based on the OOK data rate. In some examples, a final subset of segments of each OFDM symbol and cyclic prefix pair conveys at least a portion of an OOK symbol that is the same as a portion of an OOK symbol conveyed via a beginning subset of segments of each OFDM symbol and cyclic prefix pair.

In some examples, each OOK symbol of the set of multiple OOK symbols indicates a value of zero or a value of one. In some examples, transmitting energy via the OFDM waveform for an OOK symbol duration corresponds to the value of one. In some examples, refraining from transmitting the energy via the OFDM waveform for the OOK symbol duration corresponds to the value of zero.

In some examples, a pair of two OOK symbols of the set of multiple OOK symbols indicates a value of zero or a value of one based on a Manchester coding scheme. In some examples, a first OOK symbol of the pair of two OOK symbols includes an absence of energy transmitted via the OFDM waveform during a corresponding OOK symbol duration. In some examples, a second OOK symbol of the pair of two OOK symbols includes a presence of energy transmitted via the OFDM waveform during a corresponding OOK symbol duration. In some examples, an order of the first OOK symbol and the second OOK symbol in time indicates the value of zero or the value of one.

In some examples, to support mapping the set of multiple OOK symbols to the OFDM waveform, the OOK symbol mapping component 1125 may be configured as or otherwise support a means for mapping each of the first OOK symbol or the second OOK symbol to at least one segment of the first integer quantity of segments based on the Manchester coding scheme and the OOK data rate.

In some examples, the duration of each segment of the first integer quantity of segments is further based on a subcarrier spacing for communications by the network entity. In some examples, a quantity of OFDM symbols and corresponding cyclic prefixes in the OFDM waveform is based on the duration of each segment and the OOK data rate.

In some examples, to support transmitting the OFDM waveform, the OFDM waveform transmitter 1155 may be configured as or otherwise support a means for multiplexing the set of frequency resources in a frequency domain with other sets of frequency resources for conveying data channels, where a second set of frequency resources that are next to the set of frequency resources in the frequency domain include guard bands to separate the set of frequency resources from the other sets of frequency resources for conveying the data channels.

In some examples, the WUS modulator 1160 may be configured as or otherwise support a means for modulating a set of bits associated with a wake-up signal into the OOK sequence, the wake-up signal indicating a request for a UE to operate in a wake mode for communications with the network entity, where the OFDM waveform conveys the wake-up signal to the UE.

FIG. 12 shows a diagram of a system 1200 including a device 1205 that supports techniques for conveying OOK signaling via OFDM waveforms in accordance with various aspects of the present disclosure. The device 1205 may be an example of or include the components of a device 905, a device 1005, or a network entity as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for conveying OOK signaling via OFDM waveforms). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may, for example, refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105 and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate. The communications manager 1220 may be configured as or otherwise support a means for transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol.

By including or configuring the communications manager 1220 in accordance with examples as described herein, the device 1205 may support techniques for improved communication reliability, reduced latency, reduced power consumption, more efficient utilization of communication resources, and longer battery life.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for conveying OOK signaling via OFDM waveforms as described herein, or the processor 1235 and the memory 1225 may be otherwise configured to perform or support such operations.

FIG. 13 shows a block diagram 1300 of a device 1305 that supports techniques for conveying OOK signaling via OFDM waveforms in accordance with various aspects of the present disclosure. The device 1305 may be an example of aspects of a UE as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for conveying OOK signaling via OFDM waveforms). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for conveying OOK signaling via OFDM waveforms). In some examples, the transmitter 1315 may be co-located with a receiver 1310 in a transceiver component. The transmitter 1315 may utilize a single antenna or a set of multiple antennas.

The communications manager 1320, the receiver 1310, the transmitter 1315, or various combinations thereof or various components thereof may be examples of means for performing various aspects of techniques for conveying OOK signaling via OFDM waveforms as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at UE in accordance with examples as disclosed herein. For example, the communications manager 1320 may be configured as or otherwise support a means for receiving, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol. The communications manager 1320 may be configured as or otherwise support a means for decoding the OFDM waveform to obtain an OOK sequence, where each segment of the first integer quantity of segments corresponds to at least a portion of a respective OOK symbol of a set of multiple OOK symbols of the OOK sequence.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced power consumption and more efficient utilization of communication resources.

FIG. 14 shows a block diagram 1400 of a device 1405 that supports techniques for conveying OOK signaling via OFDM waveforms in accordance with various aspects of the present disclosure. The device 1405 may be an example of aspects of a device 1305 or a UE as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for conveying OOK signaling via OFDM waveforms). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for conveying OOK signaling via OFDM waveforms). In some examples, the transmitter 1415 may be co-located with a receiver 1410 in a transceiver component. The transmitter 1415 may utilize a single antenna or a set of multiple antennas.

The device 1405, or various components thereof, may be an example of means for performing various aspects of techniques for conveying OOK signaling via OFDM waveforms as described herein. For example, the communications manager 1420 may include an OFDM waveform receiver 1425 an OFDM waveform decoder 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at UE in accordance with examples as disclosed herein. The OFDM waveform receiver 1425 may be configured as or otherwise support a means for receiving, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol. The OFDM waveform decoder 1430 may be configured as or otherwise support a means for decoding the OFDM waveform to obtain an OOK sequence, where each segment of the first integer quantity of segments corresponds to at least a portion of a respective OOK symbol of a set of multiple OOK symbols of the OOK sequence.

FIG. 15 shows a block diagram 1500 of a communications manager 1520 that supports techniques for conveying OOK signaling via OFDM waveforms in accordance with various aspects of the present disclosure. The communications manager 1520 may be an example of aspects of a communications manager 1320, a communications manager 1420, or both, as described herein. The communications manager 1520, or various components thereof, may be an example of means for performing various aspects of techniques for conveying OOK signaling via OFDM waveforms as described herein. For example, the communications manager 1520 may include an OFDM waveform receiver 1525, an OFDM waveform decoder 1530, a Message receiver 1535, an OFDM monitoring component 1540, a Message transmitter 1545, a OOK symbol decoder 1550, a OOK symbol identifier 1555, an OFDM WUS component 1560, a UE capability transmitter 1565, or any combination thereof. Each of these components may communicate, directly or indirectly, with one another (e.g., via one or more buses).

The communications manager 1520 may support wireless communication at UE in accordance with examples as disclosed herein. The OFDM waveform receiver 1525 may be configured as or otherwise support a means for receiving, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol. The OFDM waveform decoder 1530 may be configured as or otherwise support a means for decoding the OFDM waveform to obtain an OOK sequence, where each segment of the first integer quantity of segments corresponds to at least a portion of a respective OOK symbol of a set of multiple OOK symbols of the OOK sequence.

In some examples, the OOK data rate is based on the ratio between the duration of the cyclic prefix and the duration of the remainder of the OFDM symbol. In some examples, the cyclic prefix includes a second integer quantity of segments and the OFDM symbol includes a third integer quantity of segments based on the OOK data rate, the first integer quantity equal to a sum of the second and third integer quantities.

In some examples, the Message receiver 1535 may be configured as or otherwise support a means for receiving a message that indicates the OOK data rate for receiving the OFDM waveform, or that indicates a type of coding associated with the OOK sequence, or both. In some examples, the OFDM monitoring component 1540 may be configured as or otherwise support a means for monitoring for the OFDM waveform in accordance with the indicated OOK data rate, the indicated type of coding, or both.

In some examples, the UE capability transmitter 1565 may be configured as or otherwise support a means for transmitting signaling that indicates a capability of the UE to monitor for a second OFDM waveform in accordance with a second OOK data rate, a second type of coding, or both based on one or more parameters associated with the UE. In some examples, the OFDM monitoring component 1540 may be configured as or otherwise support a means for monitoring for the second OFDM waveform in accordance with the second OOK data rate, the second type of coding, or both based on the one or more parameters associated with the UE satisfying a threshold.

In some examples, the Message transmitter 1545 may be configured as or otherwise support a means for transmitting a message that indicates one or more parameters associated with the UE, where the one or more parameters include a signal-to-noise ratio measured by the UE, a velocity of the UE, or both, and where the OOK data rate associated with the OFDM waveform, a type of coding associated with the OOK sequence, or both are based on the one or more parameters.

In some examples, the first integer quantity of segments of the OFDM waveform is based on the OOK data rate and a subcarrier spacing for communications by the UE.

In some examples, the OOK symbol decoder 1550 may be configured as or otherwise support a means for each OOK symbol of the set of multiple OOK symbols indicates a value of zero or a value of one. In some examples, the OOK symbol identifier 1555 may be configured as or otherwise support a means for determining whether an OOK symbol of the set of multiple OOK symbols corresponds to the value of one or the value of zero based on an amount of energy detected via the OFDM waveform during a corresponding OOK symbol duration.

In some examples, each pair of two OOK symbols of the set of multiple OOK symbols indicates a value of zero or a value of one based on a Manchester coding scheme, and the OFDM waveform decoder 1530 may be configured as or otherwise support a means for determining whether a first pair of two OOK symbols corresponds to the value of zero or the value of one based on a first amount of energy detected via a first OOK symbol duration corresponding to a first OOK symbol of the first pair and a second amount of energy detected via a second OOK symbol duration corresponding to a second OOK symbol of the first pair.

In some examples, each of the first OOK symbol and the second OOK symbol of the first pair is mapped to at least one segment of the first integer quantity of segments based on the Manchester coding scheme and the OOK data rate.

In some examples, the duration of each segment of the first integer quantity of segments is further based on a subcarrier spacing for communications by UE. In some examples, a quantity of OFDM symbols and corresponding cyclic prefixes in the OFDM waveform is based on the duration of each segment and the OOK data rate.

In some examples, to support receiving the OFDM waveform, the OFDM waveform receiver 1525 may be configured as or otherwise support a means for receiving the OFDM waveform via the set of frequency resources multiplexed in a frequency domain with other sets of frequency resources conveying data channels, where a second set of frequency resources that are next to the set of frequency resources in the frequency domain include guard bands to separate the set of frequency resources from the other sets of frequency resources for conveying the data channels.

In some examples, the OFDM WUS component 1560 may be configured as or otherwise support a means for transitioning from a sleep mode of the UE to a wake mode of the UE based on a wake-up signal conveyed via the OFDM waveform, where the OOK sequence is modulated with a set of bits associated with the wake-up signal.

FIG. 16 shows a diagram of a system 1600 including a device 1605 that supports techniques for conveying OOK signaling via OFDM waveforms in accordance with various aspects of the present disclosure. The device 1605 may be an example of or include the components of a device 1305, a device 1405, or a UE as described herein. The device 1605 may communicate (e.g., wirelessly) with one or more network entities 105, one or more UEs 115, or any combination thereof. The device 1605 may include components for bi-directional voice and data communications including components for transmitting and receiving communications, such as a communications manager 1620, an input/output (I/O) controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally, or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a basic I/O system (BIOS) which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for conveying OOK signaling via OFDM waveforms). For example, the device 1605 or a component of the device 1605 may include a processor 1640 and memory 1630 coupled with or to the processor 1640, the processor 1640 and memory 1630 configured to perform various functions described herein.

The communications manager 1620 may support wireless communication at UE in accordance with examples as disclosed herein. For example, the communications manager 1620 may be configured as or otherwise support a means for receiving, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol. The communications manager 1620 may be configured as or otherwise support a means for decoding the OFDM waveform to obtain an OOK sequence, where each segment of the first integer quantity of segments corresponds to at least a portion of a respective OOK symbol of a set of multiple OOK symbols of the OOK sequence.

By including or configuring the communications manager 1620 in accordance with examples as described herein, the device 1605 may support techniques for reduced power consumption, more efficient utilization of communication resources, improved coordination between devices, and longer battery life.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for conveying OOK signaling via OFDM waveforms as described herein, or the processor 1640 and the memory 1630 may be otherwise configured to perform or support such operations.

FIG. 17 shows a flowchart illustrating a method 1700 that supports techniques for conveying OOK signaling via OFDM waveforms in accordance with various aspects of the present disclosure. The operations of the method 1700 may be implemented by a network entity or its components as described herein. For example, the operations of the method 1700 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1705, the method may include mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate. The operations of 1705 may be performed in accordance with examples as disclosed herein. In some examples, aspects of the operations of 1705 may be performed by a OOK symbol mapping component 1125 as described with reference to FIG. 11.

At 1710, the method may include transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol. The operations of 1710 may be performed in accordance with examples as disclosed herein. In some examples, aspects of the operations of 1710 may be performed by an OFDM waveform component 1130 as described with reference to FIG. 11.

FIG. 18 shows a flowchart illustrating a method 1800 that supports techniques for conveying OOK signaling via OFDM waveforms in accordance with various aspects of the present disclosure. The operations of the method 1800 may be implemented by a network entity or its components as described herein. For example, the operations of the method 1800 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1805, the method may include mapping a set of multiple OOK symbols of an OOK sequence to an OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on an OOK data rate. The operations of 1805 may be performed in accordance with examples as disclosed herein. In some examples, aspects of the operations of 1805 may be performed by a OOK symbol mapping component 1125 as described with reference to FIG. 11.

At 1810, the method may include transmitting a message that indicates the OOK data rate for transmitting the OFDM waveform, or that indicates a type of coding associated with the OOK sequence, or both. The operations of 1810 may be performed in accordance with examples as disclosed herein. In some examples, aspects of the operations of 1810 may be performed by a Message component 1140 as described with reference to FIG. 11.

At 1815, the method may include transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol. The operations of 1815 may be performed in accordance with examples as disclosed herein. In some examples, aspects of the operations of 1815 may be performed by an OFDM waveform component 1130 as described with reference to FIG. 11.

FIG. 19 shows a flowchart illustrating a method 1900 that supports techniques for conveying OOK signaling via OFDM waveforms in accordance with various aspects of the present disclosure. The operations of the method 1900 may be implemented by a network entity or its components as described herein. For example, the operations of the method 1900 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1905, the method may include receiving a message that indicates one or more parameters associated with a UE in communication with the network entity, where the one or more parameters include an SNR measured by the UE, a velocity of the UE, or both. The operations of 1905 may be performed in accordance with examples as disclosed herein. In some examples, aspects of the operations of 1905 may be performed by a Message receiver 1145 as described with reference to FIG. 11.

At 1910, the method may include determining an OOK data rate for transmitting an OFDM waveform, or a type of coding for generating an OOK sequence, or both based on the one or more parameters. The operations of 1910 may be performed in accordance with examples as disclosed herein. In some examples, aspects of the operations of 1910 may be performed by a OOK data rate component 1135 as described with reference to FIG. 11.

At 1915, the method may include mapping a set of multiple OOK symbols of the OOK sequence to the OFDM waveform, the OFDM waveform includes at least one OFDM symbol with a cyclic prefix, each OOK symbol of the set of multiple OOK symbols is mapped to at least one segment of a first integer quantity of segments of the OFDM waveform based on the OOK data rate. The operations of 1915 may be performed in accordance with examples as disclosed herein. In some examples, aspects of the operations of 1915 may be performed by a OOK symbol mapping component 1125 as described with reference to FIG. 11.

At 1920, the method may include transmitting the OFDM waveform via a set of frequency resources, where a duration of each segment of the first integer quantity of segments of the OFDM waveform is based on the OOK data rate and a ratio between a duration of the cyclic prefix and a duration of a remainder of the OFDM symbol. The operations of 1920 may be performed in accordance with examples as disclosed herein. In some examples, aspects of the operations of 1920 may be performed by an OFDM waveform component 1130 as described with reference to FIG. 11.

FIG. 20 shows a flowchart illustrating a method 2000 that supports techniques for conveying OOK signaling via OFDM waveforms in accordance with various aspects of the present disclosure. The operations of the method 2000 may be implemented by a UE or its components as described herein. For example, the operations of the method 2000 may be performed by a UE as described with reference to FIGS. 1 through 8 and 13 through 16. In some examples, a UE may execute a set of instructions to control the functional elements of the UE to perform the described functions. Additionally, or alternatively, the UE may perform aspects of the described functions using special-purpose hardware.

At 2005, the method may include receiving, via a set of frequency resources, an OFDM waveform, the OFDM waveform includes at least one OFDM symbol with a cyclic prefix, where the OFDM waveform includes a first integer quantity of segments, a duration of each segment of the first integer quantity of segments is based on an OOK data rate and a ratio between a duration of the cyclic prefix and a duration of a remainder the OFDM symbol. The operations of 2005 may be performed in accordance with examples as disclosed herein. In some examples, aspects of the operations of 2005 may be performed by an OFDM waveform receiver 1525 as described with reference to FIG. 15.

At 2010, the method may include decoding the OFDM waveform to obtain an OOK sequence, where each segment of the first integer quantity of segments corresponds to at least a portion of a respective OOK symbol of a set of multiple OOK symbols of the OOK sequence. The operations of 2010 may be performed in accordance with examples as disclosed herein. In some examples, aspects of the operations of 2010 may be performed by an OFDM waveform decoder 1530 as described with reference to FIG. 15.

FIG. 21 shows a flowchart illustrating a method 2100 that supports techniques for conveying OOK signaling via OFDM waveforms in accordance with various aspects of the present disclosure. The operations of the method 2100 may be implemented by a UE or its components as described herein. For example, the operations of the method 2100 may be performed by a UE as described with reference to FIGS. 1 through 8 and 13 through 16. In some examples, a UE may execute a set of instructions to control the functional elements of the UE to perform the described functions. Additionally, or alternatively, the UE may perform aspects of the described functions using special-purpose hardware.

At 2105, the method may include receiving a message that indicates an OOK data rate for receiving an OFDM waveform, or that indicates a type of coding associated with an OOK sequence, or both. The operations of 2105 may be performed in accordance with examples as disclosed herein. In some examples, aspects of the operations of 2105 may be performed by a Message receiver 1535 as described with reference to FIG. 15.

At 2110, the method may include monitoring for the OFDM waveform in accordance with the indicated OOK data rate, the indicated type of coding, or both. The operations of 2110 may be performed in accordance with examples as disclosed herein. In some examples, aspects of the operations of 2110 may be performed by an OFDM monitoring component 1540 as described with reference to FIG. 15.

At 2115, the method may include receiving, via a set of frequency resources, the OFDM waveform, the OFDM waveform includes at least one OFDM symbol with a cyclic prefix, where the OFDM waveform includes a first integer quantity of segments, a duration of each segment of the first integer quantity of segments is based on the OOK data rate and a ratio between a duration of the cyclic prefix and a duration of a remainder the OFDM symbol. The operations of 2115 may be performed in accordance with examples as disclosed herein. In some examples, aspects of the operations of 2115 may be performed by the OFDM waveform receiver 1525 as described with reference to FIG. 15.

At 2120, the method may include decoding the OFDM waveform to obtain the OOK sequence, where each segment of the first integer quantity of segments corresponds to at least a portion of a respective OOK symbol of a set of multiple OOK symbols of the OOK sequence. The operations of 2120 may be performed in accordance with examples as disclosed herein. In some examples, aspects of the operations of 2120 may be performed by an OFDM waveform decoder 1530 as described with reference to FIG. 15.

The following provides an overview of aspects of the present disclosure:

Aspect 1: A method for wireless communication at a network entity, comprising: mapping a plurality of OOK symbols of an OOK sequence to an OFDM waveform, the OFDM waveform includes at least one OFDM symbol with a cyclic prefix, each OOK symbol of the plurality of OOK symbols is mapped to at least one segment of a first integer quantity of segments of the OFDM waveform based at least in part on an OOK data rate; and transmitting the OFDM waveform via a set of frequency resources, wherein a duration of each segment of the first integer quantity of segments of the OFDM waveform is based at least in part on the OOK data rate and a ratio between a duration of the cyclic prefix and a duration of a remainder of the OFDM symbol.

Aspect 2: The method of aspect 1, further comprising: determining the OOK data rate based at least in part on the ratio between the duration of the cyclic prefix and the duration of the remainder of the OFDM symbol, wherein the cyclic prefix includes a second integer quantity of segments and the OFDM symbol includes a third integer quantity of segments based at least in part on the determined OOK data rate, the first integer quantity equal to a sum of the second integer quantity and the third integer quantity.

Aspect 3: The method of any of aspects 1 through 2, further comprising: transmitting a message that indicates the OOK data rate for transmitting the OFDM waveform, or that indicates a type of coding associated with the OOK sequence, or both.

Aspect 4: The method of any of aspects 1 through 3, further comprising: receiving a message that indicates one or more parameters associated with a UE in communication with the network entity, wherein the one or more parameters include an SNR measured by the UE, a velocity of the UE, or both; and determining the OOK data rate for transmitting the OFDM waveform, or a type of coding for generating the OOK sequence, or both based at least in part on the one or more parameters.

Aspect 5: The method of any of aspects 1 through 4, further comprising: determining a second integer quantity of segments of the OFDM waveform based at least in part on the ratio between duration of the cyclic prefix and the duration of the OFDM symbol and an SCS for communications by the network entity, wherein the second integer quantity of segments is associated with a base OOK data rate, and wherein the cyclic prefix includes a first segment of the second integer quantity of segments and the OFDM symbol includes a remainder of the second integer quantity of segments in accordance with the base OOK data rate.

Aspect 6: The method of aspect 5, wherein transmitting the OFDM waveform comprises: transmitting the OFDM waveform in accordance with the base OOK data rate, wherein the OOK data rate is equal to the base OOK data rate and the first integer quantity of segments of the OFDM waveform is equal to the second integer quantity of segments associated with the base OOK data rate, and wherein the first segment included in the cyclic prefix includes a same OOK symbol as a final segment of the OFDM symbol.

Aspect 7: The method of aspect 5, further comprising: multiplying the base OOK data rate by an integer multiplier to obtain the OOK data rate, the OOK data rate associated with more OOK symbols per OFDM symbol than the base OOK data rate based at least in part on the multiplying, wherein the first integer quantity of segments of the OFDM waveform is equal to a product of the second integer quantity of segments associated with the base OOK data rate and the integer multiplier, and wherein each OOK symbol of the plurality of OOK symbols is mapped to a respective segment of the first integer quantity of segments.

Aspect 8: The method of aspect 7, wherein the cyclic prefix includes a quantity of segments that is equal to the integer multiplier; and a set of OOK symbols conveyed via the quantity of segments of the cyclic prefix are also conveyed via a same quantity of segments of a final portion of the OFDM waveform.

Aspect 9: The method of aspect 5, further comprising: dividing the base OOK data rate or a product of the base OOK data rate and an integer multiplier by an integer divisor to obtain the OOK data rate, the OOK data rate associated with fewer OOK symbols per OFDM symbol than the base OOK data rate or the product of the base OOK data rate and the integer multiplier based at least in part on the dividing, wherein the first integer quantity of segments of the OFDM waveform is equal to the second integer quantity of segments associated with the base OOK data rate or a product of the second integer quantity and the integer multiplier, and wherein each OOK symbol of the plurality of OOK symbols is mapped to a subset of the first integer quantity of segments, the subset including a quantity of segments equal to the integer divisor.

Aspect 10: The method of aspect 9, wherein: the OFDM waveform includes at least a first quantity of OFDM symbol and cyclic prefix pairs, the first quantity equal to the integer divisor based at least in part on the OOK data rate; and a final subset of segments of each OFDM symbol and cyclic prefix pair conveys at least a portion of an OOK symbol that is the same as a portion of an OOK symbol conveyed via a beginning subset of segments of each OFDM symbol and cyclic prefix pair.

Aspect 11: The method of any of aspects 1 through 10, wherein: each OOK symbol of the plurality of OOK symbols indicates a value of zero or a value of one; transmitting energy via the OFDM waveform for an OOK symbol duration corresponds to the value of one; and refraining from transmitting the energy via the OFDM waveform for the OOK symbol duration corresponds to the value of zero.

Aspect 12: The method of any of aspects 1 through 10, wherein a pair of two OOK symbols of the plurality of OOK symbols indicates a value of zero or a value of one based at least in part on a Manchester coding scheme; a first OOK symbol of the pair of two OOK symbols includes an absence of energy transmitted via the OFDM waveform during a corresponding OOK symbol duration; a second OOK symbol of the pair of two OOK symbols includes a presence of energy transmitted via the OFDM waveform during a corresponding OOK symbol duration; and an order of the first OOK symbol and the second OOK symbol in time indicates the value of zero or the value of one.

Aspect 13: The method of aspect 12, wherein mapping the plurality of OOK symbols to the OFDM waveform comprises: mapping each of the first OOK symbol or the second OOK symbol to at least one segment of the first integer quantity of segments based at least in part on the Manchester coding scheme and the OOK data rate.

Aspect 14: The method of any of aspects 1 through 13, wherein the duration of each segment of the first integer quantity of segments is further based at least in part on an SCS for communications by the network entity; and a quantity of OFDM symbols and corresponding cyclic prefixes in the OFDM waveform is based at least in part on the duration of each segment and the OOK data rate.

Aspect 15: The method of any of aspects 1 through 14, wherein transmitting the OFDM waveform comprises: multiplexing the set of frequency resources in a frequency domain with other sets of frequency resources for conveying data channels, wherein a second set of frequency resources that are next to the set of frequency resources in the frequency domain comprise guard bands to separate the set of frequency resources from the other sets of frequency resources for conveying the data channels.

Aspect 16: The method of any of aspects 1 through 15, further comprising: modulating a set of bits associated with a WUS into the OOK sequence, the WUS indicating a request for a UE to operate in a wake mode for communications with the network entity, wherein the OFDM waveform conveys the WUS to the UE.

Aspect 17: A method for wireless communication at UE, comprising: receiving, via a set of frequency resources, an OFDM waveform, the OFDM waveform includes at least one OFDM symbol with a cyclic prefix, wherein the OFDM waveform includes a first integer quantity of segments, a duration of each segment of the first integer quantity of segments is based at least in part on an OOK data rate and a ratio between a duration of the cyclic prefix and a duration of a remainder the OFDM symbol; and decoding the OFDM waveform to obtain an OOK sequence, wherein each segment of the first integer quantity of segments corresponds to at least a portion of a respective OOK symbol of a plurality of OOK symbols of the OOK sequence.

Aspect 18: The method of aspect 17, wherein: the OOK data rate is based at least in part on the ratio between the duration of the cyclic prefix and the duration of the remainder of the OFDM symbol; and the cyclic prefix includes a second integer quantity of segments and the OFDM symbol includes a third integer quantity of segments based at least in part on the OOK data rate, the first integer quantity equal to a sum of the second and third integer quantities.

Aspect 19: The method of any of aspects 17 through 18, further comprising: receiving a message that indicates the OOK data rate for receiving the OFDM waveform, or that indicates a type of coding associated with the OOK sequence, or both; and monitoring for the OFDM waveform in accordance with the indicated OOK data rate, the indicated type of coding, or both.

Aspect 20: The method of aspect 19, further comprising: transmitting signaling that indicates a capability of the UE to monitor for a second OFDM waveform in accordance with a second OOK data rate, a second type of coding, or both based at least in part on one or more parameters associated with the UE; and monitoring for the second OFDM waveform in accordance with the second OOK data rate, the second type of coding, or both based at least in part on the one or more parameters associated with the UE satisfying a threshold.

Aspect 21: The method of any of aspects 17 through 20, further comprising: transmitting a message that indicates one or more parameters associated with the UE, wherein the one or more parameters include an SNR measured by the UE, a velocity of the UE, or both, and wherein the OOK data rate associated with the OFDM waveform, a type of coding associated with the OOK sequence, or both are based at least in part on the one or more parameters.

Aspect 22: The method of any of aspects 17 through 21, wherein the first integer quantity of segments of the OFDM waveform is based at least in part on the OOK data rate and an SCS for communications by the UE.

Aspect 23: The method of any of aspects 17 through 22, wherein: each OOK symbol of the plurality of OOK symbols indicates a value of zero or a value of one; and determining whether an OOK symbol of the plurality of OOK symbols corresponds to the value of one or the value of zero based at least in part on an amount of energy detected via the OFDM waveform during a corresponding OOK symbol duration.

Aspect 24: The method of any of aspects 17 through 22, wherein each pair of two OOK symbols of the plurality of OOK symbols indicates a value of zero or a value of one based at least in part on a Manchester coding scheme, the method further comprising: determining whether a first pair of two OOK symbols corresponds to the value of zero or the value of one based at least in part on a first amount of energy detected via a first OOK symbol duration corresponding to a first OOK symbol of the first pair and a second amount of energy detected via a second OOK symbol duration corresponding to a second OOK symbol of the first pair.

Aspect 25: The method of aspect 24, wherein each of the first OOK symbol and the second OOK symbol of the first pair is mapped to at least one segment of the first integer quantity of segments based at least in part on the Manchester coding scheme and the OOK data rate.

Aspect 26: The method of any of aspects 17 through 25, wherein the duration of each segment of the first integer quantity of segments is further based at least in part on an SCS for communications by UE; and a quantity of OFDM symbols and corresponding cyclic prefixes in the OFDM waveform is based at least in part on the duration of each segment and the OOK data rate.

Aspect 27: The method of any of aspects 17 through 26, wherein receiving the OFDM waveform comprises: receiving the OFDM waveform via the set of frequency resources multiplexed in a frequency domain with other sets of frequency resources conveying data channels, wherein a second set of frequency resources that are next to the set of frequency resources in the frequency domain comprise guard bands to separate the set of frequency resources from the other sets of frequency resources for conveying the data channels.

Aspect 28: The method of any of aspects 17 through 27, further comprising: transitioning from a sleep mode of the UE to a wake mode of the UE based at least in part on a WUS conveyed via the OFDM waveform, wherein the OOK sequence is modulated with a set of bits associated with the WUS.

Aspect 29: An apparatus for wireless communication at a network entity, comprising a processor; memory coupled with the processor; and instructions stored in the memory and executable by the processor to cause the apparatus to perform a method of any of aspects 1 through 16.

Aspect 30: An apparatus for wireless communication at a network entity, comprising at least one means for performing a method of any of aspects 1 through 16.

Aspect 31: A non-transitory computer-readable medium storing code for wireless communication at a network entity, the code comprising instructions executable by a processor to perform a method of any of aspects 1 through 16.

Aspect 32: An apparatus for wireless communication at UE, comprising a processor; memory coupled with the processor; and instructions stored in the memory and executable by the processor to cause the apparatus to perform a method of any of aspects 17 through 28.

Aspect 33: An apparatus for wireless communication at UE, comprising at least one means for performing a method of any of aspects 17 through 28.

Aspect 34: A non-transitory computer-readable medium storing code for wireless communication at UE, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network entity, comprising:

mapping a plurality of on-off keying symbols of an on-off keying sequence to an orthogonal frequency division multiplexing waveform, the orthogonal frequency division multiplexing waveform includes at least one orthogonal frequency division multiplexing symbol with a cyclic prefix, each on-off keying symbol of the plurality of on-off keying symbols is mapped to at least one segment of a first integer quantity of segments of the orthogonal frequency division multiplexing waveform based at least in part on an on-off keying data rate, wherein the on-off keying data rate is based at least in part on a ratio between a duration of the cyclic prefix and a duration of a remainder of the at least one orthogonal frequency division multiplexing symbol; and transmitting the orthogonal frequency division multiplexing waveform via a set of frequency resources, wherein a duration of each segment of the first integer quantity of segments of the orthogonal frequency division multiplexing waveform is based at least in part on the on-off keying data rate and the ratio between the duration of the cyclic prefix and the duration of the remainder of the at least one orthogonal frequency division multiplexing symbol.

2. The method of claim 1, further comprising:

determining the on-off keying data rate based at least in part on the ratio between the duration of the cyclic prefix and the duration of the remainder of the at least one orthogonal frequency division multiplexing symbol, wherein the cyclic prefix includes a second integer quantity of segments and the remainder of the at least one orthogonal frequency division multiplexing symbol includes a third integer quantity of segments based at least in part on the determined on-off keying data rate, the first integer quantity equal to a sum of the second integer quantity and the third integer quantity.

3. The method of claim 1, further comprising:

transmitting a message that indicates the on-off keying data rate for transmitting the orthogonal frequency division multiplexing waveform, or that indicates a type of coding associated with the on-off keying sequence, or both.

4. The method of claim 1, further comprising:

receiving a message that indicates one or more parameters associated with a user equipment (UE) in communication with the network entity, wherein the one or more parameters include a signal-to-noise ratio measured by the UE, a velocity of the UE, or both; and determining the on-off keying data rate for transmitting the orthogonal frequency division multiplexing waveform, or a type of coding for generating the on-off keying sequence, or both based at least in part on the one or more parameters.

5. The method of claim 1, further comprising:

determining a second integer quantity of segments of the orthogonal frequency division multiplexing waveform based at least in part on the ratio between the duration of the cyclic prefix and the duration of the at least one orthogonal frequency division multiplexing symbol and a subcarrier spacing for communications by the network entity, wherein the second integer quantity of segments is associated with a base on-off keying data rate, and wherein the cyclic prefix includes a first segment of the second integer quantity of segments and the remainder of the at least one orthogonal frequency division multiplexing symbol includes a remainder of the second integer quantity of segments in accordance with the base on-off keying data rate.

6. The method of claim 5, wherein transmitting the orthogonal frequency division multiplexing waveform comprises:

transmitting the orthogonal frequency division multiplexing waveform in accordance with the base on-off keying data rate, wherein the on-off keying data rate is equal to the base on-off keying data rate and the first integer quantity of segments of the orthogonal frequency division multiplexing waveform is equal to the second integer quantity of segments associated with the base on-off keying data rate, and wherein the first segment included in the cyclic prefix includes a same on-off keying symbol as a final segment of the at least one orthogonal frequency division multiplexing symbol.

7. The method of claim 5, further comprising:

multiplying the base on-off keying data rate by an integer multiplier to obtain the on-off keying data rate, the on-off keying data rate associated with more on-off keying symbols per orthogonal frequency division multiplexing symbol than the base on-off keying data rate based at least in part on the multiplying, wherein the first integer quantity of segments of the orthogonal frequency division multiplexing waveform is equal to a product of the second integer quantity of segments associated with the base on-off keying data rate and the integer multiplier, and wherein each on-off keying symbol of the plurality of on-off keying symbols is mapped to a respective segment of the first integer quantity of segments.

8. The method of claim 7, wherein:

the cyclic prefix includes a quantity of segments that is equal to the integer multiplier; and a set of on-off keying symbols conveyed via the quantity of segments of the cyclic prefix are also conveyed via a same quantity of segments of a final portion of the orthogonal frequency division multiplexing waveform.

9. The method of claim 5, further comprising:

dividing the base on-off keying data rate or a product of the base on-off keying data rate and an integer multiplier by an integer divisor to obtain the on-off keying data rate, the on-off keying data rate associated with fewer on-off keying symbols per orthogonal frequency division multiplexing symbol than the base on-off keying data rate or the product of the base on-off keying data rate and the integer multiplier based at least in part on the dividing, wherein the first integer quantity of segments of the orthogonal frequency division multiplexing waveform is equal to the second integer quantity of segments associated with the base on-off keying data rate or a product of the second integer quantity and the integer multiplier, and wherein each on-off keying symbol of the plurality of on-off keying symbols is mapped to a subset of the first integer quantity of segments, the subset including a quantity of segments equal to the integer divisor.

10. The method of claim 9, wherein:

the orthogonal frequency division multiplexing waveform includes at least a first quantity of orthogonal frequency division multiplexing symbol and cyclic prefix pairs, the first quantity equal to the integer divisor based at least in part on the on-off keying data rate; and a final subset of segments of each orthogonal frequency division multiplexing symbol and cyclic prefix pair conveys at least a portion of an on-off keying symbol that is the same as a portion of an on-off keying symbol conveyed via a beginning subset of segments of each orthogonal frequency division multiplexing symbol and cyclic prefix pair.

11. The method of claim 1, wherein:

each on-off keying symbol of the plurality of on-off keying symbols indicates a value of zero or a value of one;

transmitting energy via the orthogonal frequency division multiplexing waveform for an on-off keying symbol duration corresponds to the value of one; and refraining from transmitting the energy via the orthogonal frequency division multiplexing waveform for the on-off keying symbol duration corresponds to the value of zero.

12. The method of claim 1, wherein:

a pair of two on-off keying symbols of the plurality of on-off keying symbols indicates a value of zero or a value of one based at least in part on a Manchester coding scheme;

a first on-off keying symbol of the pair of the two on-off keying symbols includes an absence of energy transmitted via the orthogonal frequency division multiplexing waveform during a corresponding on-off keying symbol duration;

a second on-off keying symbol of the pair of the two on-off keying symbols includes a presence of energy transmitted via the orthogonal frequency division multiplexing waveform during a corresponding on-off keying symbol duration; and an order of the first on-off keying symbol and the second on-off keying symbol in time indicates the value of zero or the value of one.

13. The method of claim 12, wherein mapping the plurality of on-off keying symbols to the orthogonal frequency division multiplexing waveform comprises:

mapping each of the first on-off keying symbol or the second on-off keying symbol to at least one segment of the first integer quantity of segments based at least in part on the Manchester coding scheme and the on-off keying data rate.

14. The method of claim 1, wherein:

the duration of each segment of the first integer quantity of segments is further based at least in part on a subcarrier spacing for communications by the network entity; and a quantity of orthogonal frequency division multiplexing symbols and corresponding cyclic prefixes in the orthogonal frequency division multiplexing waveform is based at least in part on the duration of each segment and the on-off keying data rate.

15. The method of claim 1, wherein transmitting the orthogonal frequency division multiplexing waveform comprises:

multiplexing the set of frequency resources in a frequency domain with other sets of frequency resources for conveying data channels, wherein a second set of frequency resources that are next to the set of frequency resources in the frequency domain comprise guard bands to separate the set of frequency resources from the other sets of frequency resources for conveying the data channels.

16. The method of claim 1, further comprising:

modulating a set of bits associated with a wake-up signal into the on-off keying sequence, the wake-up signal indicating a request for a user equipment (UE) to operate in a wake mode for communications with the network entity, wherein the orthogonal frequency division multiplexing waveform conveys the wake-up signal to the UE.

17. A method for wireless communication at user equipment (UE), comprising:

receiving, via a set of frequency resources, an orthogonal frequency division multiplexing waveform, the orthogonal frequency division multiplexing waveform includes at least one orthogonal frequency division multiplexing symbol with a cyclic prefix, wherein the orthogonal frequency division multiplexing waveform includes a first integer quantity of segments, wherein an on-off keying data rate is based at least in part on a ratio between a duration of the cyclic prefix and a duration of a remainder of the at least one orthogonal frequency division multiplexing symbol, and wherein a duration of each segment of the first integer quantity of segments is based at least in part on the on-off keying data rate and the ratio between the duration of the cyclic prefix and the duration of the remainder the at least one orthogonal frequency division multiplexing symbol; and decoding the orthogonal frequency division multiplexing waveform to obtain an on-off keying sequence, wherein each segment of the first integer quantity of segments corresponds to at least a portion of a respective on-off keying symbol of a plurality of on-off keying symbols of the on-off keying sequence.

18. The method of claim 17, wherein:

the cyclic prefix includes a second integer quantity of segments and the remainder of the at least one orthogonal frequency division multiplexing symbol includes a third integer quantity of segments based at least in part on the on-off keying data rate, the first integer quantity equal to a sum of the second integer quantity and the third integer quantity.

19. The method of claim 17, further comprising:

receiving a message that indicates the on-off keying data rate for receiving the orthogonal frequency division multiplexing waveform, or that indicates a type of coding associated with the on-off keying sequence, or both; and monitoring for the orthogonal frequency division multiplexing waveform in accordance with the indicated on-off keying data rate, the indicated type of coding, or both.

20. The method of claim 19, further comprising:

transmitting signaling that indicates a capability of the UE to monitor for a second orthogonal frequency division multiplexing waveform in accordance with a second on-off keying data rate, a second type of coding, or both based at least in part on one or more parameters associated with the UE; and monitoring for the second orthogonal frequency division multiplexing waveform in accordance with the second on-off keying data rate, the second type of coding, or both based at least in part on the one or more parameters associated with the UE satisfying a threshold.

21. The method of claim 17, further comprising:

transmitting a message that indicates one or more parameters associated with the UE, wherein the one or more parameters include a signal-to-noise ratio measured by the UE, a velocity of the UE, or both, and wherein the on-off keying data rate associated with the orthogonal frequency division multiplexing waveform, a type of coding associated with the on-off keying sequence, or both are based at least in part on the one or more parameters.

22. The method of claim 17, wherein the first integer quantity of segments of the orthogonal frequency division multiplexing waveform is based at least in part on the on-off keying data rate and a subcarrier spacing for communications by the UE.

23. The method of claim 17, wherein:

each on-off keying symbol of the plurality of on-off keying symbols indicates a value of zero or a value of one; and determining whether an on-off keying symbol of the plurality of on-off keying symbols corresponds to the value of one or the value of zero based at least in part on an amount of energy detected via the orthogonal frequency division multiplexing waveform during a corresponding on-off keying symbol duration.

24. The method of claim 17, wherein each pair of two on-off keying symbols of the plurality of on-off keying symbols indicates a value of zero or a value of one based at least in part on a Manchester coding scheme, the method further comprising:

determining whether a first pair of the two on-off keying symbols corresponds to the value of zero or the value of one based at least in part on a first amount of energy detected via a first on-off keying symbol duration corresponding to a first on-off keying symbol of the first pair and a second amount of energy detected via a second on-off keying symbol duration corresponding to a second on-off keying symbol of the first pair.

25. The method of claim 24, wherein each of the first on-off keying symbol and the second on-off keying symbol of the first pair is mapped to at least one segment of the first integer quantity of segments based at least in part on the Manchester coding scheme and the on-off keying data rate.

26. The method of claim 17, wherein:

the duration of each segment of the first integer quantity of segments is further based at least in part on a subcarrier spacing for communications by UE; and a quantity of orthogonal frequency division multiplexing symbols and corresponding cyclic prefixes in the orthogonal frequency division multiplexing waveform is based at least in part on the duration of each segment and the on-off keying data rate.

27. The method of claim 17, wherein receiving the orthogonal frequency division multiplexing waveform comprises:

receiving the orthogonal frequency division multiplexing waveform via the set of frequency resources multiplexed in a frequency domain with other sets of frequency resources conveying data channels, wherein a second set of frequency resources that are next to the set of frequency resources in the frequency domain comprise guard bands to separate the set of frequency resources from the other sets of frequency resources for conveying the data channels.

28. The method of claim 17, further comprising:

transitioning from a sleep mode of the UE to a wake mode of the UE based at least in part on a wake-up signal conveyed via the orthogonal frequency division multiplexing waveform, wherein the on-off keying sequence is modulated with a set of bits associated with the wake-up signal.

29. An apparatus for wireless communications at a network entity, comprising:

a processor;

memory coupled with the processor; and instructions stored in the memory and executable by the processor to cause the apparatus to:

map a plurality of on-off keying symbols of an on-off keying sequence to an orthogonal frequency division multiplexing waveform, the orthogonal frequency division multiplexing waveform includes at least one orthogonal frequency division multiplexing symbol with a cyclic prefix, each on-off keying symbol of the plurality of on-off keying symbols is mapped to at least one segment of a first integer quantity of segments of the orthogonal frequency division multiplexing waveform based at least in part on an on-off keying data rate, wherein the on-off keying data rate is based at least in part on a ratio between a duration of the cyclic prefix and a duration of a remainder of the at least one orthogonal frequency division multiplexing symbol; and output the orthogonal frequency division multiplexing waveform via a set of frequency resources, wherein a duration of each segment of the first integer quantity of segments of the orthogonal frequency division multiplexing waveform is based at least in part on the on-off keying data rate and the ratio between the duration of the cyclic prefix and the duration of the remainder of the at least one orthogonal frequency division multiplexing symbol.

30. An apparatus for wireless communications at a user equipment (UE), comprising:

a processor;

memory coupled with the processor; and instructions stored in the memory and executable by the processor to cause the apparatus to:

obtain, via a set of frequency resources, an orthogonal frequency division multiplexing waveform, the orthogonal frequency division multiplexing waveform includes at least one orthogonal frequency division multiplexing symbol with a cyclic prefix, wherein the orthogonal frequency division multiplexing waveform includes a first integer quantity of segments, wherein an on-off keying data rate is based at least in part on a ratio between a duration of the cyclic prefix and a duration of a remainder of the at least one orthogonal frequency division multiplexing symbol, and wherein a duration of each segment of the first integer quantity of segments is based at least in part on the on-off keying data rate and the ratio between the duration of the cyclic prefix and the duration of the remainder the at least one orthogonal frequency division multiplexing symbol; and decode the orthogonal frequency division multiplexing waveform to obtain an on-off keying sequence, wherein each segment of the first integer quantity of segments corresponds to at least a portion of a respective on-off keying symbol of a plurality of on-off keying symbols of the on-off keying sequence.

\* \* \* \* \*